(12) United States Patent
Yang et al.

(10) Patent No.: US 12,047,888 B2
(45) Date of Patent: Jul. 23, 2024

(54) COMMUNICATION METHOD AND COMMUNICATIONS APPARATUS

(71) Applicant: HUAWEI TECHNOLOGIES CO., LTD., Guangdong (CN)

(72) Inventors: Shuigen Yang, Shanghai (CN); Feng Han, Shanghai (CN); Yinghao Jin, Shanghai (CN); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 392 days.

(21) Appl. No.: 17/401,682

(22) Filed: Aug. 13, 2021

(65) Prior Publication Data
US 2021/0377887 A1     Dec. 2, 2021

Related U.S. Application Data

(63) Continuation of application No. PCT/CN2020/074256, filed on Feb. 4, 2020.

(30) Foreign Application Priority Data

Feb. 15, 2019 (CN) .......................... 201910118205.2

(51) Int. Cl.
*H04W 56/00* (2009.01)
*H04L 27/26* (2006.01)
*H04W 36/08* (2009.01)

(52) U.S. Cl.
CPC ..... *H04W 56/001* (2013.01); *H04L 27/26025* (2021.01); *H04W 36/08* (2013.01)

(58) Field of Classification Search
CPC ................ H04W 56/001; H04W 36/08; H04L 27/26025
(Continued)

(56) References Cited

U.S. PATENT DOCUMENTS

2019/0020517 A1  1/2019 Abedini et al.
2019/0037481 A1  1/2019 Zhang et al.
(Continued)

FOREIGN PATENT DOCUMENTS

CN    102781042 A    11/2012
CN    104796242 A    7/2015
(Continued)

OTHER PUBLICATIONS

Ericsson, "SSB-based IAB node discovery and measurement," 3GPP RAN1-AH-1901 Meeting, R1-1900726, Taipei, Taiwan, Jan. 21-25, 2019, 6 pages.
(Continued)

*Primary Examiner* — Obaidul Huq
(74) *Attorney, Agent, or Firm* — Fish & Richardson P.C.

(57) ABSTRACT

Examples in this application provide a communication method and a communications apparatus. One example communication method includes determining to deactivate or activate a first synchronization signal and physical broadcast channel block (SSB), and sending a first request message to a second network device. Specifically, the first request message carries first indication information for indicating the first SSB, and when the first SSB is an SSB in the first network device, the first request message requests the second network device to update a state of the first SSB, and the second network device maintains information about at least one SSB in the first network device, or when an active first SSB is an SSB in the second network device, the first request message requests the second network device to activate the first SSB, and the first network device maintains information about at least one SSB in the second network device.

18 Claims, 8 Drawing Sheets

(58) Field of Classification Search
USPC .................................... 370/464, 498, 503
See application file for complete search history.

(56) References Cited

U.S. PATENT DOCUMENTS

| | | | |
|---|---|---|---|
| 2020/0053721 A1* | 2/2020 | Cheng .................. | H04W 72/21 |
| 2020/0053781 A1* | 2/2020 | Pan ....................... | H04W 72/30 |
| 2022/0104300 A1* | 3/2022 | Ramachandra ...... | H04B 7/0695 |

FOREIGN PATENT DOCUMENTS

| | | | |
|---|---|---|---|
| CN | 108810983 A | | 11/2018 |
| CN | 108934071 A | | 12/2018 |
| CN | 109041198 A | | 12/2018 |
| CN | 109150451 A | | 1/2019 |
| WO | 2018225989 A1 | | 12/2018 |
| WO | 2018230984 A1 | | 12/2018 |
| WO | 2019016987 A1 | | 1/2019 |

OTHER PUBLICATIONS

Extended European Search Report issued in European Application No. 20755403.1 dated Mar. 16, 2022, 12 pages.

Qualcomm Incorporated, "Summary of section 7 .2 .3.2—SSB extensions for IAB," 3GPP TSG RAN WG1 Meeting AH 1901, R1-1901369, Taipei, Taiwan, Jan. 21-25, 2019, 6 pages.

Samsung, "Support of SSBs for IAB Node Discovery and Measurement," 3GPP TSG RAN WG1 Ad-Hoc Meeting 1901, R1-1901043, Taipei, Taiwan, Jan. 21-25, 2019, 6 pages.

3GPP TS 38.300 V15.4.0 (Dec. 2018), "3rd Generation Partnership Project; Technical Specification Group Radio Access Network; NR; NR and NG-RAN Overall Description; Stage 2(Release 15)," Dec. 2018, 97 pages.

3GPP TS 38.473 V15.4.1 (Jan. 2019), "3rd Generation Partnership Project; Technical Specification Group Radio Access Network; NG-RAN; F1 application protocol (F1AP)(Release 15)," Jan. 2019, 192 pages.

PCT International Search Report and Written Opinion issued in International Application No. PCT/CN2020/074256 dated Apr. 23, 2020, 18 pages (with English translation).

Qualcomm Incorporated, "Multi-TRP Enhancements," 3GPP TSG-RAN WG1 Meeting #95, R1-1813442, Nov. 12-16, 2018, Spokane, WA, USA, 20 pages.

Office Action in Chinese Appln. No. 201910118205.2, dated Feb. 15, 2023, 11 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2020/074256, filed on Feb. 4, 2020, which claims priority to Chinese Patent Application No. 201910118205.2, filed on Feb. 15, 2019. The disclosures of the aforementioned applications are hereby incorporated by reference in their entireties.

TECHNICAL FIELD

This application relates to the communications field, and more specifically, to a communication method and a communications apparatus.

BACKGROUND

A concept of synchronization signal and physical broadcast channel block (SSB) is introduced into a 5th generation new radio (5G NR) communications system. Specifically, the SSB includes a primary synchronization signal (PSS), a secondary synchronization signal (SSS), and a physical broadcast channel (PBCH), and occupies four symbols in time domain and 240 subcarriers in frequency domain. Within a frequency range of one carrier, a plurality of SSBs may be transmitted. Each SSB corresponds to one physical cell identifier (PCI), and the PCIs of the SSBs may be the same or may be different. In the 5G communications system, a terminal device can be supported in performing cell search based on the SSB. For example, the terminal device can obtain a start position of a system frame based on the SSB, and decode the PBCH to obtain system information. In addition, cells corresponding to different SSBs in one communications system occupy different resources, for example, PCIs and time-frequency resources. For a communications system, a resource occupied by a cell corresponding to an SSB is very valuable. If resources occupied by cells corresponding to SSBs in different network devices in the communications system can be coordinated, a conflict of resources occupied by cells corresponding to different SSBs can be reduced, and performance of the entire communications system can be improved. However, in the conventional technology, no solution of coordinating resources occupied by cells corresponding to SSBs is provided for a plurality of network devices. Therefore, how to coordinate resources occupied by cells corresponding to SSBs for a plurality of network devices in a communications system becomes an urgent problem to be resolved.

SUMMARY

This application provides a communication method and a communications apparatus. After determining to deactivate or activate an SSB, a network device sends a request message to another network device, to request the another network device to update a state of the SSB or activate the SSB, that is, different network devices can learn of a status of a resource occupied by a cell corresponding to the SSB, thereby implementing resource coordination.

According to a first aspect, a communication method is provided. The communication method includes: determining, by a first network device, to deactivate or activate a first synchronization signal and physical broadcast channel block SSB; and sending, by the first network device, a first request message to a second network device, where the first request message carries first indication information for indicating the first SSB, where when the first SSB is an SSB in the first network device, the first request message is used to request the second network device to update a state of the first SSB, and the second network device maintains information about at least one SSB in the first network device; or when the first network device determines that the active first SSB is an SSB of the second network device, the first request message is used to request the second network device to activate the first SSB, and the first network device maintains information about at least one SSB in the second network device.

According to the communication method provided in this embodiment of this application, after determining to deactivate or activate the local first SSB, the first network device sends the first request message to the second network device, to request the second network device to update the state of the first SSB. That is, the second network device can learn of a use status of a resource occupied by a cell corresponding to the first SSB. If the resource occupied by the cell corresponding to the first SSB is released, the second network device can use the resource. Alternatively, after determining to activate the first SSB in the second network device, the first network device sends the first request message to the second network device, to request the second network device to activate the first SSB. That is, the second network device can use an available resource in time, thereby implementing resource coordination. In addition, the first request message carries the first indication information for indicating the first SSB, so that the second network device can accurately learn that the first SSB whose state needs to be updated or that needs to be activated is specifically which SSB, thereby improving accuracy of resource coordination.

With reference to the first aspect, in some implementations of the first aspect, the first indication information includes at least one of the following information: identification information of the first SSB, channel bandwidth information of a cell corresponding to the first SSB, or an SSB state list, where the SSB state list is a list of state information of an SSB in a network device to which the first SSB belongs, and the first SSB in the SSB state list is in a dormant state or an active state; or the SSB state list is a state list of the first SSB; or the SSB state list is a state list of a remaining SSB other than the first SSB in SSBs in a network device to which the first SSB belongs.

According to the communication method provided in this embodiment of this application, the first indication information for indicating the first SSB may be a plurality of pieces of optional information, thereby improving flexibility of the solution.

With reference to the first aspect, in some implementations of the first aspect, the identification information of the first SSB includes: a physical cell identifier of the first SSB; or a physical cell identifier of the first SSB and a radio frequency reference frequency of the first SSB; or a physical cell identifier of the first SSB and a new radio absolute radio frequency channel number of the first SSB; or a physical cell identifier of the first SSB, a new radio absolute radio frequency channel number of the first SSB, and an operating frequency band of a carrier on which the first SSB is located; or a new radio cell global identifier NCGI of the first SSB; or an identifier ID of the first SSB.

According to the communication method provided in this embodiment of this application, the identification information of the first SSB has a plurality of possible forms, that is, the SSB may be identified by using a plurality of pieces of information, to provide a flexible identification solution for identifying the SSB.

With reference to the first aspect, in some implementations of the first aspect, the channel bandwidth information of the cell corresponding to the first SSB includes at least one of the following information: information about a quantity of physical resource blocks PRBs occupied by a channel of the cell corresponding to the first SSB, a transmission bandwidth and a subcarrier spacing that are in a unit of a resource block, or a percentage of a channel bandwidth of the cell corresponding to the first SSB to a total channel bandwidth.

According to the communication method provided in this embodiment of this application, the channel bandwidth information of the cell corresponding to the first SSB has a plurality of possible forms, that is, the channel bandwidth of the cell corresponding to the first SSB may be indicated by using a plurality of pieces of information, to provide a flexible indication solution for indicating the channel bandwidth of the cell corresponding to the first SSB.

With reference to the first aspect, in some implementations of the first aspect, when the first SSB is an SSB in the first network device, the deactivating or activating, by a first network device, a first SSB includes: determining, by the first network device based on load information in the first network device, to deactivate or activate the first SSB; or receiving, by the first network device, SSB deactivation or activation indication information, where the SSB deactivation or activation indication information is used to indicate the first network device to deactivate or activate the first SSB.

According to the communication method provided in this embodiment of this application, the first network device may determine, in a plurality of determining manners, to deactivate or activate the first SSB in the first network device, to provide a plurality of optional solutions for the first network device to determine to deactivate or activate the first SSB, thereby increasing flexibility of determining, by the first network device, to deactivate or activate the first SSB.

With reference to the first aspect, in some implementations of the first aspect, before the deactivating, by the first network device, the first SSB, the method further includes: sending, by the first network device, a second request message to the second network device, where the second request message is used to request to hand over a terminal device from the first network device to the second network device, the second request message carries second indication information, and the second indication information is used to indicate that a cause for handing over the terminal device from the first network device to the second network device is that the first SSB is to be deactivated; and receiving, by the first network device, a second response message sent by the second network device, where the second response message is used to indicate a status of resource preparation for the terminal device in the second network device.

According to the communication method provided in this embodiment of this application, the first network device may request to hand over the terminal device in the first network device from the first network device to the second network device, where the second request message carries the second indication information for indicating that the cause for handing over the terminal device from the first network device to the second network device is that the first SSB is to be deactivated, to provide the second network device with the cause for handing over the terminal device by the first network device, so that there is one additional reference factor when the second network device determines whether to receive the terminal device.

With reference to the first aspect, in some implementations of the first aspect, the method further includes: receiving, by the first network device, a first response message sent by the second network device, where the first response message is used to indicate whether the second network device successfully updates the state of the first SSB.

According to the communication method provided in this embodiment of this application, the first network device can receive the first response message sent by the second network device, and clearly learn, based on the first response message, whether the second network device successfully updates the state of the first SSB.

With reference to the first aspect, in some implementations of the first aspect, when the first response message is used to indicate that the second network device fails to update the state of the first SSB, the first response message carries first duration, used to indicate that the first network device can resend the first request message after the first duration.

According to the communication method provided in this embodiment of this application, if the first response message is used to indicate that the second network device fails to update the state of the first SSB, the first response message can carry the first duration, used to indicate that the first network device can resend the first request message after the first duration, to provide an implementation solution for the first network device to resend the first request message.

With reference to the first aspect, in some implementations of the first aspect, when the first SSB is an SSB in the second network device, the determining, by a first network device to activate a first SSB includes: determining, by the first network device based on load information in the first network device, that the first SSB in the second network device needs to be activated; or determining, by the first network device based on coverage information of the first network device, that the first SSB in the second network device needs to be activated; or receiving, by the first network device, SSB activation indication information, where the SSB activation indication information is used to indicate to activate the first SSB.

According to the communication method provided in this embodiment of this application, the first network device may determine, in a plurality of determining manners, to activate the first SSB in the SSB in the second network device, to provide a plurality of optional solutions for the first network device to determine to activate the first SSB in the second network device, thereby increasing flexibility of determining, by the first network device, to activate the first SSB.

With reference to the first aspect, in some implementations of the first aspect, the method further includes: receiving, by the first network device, a third response message sent by the second network device, where the third response message is used to indicate whether the second network device successfully activates the first SSB.

According to the communication method provided in this embodiment of this application, the first network device can receive the third response message sent by the second network device, and clearly learn, based on the third response message, whether the second network device successfully activates the first SSB.

With reference to the first aspect, in some implementations of the first aspect, when the third response message is used to indicate that the second network device successfully activates the first SSB, the method further includes: updating, by the first network device, the state of the first SSB.

According to the communication method provided in this embodiment of this application, if the third response message is used to indicate that the second network device successfully activates the first SSB, the first network device locally updates the state of the first SSB.

With reference to the first aspect, in some implementations of the first aspect, that the first network device maintains information about at least one SSB in the second network device includes: the first network device maintains identification information of the at least one SSB in the second network device, state information of the at least one SSB in the second network device, and channel bandwidth information of at least one cell corresponding to the at least one SSB in the second network device; and that the second network device maintains information about at least one SSB in the first network device includes: the second network device maintains identification information of the at least one SSB in the first network device, state information of the at least one SSB in the first network device, and channel bandwidth information of at least one cell corresponding to the at least one SSB in the first network device.

According to the communication method provided in this embodiment of this application, information that is about an SSB in a neighboring network device and that is maintained in a network device includes a plurality of pieces of information, so that when a specific piece of information about the SSB changes, a state change of the SSB can be determined in time.

According to a second aspect, a communication method is provided. The communication method includes: receiving, by a second network device, a first request message sent by a first network device, where the first request message is used to request the second network device to update a state of a first synchronization signal and physical broadcast channel block SSB or activate the first SSB, and the first request message carries first indication information for indicating the first SSB; and when the first SSB is an SSB that is in the first network device and that the first network device determines to deactivate or activate, updating, by the second network device, the state of the first SSB, where the second network device maintains information about at least one SSB in the first network device; or when the first SSB is an SSB that is in the second network device and that the first network device determines to activate, activating, by the second network device, the first SSB, where the first network device maintains information about at least one SSB in the second network device.

According to the communication method provided in this embodiment of this application, the second network device can learn, based on the received first request message, of an SSB that needs to be activated or deactivated on a first network device side and an SSB that needs to be activated by the second network device on the first network device side. That is, the second network device may determine, based on the received first request message, resources that are to be occupied by a cell corresponding to the SSB and resources that are to be released for the SSB. Based on the information, resource coordination can be implemented between the second network device and the first network device. In addition, the first request message carries the first indication information for indicating the first SSB, so that the second network device can accurately learn that the first SSB whose state needs to be updated or that needs to be activated is specifically which SSB, thereby improving accuracy of resource coordination.

With reference to the second aspect, in some implementations of the second aspect, the first indication information includes at least one of the following information: identification information of the first SSB, channel bandwidth information of a cell corresponding to the first SSB, or an SSB state list, where the SSB state list is a list of state information of an SSB in a network device to which the first SSB belongs, and the first SSB in the SSB state list is in a dormant state or an active state; or the SSB state list is a state list of the first SSB; or the SSB state list is a state list of a remaining SSB other than the first SSB in SSBs in a network device to which the first SSB belongs.

According to the communication method provided in this embodiment of this application, the first indication information for indicating the first SSB may be a plurality of pieces of optional information, thereby improving flexibility of the solution.

With reference to the second aspect, in some implementations of the second aspect, the identification information of the first SSB includes: a physical cell identifier of the first SSB; or a physical cell identifier of the first SSB and a radio frequency reference frequency of the first SSB; or a physical cell identifier of the first SSB and a new radio absolute radio frequency channel number of the first SSB; or a physical cell identifier of the first SSB, a new radio absolute radio frequency channel number of the first SSB, and an operating frequency band of a carrier on which the first SSB is located; or a new radio cell global identifier NCGI of the first SSB; or an identifier ID of the first SSB.

According to the communication method provided in this embodiment of this application, the identification information of the first SSB has a plurality of possible forms, that is, the SSB may be identified by using a plurality of pieces of information, to provide a flexible identification solution for identifying the SSB.

With reference to the second aspect, in some implementations of the second aspect, the channel bandwidth information of the cell corresponding to the first SSB includes at least one of the following information: information about a quantity of physical resource blocks PRBs occupied by a channel of the cell corresponding to the first SSB, a transmission bandwidth and a subcarrier spacing that are in a unit of a resource block, or a percentage of a channel bandwidth of the cell corresponding to the first SSB to a total channel bandwidth.

According to the communication method provided in this embodiment of this application, the channel bandwidth information of the cell corresponding to the first SSB has a plurality of possible forms, that is, the channel bandwidth of the cell corresponding to the first SSB may be indicated by using a plurality of pieces of information, to provide a flexible indication solution for indicating the channel bandwidth of the cell corresponding to the first SSB.

With reference to the second aspect, in some implementations of the second aspect, when the first SSB is an SSB that is in the first network device and that the first network device determines to deactivate, before the receiving, by a second network device, a first request message sent by a first network device, the method further includes: receiving, by the second network device, a second request message sent by the first network device, where the second request message is used to request to hand over a terminal device from the first network device to the second network device, the second request message carries second indication information, and the second indication information is used to indicate that a cause for handing over the terminal device from the first network device to the second network device is that the first SSB is to be deactivated; and sending, by the second network device, a second response message to the first network device, where the second response message is used to indicate a status of resource preparation for the terminal device in the second network device.

According to the communication method provided in this embodiment of this application, the second network device may learn, based on the received second request message, of terminal devices that need to be handed over to the second network device when the first network device is to deactivate the first SSB, to provide the second network device with the cause for handing over the terminal device by the first network device, so that there is one additional reference factor when the second network device determines whether to receive the terminal device.

With reference to the second aspect, in some implementations of the second aspect, when the first SSB is an SSB that is in the first network device and that the first network device determines to deactivate or activate, the method further includes: sending, by the second network device, a first response message to the first network device, where the first response message is used to indicate whether the second network device successfully updates the state of the first SSB.

According to the communication method provided in this embodiment of this application, the second network device sends the first response message to the first network device, where the first response message is used to notify the first network device whether the second network device successfully updates the state of the first SSB.

With reference to the second aspect, in some implementations of the second aspect, when the first response message is used to indicate that the second network device fails to update the state of the first SSB, the first response message carries first duration, used to indicate that the first network device can resend the first request message after the first duration.

According to the communication method provided in this embodiment of this application, if the first response message is used to indicate that the second network device fails to update the state of the first SSB, the first response message can carry the first duration, used to indicate that the first network device can resend the first request message after the first duration, to provide an implementation solution for the first network device to resend the first request message.

With reference to the second aspect, in some implementations of the second aspect, when the first SSB is an SSB that is in the second network device and that the first network device determines to activate, the method further includes: sending, by the second network device, a third response message to the first network device, where the third response message is used to indicate whether the second network device successfully activates the first SSB.

According to the communication method provided in this embodiment of this application, the second network device sends the third response message to the first network device, where the third response message is used to notify the first network device whether the second network device successfully activates the first SSB.

With reference to the second aspect, in some implementations of the second aspect, that the first network device maintains information about at least one SSB in the second network device includes: the first network device maintains identification information of the at least one SSB in the second network device, state information of the SSB in the second network device, and channel bandwidth information of at least one cell corresponding to the at least one SSB in the second network device; and that the second network device maintains information about at least one SSB in the first network device includes: the second network device maintains identification information of the at least one SSB in the first network device, state information of the at least one SSB in the first network device, and channel bandwidth information of at least one cell corresponding to the at least one SSB in the first network device.

According to the communication method provided in this embodiment of this application, information that is about an SSB in a neighboring network device and that is maintained in a network device includes a plurality of pieces of information, so that when a specific piece of information about the SSB changes, a state change of the SSB can be determined in time.

According to a third aspect, a communications apparatus is provided. The apparatus may be configured to perform an operation of the first network device according to any one of the first aspect and the possible implementations of the first aspect. Specifically, the communications apparatus includes a corresponding component (means) configured to perform the steps or functions described in the first aspect, and the component may be the first network device in the first aspect. The operations or the functions may be implemented by using software, hardware, or a combination of hardware and software.

According to a fourth aspect, a communications apparatus is provided. The apparatus may be configured to perform an operation of the second network device according to any one of the second aspect and the possible implementations of the second aspect. Specifically, the communications apparatus may include a corresponding component (means) configured to perform the operations or functions described in the second aspect, and the component may be the second network device in the second aspect. The operations or the functions may be implemented by using software, hardware, or a combination of hardware and software.

According to a fifth aspect, a communications device is provided. The communications device includes a processor, a transceiver, and a memory. The memory is configured to store a computer program. The transceiver is configured to perform the receiving and sending operations in the communication method according to any one of the possible implementations of the first or second aspect. The processor is configured to invoke the computer program from the memory and run the computer program, to enable the communications device to perform the communication method according to any one of the possible implementations of the first or second aspect.

Optionally, there are one or more processors, and there are one or more memories.

Optionally, the memory may be integrated with the processor, or the memory and the processor may be separately disposed.

Optionally, the transceiver includes a transmitter and a receiver.

In a possible design, a communications device is provided. The communications device includes a transceiver, a processor, and a memory. The processor is configured to control the transceiver to receive and send a signal. The memory is configured to store a computer program. The processor is configured to invoke the computer program from the memory and run the computer program, to enable the communications device to perform the method according to any one of the first aspect or the possible implementations of the first aspect.

In another possible design, a communications device is provided. The communications device includes a transceiver, a processor, and a memory. The processor is configured to control the transceiver to receive and send a signal. The memory is configured to store a computer program. The processor is configured to invoke the computer program from the memory and run the computer program, to enable the communications device to perform the method according to any one of the second aspect or the possible implementations of the second aspect.

According to a sixth aspect, a system is provided. The system includes the communications apparatuses provided in the third aspect and the fourth aspect.

According to a seventh aspect, a computer program product is provided. The computer program product includes a computer program (which may also be referred to as code or an instruction). When the computer program is run, a computer is enabled to perform the method according to any one of the possible implementations of the first aspect or the second aspect.

According to an eighth aspect, a computer-readable medium is provided. The computer-readable medium stores a computer program (which may also be referred to as code or an instruction). When the computer program is run on a computer, the computer is enabled to perform the method according to any one of the possible implementations of the first aspect or the second aspect.

According to a ninth aspect, a chip system is provided. The chip system includes a memory and a processor. The memory is configured to store a computer program. The processor is configured to invoke the computer program from the memory and run the computer program, to enable a communications device on which the chip system is installed to perform the method according to any one of the possible implementations of the first aspect or the second aspect.

According to a tenth aspect, a communication method is provided. The communication method includes: determining, by a third network device, to deactivate or activate a second synchronization signal and physical broadcast channel block SSB; and sending, by the third network device, a third request message to a fourth network device, where the third request message carries third indication information for indicating the second SSB, the third request message is used to request the fourth network device to send a fourth request message to a fifth network device, the fourth request message carries third indication information, and the fourth network device maintains information about at least one SSB in the third network device and information about at least one SSB in the fifth network device, where when the second SSB is an SSB in the third network device, the fourth request message is used to request the fifth network device to update a state of the second SSB, and the fifth network device maintains the information about the at least one SSB in the third network device; or when the third network device determines that the active second SSB is an SSB of the fifth network device, the fourth request message is used to request the fifth network device to activate the second SSB, and the third network device maintains the information about the at least one SSB in the fifth network device.

According to the communication method provided in this embodiment of this application, the third network device determines to deactivate or activate the local second SSB, or the third network device determines to activate the second SSB in the fifth network device. In addition, the third network device needs to notify the fifth network device of SSB deactivation or activation information, so that the fifth network device updates the state that is of the second SSB in the third network device and that is maintained in the fifth network device, or the fifth network device activates the second SSB, thereby implementing resource coordination between the third network device and the fifth network device. In addition, the third request message carries the third indication information for indicating the second SSB, so that the fourth network device can accurately learn that the second SSB for which the third network device needs to request the fifth network device to update the state or that the third network device needs to request the fifth network device to activate is specifically which SSB, thereby improving accuracy of resource coordination. The fourth request message carries the third indication information for indicating the second SSB, so that the fifth network device can accurately learn that the second SSB whose state needs to be updated or that needs to be activated is specifically which SSB, thereby improving accuracy of resource coordination.

Because signaling cannot be directly exchanged between the third network device and the fifth network device, information needs to be forwarded through a third-party device (the fourth network device). In addition, the fourth network device does not only perform a function of forwarding information. The fourth network device maintains the information about the at least one SSB in the third network device and the information about the at least one SSB in the fifth network device. Therefore, the fourth network device may also perform a function of updating the state of the local SSB.

With reference to the tenth aspect, in some implementations of the tenth aspect, the third indication information includes at least one of the following information: identification information of the second SSB, channel bandwidth information of a cell corresponding to the second SSB, or an SSB state list, where the SSB state list is a list of state information of an SSB in a network device to which the second SSB belongs, and the second SSB in the SSB state list is in a dormant state or an active state; or the SSB state list is a state list of the second SSB; or the SSB state list is a state list of a remaining SSB other than the second SSB in SSBs in a network device to which the second SSB belongs.

According to the communication method provided in this embodiment of this application, the third indication information for indicating the second SSB may be a plurality of pieces of optional information, thereby improving flexibility of the solution.

With reference to the tenth aspect, in some implementations of the tenth aspect, the identification information of the second SSB includes: a physical cell identifier of the second SSB; or a physical cell identifier of the second SSB and a radio frequency reference frequency of the second SSB; or a physical cell identifier of the second SSB and a new radio absolute radio frequency channel number of the second SSB; or a physical cell identifier of the second SSB, a new radio absolute radio frequency channel number of the second SSB, and an operating frequency band of a carrier on which the second SSB is located; or a new radio cell global identifier NCGI of the second SSB; or an identifier ID of the second SSB.

According to the communication method provided in this embodiment of this application, the identification information of the second SSB has a plurality of possible forms, that is, the SSB may be identified by using a plurality of pieces of information, to provide a flexible identification solution for identifying the SSB.

With reference to the tenth aspect, in some implementations of the tenth aspect, the channel bandwidth information of the cell corresponding to the second SSB includes at least one of the following information: information about a quantity of physical resource blocks PRBs occupied by a channel of the cell corresponding to the second SSB, a transmission bandwidth and a subcarrier spacing that are in a unit of a resource block, or a percentage of a channel bandwidth of the cell corresponding to the second SSB to a total channel bandwidth.

According to the communication method provided in this embodiment of this application, the channel bandwidth information of the cell corresponding to the second SSB has a plurality of possible forms, that is, the channel bandwidth of the cell corresponding to the second SSB may be indicated by using a plurality of pieces of information, to provide a flexible indication solution for indicating the channel bandwidth of the cell corresponding to the second SSB.

With reference to the tenth aspect, in some implementations of the tenth aspect, when the second SSB is an SSB in the third network device, the deactivating or activating, by a third network device, a second SSB includes: determining, by the third network device based on load information in the third network device, to deactivate or activate the second SSB; or receiving, by the third network device, SSB deactivation or activation indication information, where the SSB deactivation or activation indication information is used to indicate the third network device to deactivate or activate the second SSB.

According to the communication method provided in this embodiment of this application, the third network device may determine, in a plurality of determining manners, to deactivate or activate the second SSB in the third network device, to provide a plurality of optional solutions for the third network device to determine to deactivate or activate the second SSB, thereby increasing flexibility of determining, by the third network device, to deactivate or activate the second SSB.

With reference to the tenth aspect, in some implementations of the tenth aspect, before the deactivating, by the third network device, the second SSB, the method further includes: sending, by the third network device, a fifth request message to the fourth network device, where the fifth request message is used to request the fourth network device to send a sixth request message to the fifth network device, the fifth request message carries fourth indication information, the sixth request message is used to request to hand over a terminal device from the third network device to the fifth network device, the sixth request message carries the fourth indication information, and the fourth indication information is used to indicate that a cause for handing over the terminal device from the third network device to the fifth network device is that the second SSB is to be deactivated; and receiving, by third network device, a fourth response message sent by the fourth network device, where the fourth response message is used to indicate a status of resource preparation for the terminal device in the fifth network device.

According to the communication method provided in this embodiment of this application, the third network device may request to hand over the terminal device in the third network device from the third network device to the fifth network device, where the fifth request message carries the fourth indication information for indicating that the cause for handing over the terminal device from the third network device to the fifth network device is that the second SSB is to be deactivated, and the sixth request message sent by the fourth network device to the fifth network device based on the fifth request message also carries the fourth indication information, to provide the fifth network device with the cause for handing over the terminal device by the third network device switches, so that there is one additional reference factor when the fifth network device determines whether to receive the terminal device.

With reference to the tenth aspect, in some implementations of the tenth aspect, the method further includes: receiving, by the third network device, a fifth response message sent by the fourth network device, where the fifth response message is used to indicate whether the fourth network device successfully updates the state of the second SSB.

According to the communication method provided in this embodiment of this application, because the fourth network device also performs the action of updating the state of the second SSB, the third network device can receive the fifth response message sent by the fourth network device, and clearly learn, based on the fifth response message, whether the fourth network device successfully updates the state of the second SSB.

With reference to the tenth aspect, in some implementations of the tenth aspect, when the fifth response message is used to indicate that the fourth network device fails to update the state of the second SSB, the fifth response message carries second duration, used to indicate that the third network device can resend the third request message after the second duration.

According to the communication method provided in this embodiment of this application, if the fifth response message is used to indicate that the fourth network device fails to update the state of the second SSB, the fifth response message can carry the second duration, used to indicate that the third network device can resend the third request message after the second duration, to provide an implementation solution for the third network device to resend the third request message.

With reference to the tenth aspect, in some implementations of the tenth aspect, when the second SSB is an SSB in the fifth network device, the determining, by a third network device to activate the second SSB includes: determining, by the third network device based on load information in the third network device, that the second SSB in the fifth network device needs to be activated; or determining, by the third network device based on coverage information of the third network device, that the second SSB in the fifth network device needs to be activated; or receiving, by the third network device, SSB activation indication information, where the SSB activation indication information is used to indicate to activate the second SSB.

According to the communication method provided in this embodiment of this application, the third network device may determine, in a plurality of determining manners, to activate the second SSB in the SSB in the fifth network device, to provide a plurality of optional solutions for the third network device to determine to activate the second SSB in the fifth network device, thereby increasing flexibility of determining, by the third network device, to activate the second SSB.

With reference to the tenth aspect, in some implementations of the tenth aspect, the method further includes: receiving, by the third network device, a sixth response message sent by the fourth network device, where the sixth response message is used to indicate whether the fifth network device successfully activates the second SSB.

According to the communication method provided in this embodiment of this application, the third network device can receive the sixth response message sent by the fourth network device, and clearly learn, based on the sixth response message, whether the fifth network device successfully activates the second SSB.

With reference to the tenth aspect, in some implementations of the tenth aspect, when the sixth response message is used to indicate that the fifth network device successfully activates the second SSB, the method further includes: updating, by the third network device, the state of the second SSB.

According to the communication method provided in this embodiment of this application, if the sixth response message is used to indicate that the fifth network device successfully activates the second SSB, the third network device locally updates the state of the second SSB.

With reference to the tenth aspect, in some implementations of the tenth aspect, that the third network device maintains the information about the at least one SSB in the fifth network device includes: the third network device maintains identification information of the at least one SSB in the fifth network device, state information of the at least one SSB in the fifth network device, and channel bandwidth information of at least one cell corresponding to the at least one SSB in the fifth network device; that the fifth network device maintains the information about the at least one SSB in the third network device includes: the fifth network device maintains identification information of the at least one SSB in the third network device, state information of the at least one SSB in the third network device, and channel bandwidth information of at least one cell corresponding to the at least one SSB in the third network device; and that the fourth network device maintains information about at least one SSB in the third network device and information about at least one SSB in the fifth network device includes: the fourth network device maintains the identification information of the at least one SSB in the third network device and the identification information of the at least one SSB in the fifth network device, the state information of the information about the at least one SSB in the third network device and the state information of the at least one SSB in the fifth network device, and the channel bandwidth information of the at least one cell corresponding to the at least one SSB in the third network device and the channel bandwidth information of the at least one cell corresponding to the at least one SSB in the fifth network device.

According to the communication method provided in this embodiment of this application, information that is about an SSB in a neighboring network device and that is maintained in a network device includes a plurality of pieces of information, so that when a specific piece of information about the SSB changes, a state change of the SSB can be determined in time.

According to an eleventh aspect, a communication method is provided. The communication method includes: receiving, by a fourth network device, a third request message sent by a third network device, where the third request message carries third indication information for indicating a second SSB, and the third request message is used to request the fourth network device to send a fourth request message to a fifth network device; and sending, by the fourth network device, a fourth request message to the fifth network device, where the fourth request message carries third indication information, the fourth request message is used to request the fifth network device to update a state of the second synchronization signal and physical broadcast channel block SSB or activate the second SSB, and the fourth network device maintains information about at least one SSB in the third network device and information about at least one SSB in the fifth network device, where when the second SSB is an SSB that is in the third network device and that the third network device determines to deactivate or activate, the fourth request message is used to request the fifth network device to update the state of the second SSB, and the fifth network device maintains the information about the at least one SSB in the third network device; or when the second SSB is an SSB that is in the fifth network device and that the third network device determines to activate, the fourth request message is used to request the fifth network device to activate the second SSB, and the third network device maintains the information about the at least one SSB in the fifth network device.

According to the communication method provided in this embodiment of this application, the third network device determines to deactivate or activate the local second SSB, or the third network device determines to activate the second SSB in the fifth network device. In addition, the third network device needs to notify the fifth network device of SSB deactivation or activation information, so that the fifth network device updates the state that is of the second SSB in the third network device and that is maintained in the fifth network device, or the fifth network device activates the second SSB, thereby implementing resource coordination between the third network device and the fifth network device. In addition, the third request message carries the third indication information for indicating the second SSB, so that the fourth network device can accurately learn that the second SSB for which the third network device needs to request the fifth network device to update the state or that the third network device needs to request the fifth network device to activate is specifically which SSB, thereby improving accuracy of resource coordination. The fourth request message carries the third indication information for indicating the second SSB, so that the fifth network device can accurately learn that the second SSB whose state needs to be updated or that needs to be activated is specifically which SSB, thereby improving accuracy of resource coordination.

Because signaling cannot be directly exchanged between the third network device and the fifth network device, information needs to be forwarded through a third-party device (the fourth network device). In addition, the fourth network device does not only perform a function of forwarding information. The fourth network device maintains the information about the at least one SSB in the third network device and the information about the at least one SSB in the fifth network device. Therefore, the fourth network device may also perform a function of updating the state of the local SSB.

With reference to the eleventh aspect, in some implementations of the eleventh aspect, the third indication information includes at least one of the following information:

identification information of the second SSB, channel bandwidth information of a cell corresponding to the second SSB, or an SSB state list, where the SSB state list is a list of state information of an SSB in a network device to which the second SSB belongs, and the second SSB in the SSB state list is in a dormant state or an active state; or the SSB state list is a state list of the second SSB; or the SSB state list is a state list of a remaining SSB other than the second SSB in SSBs in a network device to which the second SSB belongs.

According to the communication method provided in this embodiment of this application, the third indication information for indicating the second SSB may be a plurality of pieces of optional information, thereby improving flexibility of the solution.

With reference to the eleventh aspect, in some implementations of the eleventh aspect, the identification information of the second SSB includes: a physical cell identifier of the second SSB; or a physical cell identifier of the second SSB and a radio frequency reference frequency of the second SSB; or a physical cell identifier of the second SSB and a new radio absolute radio frequency channel number of the second SSB; or a physical cell identifier of the second SSB, a new radio absolute radio frequency channel number of the second SSB, and an operating frequency band of a carrier on which the first SSB is located; or a new radio cell global identifier NCGI of the second SSB; or an identifier ID of the second SSB.

According to the communication method provided in this embodiment of this application, the identification information of the second SSB has a plurality of possible forms, that is, the SSB may be identified by using a plurality of pieces of information, to provide a flexible identification solution for identifying the SSB.

With reference to the eleventh aspect, in some implementations of the eleventh aspect, the channel bandwidth information of the cell corresponding to the second SSB includes at least one of the following information: information about a quantity of physical resource blocks PRBs occupied by a channel of the cell corresponding to the second SSB, a transmission bandwidth and a subcarrier spacing that are in a unit of a resource block, or a percentage of a channel bandwidth of the cell corresponding to the second SSB to a total channel bandwidth.

According to the communication method provided in this embodiment of this application, the channel bandwidth information of the cell corresponding to the second SSB has a plurality of possible forms, that is, the channel bandwidth of the cell corresponding to the second SSB may be indicated by using a plurality of pieces of information, to provide a flexible indication solution for indicating the channel bandwidth of the cell corresponding to the second SSB.

With reference to the eleventh aspect, in some implementations of the eleventh aspect, when the second SSB is an SSB that is in the third network device and that the third network device determines to deactivate, before the receiving, by a fourth network device, a third request message sent by a third network device, the method further includes: receiving, by the fourth network device, a fifth request message sent by the third network device, where the fifth request message is used to request the fourth network device to send a sixth request message to the fifth network device, and the fifth request message carries fourth indication information; sending, by the fourth network device, the sixth request message to the fifth network device, where the sixth request message is used to request to hand over a terminal device from the third network device to the fifth network device, the sixth request message carries the fourth indication information, the fourth indication information is used to indicate that a cause for handing over the terminal device from the third network device to the fifth network device is that the second SSB is to be deactivated; and sending, by the fourth network device, a fourth response message to the third network device, where the fourth response message is used to indicate a status of resource preparation for the terminal device in the fifth network device.

According to the communication method provided in this embodiment of this application, the third network device may request to hand over the terminal device in the third network device from the third network device to the fifth network device, where the fifth request message carries the fourth indication information for indicating that the cause for handing over the terminal device from the third network device to the fifth network device is that the second SSB is to be deactivated, and the sixth request message sent by the fourth network device to the fifth network device based on the fifth request message also carries the fourth indication information, to provide the fifth network device with the cause for handing over the terminal device by the third network device switches, so that there is one additional reference factor when the fifth network device determines whether to receive the terminal device.

With reference to the eleventh aspect, in some implementations of the eleventh aspect, the method further includes: updating, by the fourth network device, the state of the second SSB; and sending, by the fourth network device, a fifth response message to the third network device, where the fifth response message is used to indicate whether the fourth network device successfully updates the state of the second SSB.

According to the communication method provided in this embodiment of this application, because the fourth network device also performs the action of updating the state of the second SSB, the third network device can receive the fifth response message sent by the fourth network device, and clearly learn, based on the fifth response message, whether the fourth network device successfully updates the state of the second SSB.

With reference to the eleventh aspect, in some implementations of the eleventh aspect, when the fifth response message is used to indicate that the fourth network device fails to update the state of the second SSB, the fifth response message carries second duration, used to indicate that the third network device can resend the third request message after the second duration.

According to the communication method provided in this embodiment of this application, if the fifth response message is used to indicate that the fourth network device fails to update the state of the second SSB, the fifth response message can carry the second duration, used to indicate that the third network device can resend the third request message after the second duration, to provide an implementation solution for the third network device to resend the third request message.

With reference to the eleventh aspect, in some implementations of the eleventh aspect, the method further includes: sending, by the fourth network device, a sixth response message to the third network device, where the sixth response message is used to indicate whether the fifth network device successfully activates the second SSB.

According to the communication method provided in this embodiment of this application, the fourth network device sends the sixth response message to the third network device, where the sixth response message is used to indicate whether the fifth network device successfully activates the second SSB.

With reference to the eleventh aspect, in some implementations of the eleventh aspect, that the third network device maintains the information about the at least one SSB in the fifth network device includes: the third network device maintains identification information of the at least one SSB in the fifth network device, state information of the at least one SSB in the fifth network device, and channel bandwidth information of at least one cell corresponding to the at least one SSB in the fifth network device; that the fifth network device maintains the information about the at least one SSB in the third network device includes: the fifth network device maintains identification information of the at least one SSB in the third network device, state information of the at least one SSB in the third network device, and channel bandwidth information of at least one cell corresponding to the at least one SSB in the third network device; and that the fourth network device maintains information about at least one SSB in the third network device and information about at least one SSB in the fifth network device includes: the fourth network device maintains the identification information of the at least one SSB in the third network device and the identification information of the at least one SSB in the fifth network device, the state information of the at least one SSB in the third network device and the state information of the at least one SSB in the fifth network device, and the channel bandwidth information of the at least one cell corresponding to the at least one SSB in the third network device and the channel bandwidth information of the at least one cell corresponding to the at least one SSB in the fifth network device.

According to the communication method provided in this embodiment of this application, information that is about an SSB in a neighboring network device and that is maintained in a network device includes a plurality of pieces of information, so that when a specific piece of information about the SSB changes, a state change of the SSB can be determined in time.

According to a twelfth aspect, a communication method is provided. The communication method includes: receiving, by a fifth network device, a fourth request message sent by a fourth network device, where the fourth request message is used to request the fifth network device to update a state of a second synchronization signal and physical broadcast channel block SSB or activate the second SSB, the fourth request message carries third indication information for indicating the second SSB, and the fourth network device maintains state information of at least one SSB in a third network device and information about at least one SSB in the fifth network device; and sending, by the third network device, a third request message to the fourth network device, where the third request message carries the third indication information, and requests the fourth network device to send the fourth request message to the fifth network device, where when the second SSB is an SSB that is in the third network device and that the third network device determines to deactivate or activate, the fifth network device updates the state of the second SSB, and the fifth network device maintains information about the at least one SSB in the third network device; or when the second SSB is an SSB that is in the fifth network device and that the third network device determines to activate, the fifth network device activates the second SSB, and the third network device maintains the information about the at least one SSB in the fifth network device.

According to the communication method provided in this embodiment of this application, the third network device determines to deactivate or activate the local second SSB, or the third network device determines to activate the second SSB in the fifth network device. In addition, the third network device needs to notify, the fifth network device of SSB deactivation or activation information, so that the fifth network device updates the state that is of the SSB in the third network device and that is maintained in the fifth network device, or the fifth network device activates the SSB, thereby implementing resource coordination between the third network device and the fifth network device. In addition, the third request message carries the third indication information for indicating the second SSB, so that the fourth network device can accurately learn that the second SSB for which the third network device needs to request the fifth network device to update the state or that the third network device needs to request the fifth network device to activate is specifically which SSB, thereby improving accuracy of resource coordination. The fourth request message carries the third indication information for indicating the second SSB, so that the fifth network device can accurately learn that the second SSB whose state needs to be updated or that needs to be activated is specifically which SSB, thereby improving accuracy of resource coordination.

Because signaling cannot be directly exchanged between the third network device and the fifth network device, information needs to be forwarded through a third-party device (the fourth network device). In addition, the fourth network device does not only perform a function of forwarding information. The fourth network device maintains the state information of the at least one SSB in the third network device and the information about the at least one SSB in the fifth network device. Therefore, the fourth network device may also perform a function of updating the state of the local SSB.

With reference to the twelfth aspect, in some implementations of the twelfth aspect, the third indication information includes at least one of the following information: identification information of the second SSB, channel bandwidth information of a cell corresponding to the second SSB, or an SSB state list, where the SSB state list is a list of state information of an SSB in a network device to which the second SSB belongs, and the second SSB in the SSB state list is in a dormant state or an active state; or the SSB state list is a state list of the second SSB; or the SSB state list is a state list of a remaining SSB other than the second SSB in SSBs in a network device to which the second SSB belongs.

According to the communication method provided in this embodiment of this application, the third indication information for indicating the second SSB may be a plurality of pieces of optional information, thereby improving flexibility of the solution.

With reference to the twelfth aspect, in some implementations of the twelfth aspect, the identification information of the second SSB includes: a physical cell identifier of the second SSB; or a physical cell identifier of the second SSB and a radio frequency reference frequency of the second SSB; or a physical cell identifier of the second SSB and a new radio absolute radio frequency channel number of the second SSB; or a physical cell identifier of the second SSB, a new radio absolute radio frequency channel number of the second SSB, and an operating frequency band of a carrier on which the first SSB is located; or a new radio cell global identifier NCGI of the second SSB; or an identifier ID of the second SSB.

According to the communication method provided in this embodiment of this application, the identification information of the second SSB has a plurality of possible forms, that is, the SSB may be identified by using a plurality of pieces of information, to provide a flexible identification solution for identifying the SSB.

With reference to the twelfth aspect, in some implementations of the twelfth aspect, the channel bandwidth information of the cell corresponding to the second SSB includes at least one of the following information: information about a quantity of physical resource blocks PRBs occupied by a channel of the cell corresponding to the second SSB, a bandwidth and a subcarrier spacing that are in a unit of a resource block, or a percentage of a channel bandwidth of the cell corresponding to the second SSB to a total channel bandwidth.

According to the communication method provided in this embodiment of this application, the channel bandwidth information of the cell corresponding to the second SSB has a plurality of possible forms, that is, the channel bandwidth of the cell corresponding to the second SSB may be indicated by using a plurality of pieces of information, to provide a flexible indication solution for indicating the channel bandwidth of the cell corresponding to the second SSB.

With reference to the twelfth aspect, in some implementations of the twelfth aspect, when the second SSB is an SSB that is in the third network device and that the third network device determines to deactivate, before the receiving, by a fifth network device, a fourth request message sent by a fourth network device, the method further includes: receiving, by the fifth network device, a sixth request message sent by the fourth network device, where the sixth request message is used to request to hand over a terminal device from the third network device to the fifth network device, the sixth request message carries fourth indication information, and the fourth indication information is used to indicate that a cause for handing over the terminal device from the third network device to the fifth network device is that the second SSB is to be deactivated; and sending, by the fifth network device, a twelfth response message to the fourth network device, where the twelfth response message is used to indicate a status of resource preparation for the terminal device in the fifth network device.

According to the communication method provided in this embodiment of this application, the third network device may request to hand over the terminal device in the third network device from the third network device to the fifth network device, where the fifth request message carries the fourth indication information for indicating that the cause for handing over the terminal device from the third network device to the fifth network device is that the second SSB is to be deactivated, and the sixth request message sent by the fourth network device to the fifth network device based on the fifth request message also carries the fourth indication information, to provide the fifth network device with the cause for handing over the terminal device by the third network device switches, so that there is one additional reference factor when the fifth network device determines whether to receive the terminal device.

With reference to the twelfth aspect, in some implementations of the twelfth aspect, the method further includes: sending, by the fifth network device, an eighth response message to the fourth network device, where the eighth response message is used to indicate whether the fifth network device successfully updates the state of the second SSB.

According to the communication method provided in this embodiment of this application, the fourth network device can receive the eighth response message sent by the fifth network device, where the eighth response message is used to indicate whether the fifth network device successfully updates the state of the second SSB.

With reference to the twelfth aspect, in some implementations of the twelfth aspect, when the eighth response message is used to indicate that the fifth network device fails to update the state of the second SSB, the eighth response message carries third duration, used to indicate that the fourth network device can resend the fourth request message after the third duration.

According to the communication method provided in this embodiment of this application, when the eighth response message is used to indicate that the fourth network device fails to update the state of the second SSB, the eighth response message carries the third duration, used to indicate that the fourth network device can resend the fourth request message after the third duration.

With reference to the twelfth aspect, in some implementations of the twelfth aspect, the method further includes: sending, by the fifth network device, a ninth response message to the fourth network device, where the ninth response message is used to indicate whether the fifth network device successfully activates the second SSB.

According to the communication method provided in this embodiment of this application, the fifth network device sends the ninth response message to the fourth network device, where the ninth response message is used to indicate whether the fifth network device successfully activates the second SSB.

With reference to the twelfth aspect, in some implementations of the twelfth aspect, that the third network device maintains the information about the at least one SSB in the fifth network device includes: the third network device maintains identification information of the at least one SSB in the fifth network device, state information of the at least one SSB in the fifth network device, and channel bandwidth information of at least one cell corresponding to the at least one SSB in the fifth network device; that the fifth network device maintains the information about the at least one SSB in the third network device includes: the fifth network device maintains identification information of the at least one SSB in the third network device, state information of the at least one SSB in the third network device, and channel bandwidth information of at least one cell corresponding to the at least one SSB in the third network device; and that the fourth network device maintains information about at least one SSB in the third network device and information about at least one SSB in the fifth network device includes: the fourth network device maintains the identification information of the at least one SSB in the third network device and the identification information of the at least one SSB in the fifth network device, the state information of the at least one SSB in the third network device and the state information of the at least one SSB in the fifth network device, and the channel bandwidth information of the at least one cell corresponding to the at least one SSB in the third network device and the channel bandwidth information of the at least one cell corresponding to the at least one SSB in the fifth network device.

According to the communication method provided in this embodiment of this application, information that is about an SSB in a neighboring network device and that is maintained in a network device includes a plurality of pieces of information, so that when a specific piece of information about the SSB changes, a state change of the SSB can be determined in time.

According to a thirteenth aspect, a communications apparatus is provided. The apparatus may be configured to perform an operation of the third network device according to any one of the tenth aspect and the possible implementations of the tenth aspect. Specifically, the communications apparatus includes a corresponding component (means) configured to perform the operations or functions described in the tenth aspect, and the component may be the third network device in the tenth aspect. The operations or the functions may be implemented by using software, hardware, or a combination of hardware and software.

According to a fourteenth aspect, a communications apparatus is provided. The apparatus may be configured to perform an operation of the fourth network device according to any one of the eleventh aspect and the possible implementations of the eleventh aspect. Specifically, the communications apparatus may include a corresponding component (means) configured to perform the operations or functions described in the eleventh aspect, and the component may be the fourth network device in the eleventh aspect. The operations or the functions may be implemented by using software, hardware, or a combination of hardware and software.

According to a fifteenth aspect, a communications apparatus is provided. The apparatus may be configured to perform an operation of the fourth network device according to any one of the twelfth aspect and the possible implementations of the twelfth aspect. Specifically, the communications apparatus may include a corresponding component (means) configured to perform the operations or functions described in the twelfth aspect, and the component may be the fifth network device in the twelfth aspect. The operations or the functions may be implemented by using software, hardware, or a combination of hardware and software.

According to a sixteenth aspect, a communications device is provided. The communications device includes a processor, a transceiver, and a memory. The memory is configured to store a computer program. The transceiver is configured to perform the receiving and sending operations in the communication method according to any one of the possible implementations of the tenth to twelfth aspects. The processor is configured to invoke the computer program from the memory and run the computer program, to enable the communications device to perform the communication method according to any one of the possible implementations of the tenth to twelfth aspects.

Optionally, there are one or more processors, and there are one or more memories.

Optionally, the memory may be integrated with the processor, or the memory and the processor may be separately disposed.

Optionally, the transceiver includes a transmitter and a receiver.

In a possible design, a communications device is provided. The communications device includes a transceiver, a processor, and a memory. The processor is configured to control the transceiver to receive and send a signal. The memory is configured to store a computer program. The processor is configured to invoke the computer program from the memory and run the computer program, to enable the communications device to perform the method according to any one of the tenth aspect or the possible implementations of the tenth aspect.

In another possible design, a communications device is provided. The communications device includes a transceiver, a processor, and a memory. The processor is configured to control the transceiver to receive and send a signal. The memory is configured to store a computer program. The processor is configured to invoke the computer program from the memory and run the computer program, to enable the communications device to perform the method according to any one of the eleventh aspect or the possible implementations of the eleventh aspect.

In another possible design, a communications device is provided. The communications device includes a transceiver, a processor, and a memory. The processor is configured to control the transceiver to receive and send a signal. The memory is configured to store a computer program. The processor is configured to invoke the computer program from the memory and run the computer program, to enable the communications device to perform the method according to any one of the twelfth aspect or the possible implementations of the twelfth aspect.

According to a seventeenth aspect, a system is provided. The system includes the communications apparatuses provided in the thirteenth aspect to the fifteenth aspect.

According to an eighteenth aspect, a computer program product is provided. The computer program product includes a computer program (which may also be referred to as code or an instruction). When the computer program is run, a computer is enabled to perform the method according to any one of the possible implementations of the tenth aspect to the twelfth aspect.

According to a nineteenth aspect, a computer-readable medium is provided. The computer-readable medium stores a computer program (which may also be referred to as code or an instruction). When the computer program is run on a computer, the computer is enabled to perform the method according to any one of the possible implementations of the tenth aspect to the twelfth aspect.

According to a twentieth aspect, a chip system is provided. The chip system includes a memory and a processor. The memory is configured to store a computer program. The processor is configured to invoke the computer program from the memory and run the computer program, to enable a communications device on which the chip system is installed to perform the method according to any one of the possible implementations of the tenth aspect to the twelfth aspect.

According to a twenty-first aspect, a communication method is provided. The communication method includes: sending, by a third network device, a load report message to a fourth network device, where the load report message is used to indicate a load status of a cell corresponding to an SSB in the third network device, and the fourth network device maintains information about at least one SSB in the third network device, and receiving, by the third network device, a seventh request message sent by the fourth network device, where the seventh request message is used to indicate the third network device to deactivate or activate a third synchronization signal and physical broadcast channel block SSB.

According to the communication method provided in this embodiment of this application, the third network device may send the load report message to the fourth network device, to notify the fourth network device of the load status in the third network device, so that the fourth network device may determine, based on the load status in the third network device, to activate or deactivate the third SSB in the third network device, or determine to activate or deactivate a third SSB in a fifth network device, where the fifth network device is a neighboring network device of the third network device, thereby implementing load balancing.

With reference to the twenty-first aspect, in some implementations of the twenty-first aspect, the load report message includes one or more pieces of SSB information in the third network device and load information of a cell corresponding to one or more SSBs, and the one or more pieces of SSB information are respectively used to indicate the one or more SSBs.

According to the communication method provided in this embodiment of this application, to clearly notify the load status in the third network device, the load report message includes the information about the at least one SSB in the third network device and load information of a cell corresponding to the at least one SSB. The SSB can be accurately determined based on the SSB information, and the load status of the cell corresponding to the SSB can be further determined based on the load information of the cell corresponding to the SSB.

It should be understood that the SSB information includes identification information of the SSB, for example, an ID of the SSB or a PCI of the SSB.

With reference to the twenty-first aspect, in some implementations of the twenty-first aspect, the identifier of the SSB includes: a physical cell identifier of the SSB; or a physical cell identifier of the SSB and a radio frequency reference frequency of the SSB; or a physical cell identifier of the SSB and a new radio absolute radio frequency channel number of the SSB; or a physical cell identifier of the SSB, a new radio absolute radio frequency channel number of the SSB, and an operating frequency band of a carrier on which the SSB is located; or a new radio cell global identifier NCGI of the SSB; or an identifier ID of the SSB.

According to the communication method provided in this embodiment of this application, the identification information of the SSB has a plurality of possible forms, that is, the SSB may be identified by using a plurality of pieces of information, to provide a flexible identification solution for identifying the SSB.

With reference to the twenty-first aspect, in some implementations of the twenty-first aspect, the load information includes at least one of the following information: radio resource usage information of the SSB, a hardware load indicator of the SSB, a software load indicator of the SSB, a capacity value of the SSB, or overload state indication information of the SSB, where the overload state indication information of the SSB is used to indicate that the SSB is in an overloaded state or a non-overloaded state.

According to the communication method provided in this embodiment of this application, the load information of the cell corresponding to the SSB has a plurality of possible forms, that is, the load status of the cell corresponding to the SSB may be determined by using a plurality of pieces of information, to provide a flexible solution for determining the load status of the cell corresponding to the SSB.

With reference to the twenty-first aspect, in some implementations of the twenty-first aspect, the seventh request message includes fifth indication information of the third SSB, and the fifth indication information may be at least one of the following information: identification information of the third SSB, channel bandwidth information of a cell corresponding to the third SSB, or an SSB state list, where the SSB state list is a list of state information of an SSB in the third network device, and the third SSB in the SSB state list is in a dormant state; or the SSB state list is a state list of the third SSB; or the SSB state list is a state list of a remaining SSB other than the third SSB in SSBs in the third network device.

According to the communication method provided in this embodiment of this application, the seventh request message carries the fifth indication information for indicating the third SSB, so that the third network device can accurately learn that the third SSB that the fourth network device needs to indicate the third network device to deactivate or activate is specifically which SSB, thereby improving accuracy of load balancing.

With reference to the twenty-first aspect, in some implementations of the twenty-first aspect, the method further includes: the identification information of the third SSB includes: a physical cell identifier of the third SSB; or a physical cell identifier of the third SSB and a radio frequency reference frequency of the third SSB; or a physical cell identifier of the third SSB and a new radio absolute radio frequency channel number of the third SSB; or a physical cell identifier of the third SSB, a new radio absolute radio frequency channel number of the third SSB, and an operating frequency band of a carrier on which the third SSB is located; or a new radio cell global identifier NCGI of the third SSB; or an identifier ID of the third SSB.

According to the communication method provided in this embodiment of this application, the identification information of the third SSB has a plurality of possible forms, that is, the SSB may be identified by using a plurality of pieces of information, to provide a flexible identification solution for identifying the SSB.

With reference to the twenty-first aspect, in some implementations of the twenty-first aspect, the channel bandwidth information of the cell corresponding to the third SSB includes at least one of the following information: information about a quantity of physical resource blocks PRBs occupied by a channel of the cell corresponding to the third SSB, a transmission bandwidth and a subcarrier spacing that are in a unit of a resource block, or a percentage of a channel bandwidth of the cell corresponding to the third SSB to a total channel bandwidth.

According to the communication method provided in this embodiment of this application, the channel bandwidth information of the cell corresponding to the third SSB has a plurality of possible forms, that is, the channel bandwidth of the cell corresponding to the third SSB may be indicated by using a plurality of pieces of information, to provide a flexible indication solution for indicating the channel bandwidth of the cell corresponding to the third SSB.

With reference to the twenty-first aspect, in some implementations of the twenty-first aspect, the method further includes: sending, by the third network device, a seventh response message to the fourth network device, where the seventh response message is used to indicate whether the third SSB is successfully deactivated or activated.

With reference to the twenty-first aspect, in some implementations of the twenty-first aspect, that the fourth network device maintains information about at least one SSB in the third network device includes: the fourth network device maintains identification information of the at least one SSB in the third network device, state information of the at least one SSB in the third network device, and channel bandwidth information of at least one cell corresponding to the at least one SSB in the third network device.

According to the communication method provided in this embodiment of this application, information that is about an SSB in a neighboring network device and that is maintained in the fourth network device includes a plurality of pieces of information, so that when a specific piece of information about the SSB changes, a state change of the SSB can be determined in time.

According to a twenty-second aspect, a communication method is provided. The communication method includes: receiving, by a fourth network device, a load report message sent by a third network device, where the load report message is used to indicate a load status of a cell corresponding to an SSB in the third network device, and the fourth network device maintains information about at least one SSB in the third network device; and sending, by the fourth network device, a seventh request message to the third network device, where the seventh request message is used to indicate the third network device to deactivate or activate a third synchronization signal and physical broadcast channel block SSB.

According to the communication method provided in this embodiment of this application, the fourth network device receives the load report message sent by the third network device, and learns of the load status in the third network device based on the load report message, so that the fourth network device may determine, based on the load status in the third network device, to activate or deactivate the third SSB in the third network device, or determine to activate or deactivate a third SSB in a fifth network device, thereby implementing load balancing.

With reference to the twenty-second aspect, in some implementations of the twenty-second aspect, the load report message includes one or more pieces of SSB information in the third network device, and cell load information corresponding to one or more SSBs.

According to the communication method provided in this embodiment of this application, to clearly notify the load status in the third network device, the load report message includes the information about the at least one SSB in the third network device and load information of a cell corresponding to the at least one SSB. The SSB can be accurately determined based on the SSB information, and the load status of the cell corresponding to the SSB can be further determined based on the load information of the cell corresponding to the SSB.

With reference to the twenty-second aspect, in some implementations of the twenty-second aspect, an identifier of the SSB includes: a physical cell identifier of the SSB; or a physical cell identifier of the SSB and a radio frequency reference frequency of the SSB; or a physical cell identifier of the SSB and a new radio absolute radio frequency channel number of the SSB; or a physical cell identifier of the SSB, a new radio absolute radio frequency channel number of the SSB, and an operating frequency band of a carrier on which the SSB is located; or a new radio cell global identifier NCGI of the SSB; or an identifier ID of the SSB.

According to the communication method provided in this embodiment of this application, the identification information of the SSB has a plurality of possible forms, that is, the SSB may be identified by using a plurality of pieces of information, to provide a flexible identification solution for identifying the SSB.

With reference to the twenty-second aspect, in some implementations of the twenty-second aspect, the load information includes at least one of the following information: radio resource usage information of the SSB, a hardware load indicator of the SSB, a software load indicator of the SSB, a capacity value of the SSB, or overload state indication information of the SSB, where the overload state indication information of the SSB is used to indicate that the SSB is in an overloaded state or a non-overloaded state.

According to the communication method provided in this embodiment of this application, the load information of the cell corresponding to the SSB has a plurality of possible forms, that is, the load status of the cell corresponding to the SSB may be determined by using a plurality of pieces of information, to provide a flexible solution for determining the load status of the cell corresponding to the SSB.

With reference to the twenty-second aspect, in some implementations of the twenty-second aspect, the seventh request message includes fifth indication information of the third SSB, and the fifth indication information may be at least one of the following information: identification information of the third SSB, channel bandwidth information of a cell corresponding to the third SSB, or an SSB state list, where the SSB state list is a list of state information of an SSB in the third network device, and the third SSB in the SSB state list is in a dormant state; or the SSB state list is a state list of the third SSB; or the SSB state list is a state list of a remaining SSB other than the third SSB in SSBs in the third network device.

According to the communication method provided in this embodiment of this application, the seventh request message carries the fifth indication information for indicating the third SSB, so that the third network device can accurately learn that the third SSB that the fourth network device needs to indicate the third network device to deactivate or activate is specifically which SSB, thereby improving accuracy of load balancing.

With reference to the twenty-second aspect, in some implementations of the twenty-second aspect, the method further includes: the identification information of the third SSB includes: a physical cell identifier of the third SSB; or a physical cell identifier of the third SSB and a radio frequency reference frequency of the third SSB; or a physical cell identifier of the third SSB and a new radio absolute radio frequency channel number of the third SSB; or a physical cell identifier of the third SSB, a new radio absolute radio frequency channel number of the third SSB, and an operating frequency band of a carrier on which the first SSB is located; or a new radio cell global identifier NCGI of the third SSB; or an identifier ID of the third SSB.

According to the communication method provided in this embodiment of this application, the identification information of the third SSB has a plurality of possible forms, that is, the SSB may be identified by using a plurality of pieces of information, to provide a flexible identification solution for identifying the SSB.

With reference to the twenty-second aspect, in some implementations of the twenty-second aspect, the channel bandwidth information of the cell corresponding to the third SSB includes at least one of the following information: information about a quantity of physical resource blocks PRBs occupied by a channel of the cell corresponding to the third SSB, a transmission bandwidth and a subcarrier spacing that are in a unit of a resource block, or a percentage of a channel bandwidth of the cell corresponding to the third SSB to a total channel bandwidth.

According to the communication method provided in this embodiment of this application, the channel bandwidth information of the cell corresponding to the third SSB has a plurality of possible forms, that is, the channel bandwidth of the cell corresponding to the third SSB may be indicated by using a plurality of pieces of information, to provide a flexible indication solution for indicating the channel bandwidth of the cell corresponding to the third SSB.

With reference to the twenty-second aspect, in some implementations of the twenty-second aspect, the method further includes: sending, by the third network device, a seventh response message to the fourth network device, where the seventh response message is used to indicate whether the third SSB is successfully deactivated or activated.

With reference to the twenty-second aspect, in some implementations of the twenty-second aspect, that the fourth network device maintains information about at least one SSB in the third network device includes: the fourth network device maintains identification information of the at least one SSB in the third network device, state information of the at least one SSB in the third network device, and channel bandwidth information of at least one cell corresponding to the at least one SSB in the third network device.

According to the communication method provided in this embodiment of this application, information that is about at least one SSB in a neighboring network device and that is maintained in the fourth network device includes a plurality of pieces of information, so that when a specific piece of information about the SSB changes, a state change of the SSB can be determined in time.

According to a twenty-third aspect, a communications apparatus is provided. The apparatus may be configured to perform an operation of the third network device according to any one of the twenty-first aspect and the possible implementations of the twenty-first aspect. Specifically, the communications apparatus includes a corresponding component (means) configured to perform the operations or functions described in the twenty-first aspect, and the component may be the third network device in the twenty-first aspect. The operations or the functions may be implemented by using software, hardware, or a combination of hardware and software.

According to a twenty-fourth aspect, a communications apparatus is provided. The apparatus may be configured to perform an operation of the fourth network device according to any one of the twenty-second aspect and the possible implementations of the twenty-second aspect. Specifically, the communications apparatus may include a corresponding component (means) configured to perform the operations or functions described in the twenty-second aspect, and the component may be the fourth network device in the twenty-second aspect. The operations or the functions may be implemented by using software, hardware, or a combination of hardware and software.

According to a twenty-fifth aspect, a communications device is provided. The communications device includes a processor, a transceiver, and a memory. The memory is configured to store a computer program. The transceiver is configured to perform the receiving and sending operations in the communication method according to any one of the possible implementations of the twenty-first or twenty-second aspect. The processor is configured to invoke the computer program from the memory and run the computer program, to enable the communications device to perform the communication method according to any one of the possible implementations of the twenty-first or twenty-second aspect.

Optionally, there are one or more processors, and there are one or more memories.

Optionally, the memory may be integrated with the processor, or the memory and the processor may be separately disposed.

Optionally, the transceiver includes a transmitter and a receiver.

In a possible design, a communications device is provided. The communications device includes a transceiver, a processor, and a memory. The processor is configured to control the transceiver to receive and send a signal. The memory is configured to store a computer program. The processor is configured to invoke the computer program from the memory and run the computer program, to enable the communications device to perform the method according to any one of the twenty-first aspect or the possible implementations of the twenty-first aspect.

In another possible design, a communications device is provided. The communications device includes a transceiver, a processor, and a memory. The processor is configured to control the transceiver to receive and send a signal. The memory is configured to store a computer program. The processor is configured to invoke the computer program from the memory and run the computer program, to enable the communications device to perform the method according to any one of the twenty-second aspect or the possible implementations of the twenty-second aspect.

According to a twenty-sixth aspect, a system is provided. The system includes the communications apparatuses provided in the twenty-third or twenty-fourth aspect.

According to a twenty-seventh aspect, a computer program product is provided. The computer program product includes a computer program (which may also be referred to as code or an instruction). When the computer program is run, a computer is enabled to perform the method according to any one of the possible implementations of the twenty-first or twenty-second aspect.

According to a twenty-eighth aspect, a computer-readable medium is provided. The computer-readable medium stores a computer program (which may also be referred to as code or an instruction). When the computer program is run on a computer, the computer is enabled to perform the method according to any one of the possible implementations of the twenty-first or twenty-second aspect.

According to a twenty-ninth aspect, a chip system is provided. The chip system includes a memory and a processor. The memory is configured to store a computer program. The processor is configured to invoke the computer program from the memory and run the computer program, to enable a communications device on which the chip system is installed to perform the method according to any one of the possible implementations of the twenty-first or twenty-second aspect.

According to a thirtieth aspect, a communication method is provided. The communication method includes: sending, by a first network device, a second request message to a second network device, where the second request message is used to request to hand over a terminal device from the first network device to the second network device, the second request message carries second indication information, the second indication information is used to indicate that a first synchronization signal and physical broadcast channel block SSB in the first network device is to be deactivated, and the second network device maintains information about at least one SSB in the first network device; and receiving, by the first network device, a second response message sent by the second network device, where the second response message is used to indicate a status of resource preparation for the terminal device in the second network device.

According to the communication method provided in this embodiment of this application, the first network device may request to hand over the terminal device in the first network device from the first network device to the second network device, where the second request message carries the second indication information for indicating that the cause for handing over the terminal device from the first network device to the second network device is that the first SSB is to be deactivated, to provide the second network device with the cause for handing over the terminal device by the first network device, so that there is one additional reference factor when the second network device determines whether to receive the terminal device.

With reference to the thirtieth aspect, in some implementations of the thirtieth aspect, the method further includes: deactivating, by the first network device, the first SSB; and sending, by the first network device, a first request message to the second network device, where the first request message is used to request the second network device to update a state of the first SSB, the first request message carries first indication information for indicating the first SSB, and the second network device maintains the information about the at least one SSB in the first network device.

According to the communication method provided in this embodiment of this application, after determining to deactivate the local first SSB, the first network device sends the first request message to the second network device, to request the second network device to update the state of the first SSB. That is, the second network device can learn of a use status of a resource occupied by a cell corresponding to the first SSB. If the resource occupied by the cell corresponding to the first SSB is released, the second network device can use the resource. In addition, the first request message carries the first indication information for indicating the first SSB, so that the second network device can accurately learn that the first SSB whose state needs to be updated or that needs to be activated is specifically which SSB, thereby improving accuracy of resource coordination.

With reference to the thirtieth aspect, in some implementations of the thirtieth aspect, the first indication information includes at least one of the following information: identification information of the first SSB, channel bandwidth information of a cell corresponding to the first SSB, or an SSB state list, where the SSB state list is a list of state information of an SSB in a network device to which the first SSB belongs, and the first SSB in the SSB state list is in a dormant state or an active state; or the SSB state list is a state list of the first SSB; or the SSB state list is a state list of a remaining SSB other than the first SSB in SSBs in a network device to which the first SSB belongs.

According to the communication method provided in this embodiment of this application, the first indication information for indicating the first SSB may be a plurality of pieces of optional information, thereby improving flexibility of the solution.

With reference to the thirtieth aspect, in some implementations of the thirtieth aspect, the identification information of the first SSB includes: a physical cell identifier of the first SSB; or a physical cell identifier of the first SSB and a radio frequency reference frequency of the first SSB; or a physical cell identifier of the first SSB and a new radio absolute radio frequency channel number of the first SSB; or a physical cell identifier of the first SSB, a new radio absolute radio frequency channel number of the first SSB, and an operating frequency band of a carrier on which the first SSB is located; or a new radio cell global identifier NCGI of the first SSB; or an identifier ID of the first SSB.

According to the communication method provided in this embodiment of this application, the identification information of the first SSB has a plurality of possible forms, that is, the SSB may be identified by using a plurality of pieces of information, to provide a flexible identification solution for identifying the SSB.

With reference to the thirtieth aspect, in some implementations of the thirtieth aspect, the channel bandwidth information of the cell corresponding to the first SSB includes at least one of the following information: information about a quantity of physical resource blocks PRBs occupied by a channel of the cell corresponding to the first SSB, a transmission bandwidth and a subcarrier spacing that are in a unit of a resource block, or a percentage of a channel bandwidth of the cell corresponding to the first SSB to a total channel bandwidth.

According to the communication method provided in this embodiment of this application, the channel bandwidth information of the cell corresponding to the first SSB has a plurality of possible forms, that is, the channel bandwidth of the cell corresponding to the first SSB may be indicated by using a plurality of pieces of information, to provide a flexible indication solution for indicating the channel bandwidth of the cell corresponding to the first SSB.

With reference to the thirtieth aspect, in some implementations of the thirtieth aspect, the method further includes: receiving, by the first network device, a first response message sent by the second network device, where the first response message is used to indicate whether the second network device successfully updates the state of the first SSB.

According to the communication method provided in this embodiment of this application, the first network device can receive the first response message sent by the second network device, and clearly learn, based on the first response message, whether the second network device successfully updates the state of the first SSB.

With reference to the thirtieth aspect, in some implementations of the thirtieth aspect, when the first response message is used to indicate that the second network device fails to update the state of the first SSB, the first response message carries first duration, used to indicate that the first network device can resend the first request message after the first duration.

According to the communication method provided in this embodiment of this application, if the first response message is used to indicate that the second network device fails to update the state of the first SSB, the first response message can carry the first duration, used to indicate that the first network device can resend the first request message after the first duration, to provide an implementation solution for the first network device to resend the first request message.

With reference to the thirtieth aspect, in some implementations of the thirtieth aspect, that the second network device maintains information about at least one SSB in the first network device includes: the second network device maintains identification information of the at least one SSB in the first network device, state information of the at least one SSB in the first network device, and channel bandwidth information of at least one cell corresponding to the at least one SSB in the first network device.

According to the communication method provided in this embodiment of this application, information that is about at least one SSB in a neighboring network device and that is maintained in the first network device includes a plurality of pieces of information, so that when a specific piece of information about the SSB changes, a state change of the SSB can be determined in time.

According to a thirty-first aspect, a communication method is provided. The communication method includes: receiving, by a second network device, a second request message sent by a first network device, where the second request message is used to request to hand over a terminal device from the first network device to the second network device, the second request message carries second indication information, the second indication information is used to indicate that a first synchronization signal and physical broadcast channel block SSB in the first network device is to be deactivated, and the second network device maintains information about at least one SSB in the first network device; and sending, by the second network device, a second response message to the first network device, where the second response message is used to indicate a status of resource preparation for the terminal device in the second network device.

According to the communication method provided in this embodiment of this application, the first network device may request to hand over the terminal device in the first network device from the first network device to the second network device, where the second request message carries the second indication information for indicating that the cause for handing over the terminal device from the first network device to the second network device is that the first SSB is to be deactivated, to provide the second network device with a cause for handing over the terminal device by the first network device, so that there is one additional reference factor when the second network device determines whether to receive the terminal device.

With reference to the thirty-first aspect, in some implementations of the thirty-first aspect, the method further includes: receiving, by the second network device, a first request message sent by the first network device, where the first request message carries first indication information for indicating the first SSB, the first request message is used to request the second network device to update a state of the first SSB, and the second network device maintains the information about the at least one SSB of the first network device.

According to the communication method provided in this embodiment of this application, after determining to deactivate the local first SSB, the first network device sends the first request message to the second network device, to request the second network device to update the state of the first SSB. That is, the second network device can learn of a use status of a resource occupied by a cell corresponding to the first SSB. If the resource occupied by the cell corresponding to the first SSB is released, the second network device can use the resource. In addition, the first request message carries the first indication information for indicating the first SSB, so that the second network device can accurately learn that the first SSB whose state needs to be updated or that needs to be activated is specifically which SSB, thereby improving accuracy of resource coordination.

With reference to the thirty-first aspect, in some implementations of the thirty-first aspect, the first request message carries the first indication information for indicating the first SSB, and the first indication information includes at least one of the following information: identification information of the first SSB, channel bandwidth information of a cell corresponding to the first SSB, or an SSB state list, where the SSB state list is a list of state information of an SSB in a network device to which the first SSB belongs, and the first SSB in the SSB state list is in a dormant state or an active state; or the SSB state list is a state list of the first SSB; or the SSB state list is a state list of a remaining SSB other than the first SSB in SSBs in a network device to which the first SSB belongs.

According to the communication method provided in this embodiment of this application, the first indication information for indicating the first SSB may be a plurality of pieces of optional information, thereby improving flexibility of the solution.

With reference to the thirty-first aspect, in some implementations of the thirty-first aspect, the identification information of the first SSB includes: a physical cell identifier of the first SSB; or a physical cell identifier of the first SSB and a radio frequency reference frequency of the first SSB; or a physical cell identifier of the first SSB and a new radio absolute radio frequency channel number of the first SSB; or a physical cell identifier of the first SSB, a new radio absolute radio frequency channel number of the first SSB, and an operating frequency band of a carrier on which the first SSB is located; or a new radio cell global identifier NCGI of the first SSB; or an identifier ID of the first SSB.

According to the communication method provided in this embodiment of this application, the identification information of the first SSB has a plurality of possible forms, that is, the SSB may be identified by using a plurality of pieces of information, to provide a flexible identification solution for identifying the SSB.

With reference to the thirty-first aspect, in some implementations of the thirty-first aspect, the channel bandwidth information of the cell corresponding to the first SSB includes at least one of the following information: information about a quantity of physical resource blocks PRBs occupied by a channel of the cell corresponding to the first SSB, a transmission bandwidth and a subcarrier spacing that are in a unit of a resource block, or a percentage of a channel bandwidth of the cell corresponding to the first SSB to a total channel bandwidth.

According to the communication method provided in this embodiment of this application, the channel bandwidth information of the cell corresponding to the first SSB has a plurality of possible forms, that is, the channel bandwidth of the cell corresponding to the first SSB may be indicated by using a plurality of pieces of information, to provide a flexible indication solution for indicating the channel bandwidth of the cell corresponding to the first SSB.

With reference to the thirty-first aspect, in some implementations of the thirty-first aspect, the method further includes: sending, by the second network device, a first response message to the first network device, where the first response message is used to indicate whether the second network device successfully updates the state of the first SSB.

According to the communication method provided in this embodiment of this application, the first network device can receive the first response message sent by the second network device, and clearly learn, based on the first response message, whether the second network device successfully updates the state of the first SSB.

With reference to the thirty-first aspect, in some implementations of the thirty-first aspect, when the first response message is used to indicate that the second network device fails to update the state of the first SSB, the first response message carries first duration, used to indicate that the first network device can resend the first request message after the first duration.

According to the communication method provided in this embodiment of this application, if the first response message is used to indicate that the second network device fails to update the state of the first SSB, the first response message can carry the first duration, used to indicate that the first network device can resend the first request message after the first duration, to provide an implementation solution for the first network device to resend the first request message.

With reference to the thirty-first aspect, in some implementations of the thirty-first aspect, that the second network device maintains information about at least one SSB in the first network device includes: the second network device maintains identification information of the at least one SSB in the first network device, state information of the at least one SSB in the first network device, and channel bandwidth information of at least one cell corresponding to at least one SSB in the first network device.

According to the communication method provided in this embodiment of this application, information that is about at least one SSB in a neighboring network device and that is maintained in the second network device includes a plurality of pieces of information, so that when a specific piece of information about the SSB changes, a state change of the SSB can be determined in time.

According to a thirty-second aspect, a communications apparatus is provided. The apparatus may be configured to perform an operation of the first network device according to any one of the thirtieth aspect and the possible implementations of the thirtieth aspect. Specifically, the communications apparatus includes a corresponding component (means) configured to perform the operations or functions described in the thirtieth aspect, and the component may be the first network device in the first aspect. The operations or the functions may be implemented by using software, hardware, or a combination of hardware and software.

According to a thirty-third aspect, a communications apparatus is provided. The apparatus may be configured to perform an operation of the second network device according to any one of the thirty-first aspect and the possible implementations of the thirty-first aspect. Specifically, the communications apparatus may include a corresponding component (means) configured to perform the operations or functions described in the second aspect, and the component may be the second network device in the thirty-first aspect. The operations or the functions may be implemented by using software, hardware, or a combination of hardware and software.

According to a thirty-fourth aspect, a communications device is provided. The communications device includes a processor, a transceiver, and a memory. The memory is configured to store a computer program. The transceiver is configured to perform the receiving and sending operations in the communication method according to any one of the possible implementations of the thirtieth or thirty-first aspect. The processor is configured to invoke the computer program from the memory and run the computer program, to enable the communications device to perform the communication method according to any one of the possible implementations of the thirtieth or thirty-first aspect.

Optionally, there are one or more processors, and there are one or more memories.

Optionally, the memory may be integrated with the processor, or the memory and the processor may be separately disposed.

Optionally, the transceiver includes a transmitter and a receiver.

In a possible design, a communications device is provided. The communications device includes a transceiver, a processor, and a memory. The processor is configured to control the transceiver to receive and send a signal. The memory is configured to store a computer program. The processor is configured to invoke the computer program from the memory and run the computer program, to enable the communications device to perform the method according to any one of the thirtieth aspect or the possible implementations of the thirtieth aspect.

In another possible design, a communications device is provided. The communications device includes a transceiver, a processor, and a memory. The processor is configured to control the transceiver to receive and send a signal. The memory is configured to store a computer program. The processor is configured to invoke the computer program from the memory and run the computer program, to enable the communications device to perform the method according to any one of the thirty-first aspect or the possible implementations of the thirty-first aspect.

According to a thirty-fifth aspect, a system is provided. The system includes the communications apparatuses provided in the thirty-second aspect and the thirty-third aspect.

According to a thirty-sixth aspect, a computer program product is provided. The computer program product includes a computer program (which may also be referred to as code or an instruction). When the computer program is run, a computer is enabled to perform the method according to any one of the possible implementations of the thirtieth aspect or the thirty-first aspect.

According to a thirty-seventh aspect, a computer-readable medium is provided. The computer-readable medium stores a computer program (which may also be referred to as code or an instruction). When the computer program is run on a computer, the computer is enabled to perform the method according to any one of the possible implementations of the thirtieth aspect or the thirty-first aspect.

According to a thirty-eighth aspect, a chip system is provided. The chip system includes a memory and a processor. The memory is configured to store a computer program. The processor is configured to invoke the computer program from the memory and run the computer program, to enable a communications device on which the chip system is installed to perform the method according to any one of the possible implementations of the thirtieth aspect or the thirty-first aspect.

According to the communication method provided in the embodiments of this application, after determining to deactivate or activate the first synchronization signal and physical broadcast channel block SSB, the first network device sends the first request message to the second network device, to request the second network device to update the state of the first SSB or activate the first SSB, so that the second network device can clearly learn of a resource occupation status of the SSB, thereby implementing resource coordination between the first network device and the second network device.

DESCRIPTION OF EMBODIMENTS

The following describes the technical solutions in this application with reference to the accompanying drawings.

The technical solutions in the embodiments of this application may be applied to various communications systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A network device in the embodiments of this application may be a device configured to communicate with a terminal device. The network device may be an evolved NodeB (eNB or eNodeB) in the LTE system, or may be a radio controller in a cloud radio access network (CRAN) scenario. Alternatively, the network device may be a relay station, an access point, a vehicle-mounted device, a wearable device, a network device in the future 5G network, a network device in a future evolved PLMN network, or the like. This is not limited in the embodiments of this application.

In the embodiments of this application, the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a function module that can invoke and execute the program in the terminal device or the network device.

Figure 1:
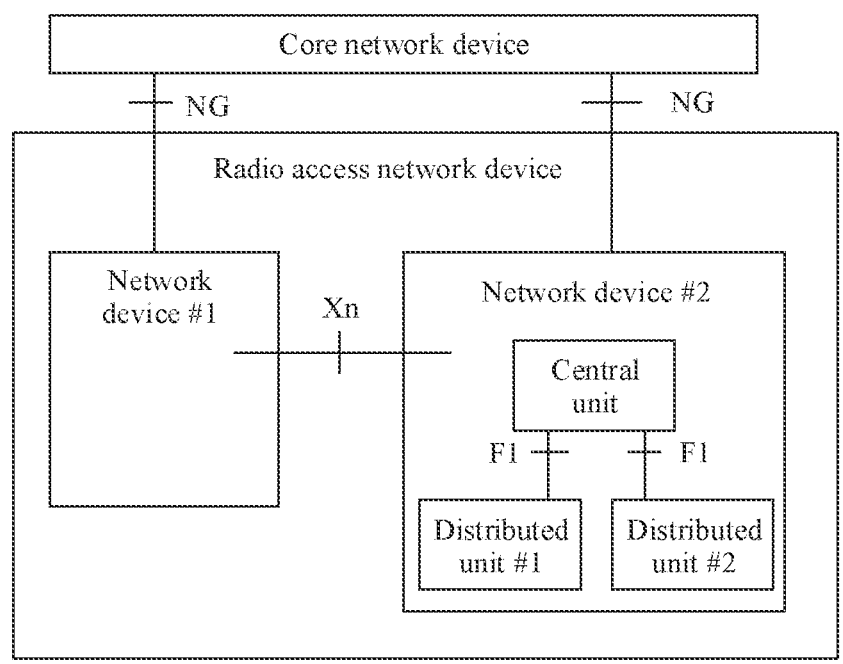
FIG. 1 is a schematic block diagram of a communications system to which embodiments of this application are applicable.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry an instruction and/or data. FIG. 1 is a schematic block diagram of a communications system to which embodiments of this application are applicable. The communications system includes a core network device, radio access network devices, and a central unit and a distributed unit in the radio access network device.

The core network device shown in FIG. 1 in the embodiments of this application may be core network devices in different communications systems, for example, a core network device in a 5G communications system or a core network device in an LTE communications system. The radio access network devices mainly include two network devices (a network device #1 and a network device #2 shown in FIG. 1).

Specifically, the network device #1 in FIG. 1 may be a base station (gNodeB, gNB) or an (ng-eNodeB, ng-eNB). The network device #2 may also be a gNB or an ng-eNB. The gNB provides a user plane protocol and function and a control plane protocol and function of NR for a terminal device, and the ng-eNB provides a user plane protocol and function and a control plane protocol and function of evolved universal terrestrial radio access (E-UTRA) for the terminal device. Interfaces between gNBs, between a gNB and an ng-eNB, and between an ng-eNB and a gNB are all Xn interfaces. An interface between the radio access network device and the core network device is referred to as an NG interface.

Specifically, the gNB or the ng-eNB may include a central unit (CU) and a distributed unit (DU). Specifically, one radio access network device may include one central unit and a plurality of distributed units (a distributed unit #1 and a distributed unit #2 shown in FIG. 1).

Further, a CU device processes protocol stack functions of wireless higher layers such as a radio resource control (RRC) layer and a packet data convergence protocol (PDCP) layer; and may even support sinking of some core network functions to an access network, which is referred to as an edge computing network, to meet higher network delay requirements of future communications networks for emerging services (for example, a video, online shopping, and virtual/augmented reality). Due to changes in communications network elements and structures, protocol stacks are adjusted and changed accordingly. Therefore, for naming of a next-generation network, 5G NR vividly shows disruptive changes in 5G networks in the future. The CU covers some functions of a radio access network higher layer protocol stack and a core network, and related main protocol layers include an RRC function, a service discovery application protocol (SDAP), and a packet data convergence protocol (PDCP) sublayer function. The DU covers some functions of a baseband processing physical layer and a layer 2. Specifically, the DU implements a radio frequency processing function and baseband processing functions of radio link control (RLC), media access control (MAC), a physical layer (PHY), and the like. CUs may be deployed in a centralized manner. Deployment of DUs depends on an actual network environment. In a core urban area with high traffic density, a relatively small station spacing, and limited computer room resources, such as a university or a large-scale performance venue, the DUs may also be deployed in a centralized manner. However, in a region with sparse traffic, a relatively large station spacing, and the like, such as a suburban county or a mountainous area, the DUs may be deployed in a distributed manner.

It should be understood that FIG. 1 is merely a schematic scenario diagram. A communication method provided in the embodiments of this application may be applied to resource coordination between the network device #1 and the network device #2 shown in FIG. 1 and resource coordination between a plurality of distributed units in the network device #2 shown in FIG. 1, and may be further applied to resource coordination between other network devices. Examples are not provided one by one herein for description.

To facilitate understanding of the communication method provided in this application, the following briefly describes several basic concepts in the embodiments of this application.

1. SSB

An SSB in this application includes a PSS, an SSS, and a PBCH. The SSB occupies four symbols in time domain and 240 subcarriers in frequency domain. A terminal device may obtain a physical layer cell identifier (identifier, ID) and slot synchronization by using the PSS. The terminal device may obtain a cyclic prefix (CP) length, a physical cell group ID, and frame synchronization by using the SSS. The terminal device can obtain a master information block (MIB) by decoding the PBCH, including configuration information of a quantity of common antenna ports, configuration information of a system frame number (SFN), configuration information of a downlink system bandwidth, and configuration information of physical hybrid automatic repeat request indication information (PHICH).

Specifically, when one SSB is associated with remaining minimum system information (RMSI), the SSB corresponds to an independent cell, and the cell has a unique NR cell global identifier (NCGI). In this case, such an SSB is referred to as a cell-defining SSB (CD-SSB). Only the CD-SSB can be used to send a master information block (MIB) message and a system information block 1 (SIB1) message, and when performing cell selection, UE performs access based only on a synchronization signal of the CD-SSB. Another SSB can be used to send only a MIB message and cannot be used to send a SIB1 message.

It should be understood that a type of the SSB is not limited in this application, and the type includes the foregoing CD-SSB and an SSB other than the CD-SSB. It can be learned from the foregoing description that the SSB is of great significance in a cell search process of the terminal device. Therefore, for a communications system, a resource occupied by a cell corresponding to an SSB is very valuable. If resources occupied by cells corresponding to SSBs in different network devices can be coordinated, a conflict of resources occupied by cells corresponding to different SSBs can be reduced, and performance of the entire communications system can be improved. Therefore, how to coordinate resources occupied by cells corresponding to SSBs becomes an urgent problem to be resolved. Details are described below when specific embodiments of this application are described.

It should be further understood that a basic concept of the SSB is already defined in detail in an existing protocol. This application merely briefly describes the SSB. The foregoing descriptions of the SSB cannot limit the protection scope of this application, but are merely intended to enhance understanding of the embodiments of this application.

2. SSB Information

This application proposes a concept of SSB information. Specifically, the SSB information is used by one network device to indicate to another network device that a state of a local SSB changes, or used by one network device to indicate to another network device that one or more SSBs of the another network device need to be activated. Proposal of the SSB information is an important contribution of this application. The following describes in detail a specific representation form of the SSB information by using an example.

(1) SSB ID

Specifically, the SSB information may explicitly indicate one or more SSBs. The explicit indication manner includes directly indicating an ID of the SSB. For example, the network device #1 includes 10 SSBs (an SSB #1 to an SSB #10), and relative identifiers of the 10 SSBs in the network device #1 are respectively an ID #1 to an ID #10. If the network device #1 needs to indicate to the network device #2 that the SSB #1 in the 10 SSBs is updated from an active state to a dormant state, the SSB information sent by the network device #1 to the network device #2 may be the ID #1.

(2) PCI of a Cell Corresponding to the SSB

Specifically, the SSB information may indirectly indicate one or more SSBs. The indirect indication manner includes implicitly indicating a PCI of the one or more SSBs. It may be understood that, because each SSB corresponds to one PCI, when a PCI of one SSB is indicated, the SSB may be indirectly determined. For example, the network device #1 includes 10 SSBs (an SSB #1 to an SSB #10), and PCIs of cells corresponding to the 10 SSBs are respectively a PCI #1 to a PCI #10. If the network device #1 needs to indicate to the network device #2 that the SSB #1 in the 10 SSBs is updated from an active state to a dormant state, the SSB information sent by the network device #1 to the network device #2 may be the PCI #1.

It should be understood that each SSB corresponds to one PCI, and PCIs of cells corresponding to a plurality of SSBs may be the same or different. When the SSB information includes only the PCI of the SSB, this application is mainly specific to a case in which PCIs of cells corresponding to SSBs are different.

(3) Radio Frequency Reference Frequency of the SSB

Specifically, the SSB information may indirectly indicate one or more SSBs. The indirect indication manner includes implicitly indicating a radio frequency reference frequency (RF) of the one or more SSBs. It may be understood that because each SSB corresponds to one radio frequency reference frequency, the radio frequency reference frequency of the SSB is used to identify a location of the SSB, that is, a frequency of the SSB. Specifically, the radio frequency reference frequency may be indicated by an NR absolute radio frequency channel number.

If a radio frequency reference frequency of one SSB is indicated, the SSB may be indirectly determined. For example, the network device #1 includes 10 SSBs (an SSB #1 to an SSB #10), and RFs corresponding to the 10 SSBs are respectively an RF #1 to an RF #10. If the network device #1 needs to indicate to the network device #2 that the SSB #1 in the 10 SSBs is updated from an active state to a dormant state, the SSB information sent by the network device #1 to the network device #2 may be the RF #1.

(4) NR Absolute Radio Frequency Channel Number (NR-ARFCN) of the SSB

The radio frequency reference frequency in (3) may be indicated by an NR absolute radio frequency channel number, that is, when information about an SSB is a radio frequency reference frequency of the SSB, the radio frequency reference frequency may be further understood as an NR absolute radio frequency channel number of the SSB.

Specifically, when the SSB is indicated by the NR absolute radio frequency channel number of the SSB, this is similar to indication of the SSB by using the radio frequency reference frequency of the SSB in (3) above, and details are not described herein again.

(5) Operating Frequency Band of a Carrier on which the SSB is Located

Specifically, the SSB information may indirectly indicate one or more SSBs. The indirect indication manner includes implicitly indicating an operating frequency band of a carrier on which one or more SSBs are located. It may be understood that, because each SSB has a corresponding operating frequency band of a carrier, when an operating frequency band of a carrier on which one SSB is located is indicated, the SSB may be indirectly determined. For example, the network device #1 includes 10 SSBs (an SSB #1 to an SSB #10), and operating frequency bands of carries on which the 10 SSBs are located are respectively an operating frequency band #1 to an operating frequency band #10. If the network device #1 needs to indicate to the network device #2 that the SSB #1 in the 10 SSBs is updated from an active state to a dormant state, the SSB information sent by the network device #1 to the network device #2 may be the operating frequency band #1.

It should be understood that, in a frequency range of one carrier, a plurality of SSBs may be transmitted. When the SSB information includes only an operating frequency band of a carrier on which an SSB is located, this application is mainly specific to a case in which operating frequency bands corresponding to SSBs are different.

(6) NCGI of the SSB

When the SSB is described above, a concept of CD-SSB is proposed. It is known that a CD-SSB corresponds to a single cell, and the cell has a unique NCGI.

Therefore, for the CD-SSB, the SSB information may indirectly indicate one or more CD-SSBs. The indirect indication manner includes implicitly indicating an NCGI of the one or some CD-SSBs. It may be understood that, because each CD-SSB has a corresponding NCGI, when an NCGI of one SSB is indicated, the SSB may be indirectly determined. For example, the network device #1 includes 10 SSBs (an SSB #1 to an SSB #10), and NCGIs of the 10 SSBs are respectively an NCGI #1 to an NCGI #10. If the network device #1 needs to indicate to the network device #2 that the SSB #1 in the 10 SSBs is updated from an active state to a dormant state, the SSB information sent by the network device #1 to the network device #2 may be the NCGI #1.

(7) Quantity of Physical Resource Blocks (PRB) Occupied by a Channel of a Cell Corresponding to the SSB Specifically, the SSB information may indirectly indicate channel bandwidth information of a cell corresponding to one or more SSBs. A quantity of PRBs occupied by a channel of the cell corresponding to the SSB may be used to identify a channel bandwidth of the cell corresponding to the SSB. Therefore, the SSB information may be the quantity of PRBs occupied by the channel of the cell corresponding to the SSB. For example, the network device #1 includes 10 SSBs (an SSB #1 to an SSB #10), and quantities of PRBs occupied by channels of 10 cells corresponding to the 10 SSBs are respectively a PRB #1 to a PRB #10. If the network device #1 needs to indicate to the network device #2 that the SSB #1 in the 10 SSBs is updated from an active state to a dormant state, the SSB information sent by the network device #1 to the network device #2 may be the PRB #1.

(8) Transmission Bandwidth and Subcarrier Spacing that are in a Unit of a Resource Block.

Specifically, the SSB information may indirectly indicate channel bandwidth information of a cell corresponding to one or more SSBs. A channel bandwidth of the cell corresponding to the SSB may be represented by a transmission bandwidth and a subcarrier spacing that are in a unit of a resource block. Therefore, the SSB information may be the transmission bandwidth and the subcarrier spacing that are in a unit of a resource block. For example, the network device #1 includes 10 SSBs (an SSB #1 to an SSB #10), and channel bandwidths of 10 cells corresponding to the 10 SSBs are respectively represented by transmission bandwidths and subcarrier spacings 1 to 10 that are in a unit of a resource block. If the network device #1 needs to indicate to the network device #2 that the SSB #1 in the 10 SSBs is updated from an active state to a dormant state, the SSB information sent by the network device #1 to the network device #2 may be 1.

(9) Percentage of a Channel Bandwidth of a Cell Corresponding to the SSB to a Total channel bandwidth Specifically, the SSB information may indirectly indicate channel bandwidth information of a cell corresponding to one or more SSBs. A channel bandwidth of the cell corresponding to the SSB may be represented by a percentage of the channel bandwidth to a total channel bandwidth. Therefore, the SSB information may be the percentage of the channel bandwidth of the cell corresponding to the SSB to the total channel bandwidth. For example, the network device #1 includes 10 SSBs (an SSB #1 to an SSB #10), and percentages of channel bandwidths of 10 cells corresponding to the 10 SSBs to the total channel bandwidth are respectively represented by 1% to 10%. If the network device #1 needs to indicate to the network device #2 that the SSB #1 in the 10 SSBs is updated from an active state to a dormant state, the SSB information sent by the network device #1 to the network device #2 may be 1% The total channel bandwidth is a preset value.

(10) List of State Information of at Least One SSB in a Network Device to which an SSB Belongs, and the SSB in the State List of the SSB is in a Dormant State or an Active State.

Specifically, the SSB information may directly indicate a state of one or more SSBs in the list of SSB state information. For example, an SSB #1 belongs to the network device #1, the network device #1 includes a total of 10 SSBs (an SSB #1 to an SSB #10), and state information of the 10 SSBs may be the active state or the dormant (inactive or dormant) state. If the network device #1 needs to indicate to the network device #2 that the SSB #1 in the 10 SSBs is updated from an active state to a dormant state, the SSB information sent by the network device #1 to the network device #2 may be the list of SSB state information in the network device #1, and a state of the SSB #1 that is marked in the list is the dormant state.

It is assumed that before the network device #1 updates the state of the SSB #1, the list of SSB state information in the network device #1 is a case shown in the following Table 1.

TABLE 1

| SSB state table | |
|---|---|
| SSB | State |
| SSB #1 | active |
| SSB #2 | active |
| SSB #3 | active |

TABLE 1-continued

SSB state table

| SSB | State |
|---|---|
| SSB #4 | active |
| SSB #5 | active |
| SSB #6 | active |
| SSB #7 | active |
| SSB #8 | active |
| SSB #9 | active |
| SSB #10 | active |

In this case, before the network device #1 indicates to the network device #2 that the SSB #1 in the 10 SSBs is updated from the active state to the dormant state, state information that is of the at least one SSB in the network device #1 and that is maintained in the network device #2 is shown in Table 1.

Further, the SSB information sent by the network device #1 to the network device #2 may be the list of SSB state information in the network device #1, and the state of the SSB #1 is marked as the dormant state in the list, as shown in the following Table 2.

TABLE 2

SSB state table

| SSB | State |
|---|---|
| SSB #1 | inactive or dormant |
| SSB #2 | active |
| SSB #3 | active |
| SSB #4 | active |
| SSB #5 | active |
| SSB #6 | active |
| SSB #7 | active |
| SSB #8 | active |
| SSB #9 | active |
| SSB #10 | active |

The network device #2 may determine, based on the received Table 2, that the SSB #1 in the network device #1 is updated from the active state to the dormant state.

(11) SSB State List

Specifically, the SSB information may directly indicate a state of one or more SSBs. For example, an SSB #1 belongs to the network device #1, the network device #1 includes a total of 10 SSBs (the SSB #1 to an SSB #10), and state information of the 10 SSBs may be an active state or a dormant state. If the network device #1 needs to indicate to the network device #2 that the SSB #1 in the 10 SSBs is updated from the active state to the dormant state, the SSB information sent by the network device #1 to the network device #2 may be the state of the SSB #1 in the network device #1.

It is assumed that before the network device #1 updates the state of the SSB #1, a list of SSB state information in the network device #1 is a case shown in Table 1 above. In this case, before the network device #1 indicates to the network device #2 that the SSB #1 in the 10 SSBs is updated from the active state to the dormant state, state information that is of the at least one SSB in the network device #1 and that is maintained in the network device #2 is shown in Table 1.

Further, the SSB information sent by the network device #1 to the network device #2 may be the state of the SSB #1 in the network device #1, as shown in the following Table 3

TABLE 3

State of the SSB #1

| SSB | State |
|---|---|
| SSB #1 | inactive or dormant |

The network device #2 may determine, based on the received Table 3, that the SSB #1 in the network device #1 is updated from the active state to the dormant state.

(12) State List of Other SSBs

Specifically, the SSB information may indirectly indicate a state of one or more SSBs. For example, an SSB #1 belongs to the network device #1, the network device #1 includes a total of 10 SSBs (the SSB #1 to an SSB #10), and state information of the 10 SSBs may be an active state or a dormant state. If the network device #1 needs to indicate to the network device #2 that the SSB #1 in the 10 SSBs is updated from the active state to the dormant state, the SSB information sent by the network device #1 to the network device #2 may be states of the SSB #2 to the SSB #9 other than the SSB #1 in the network device #1.

It is assumed that before the network device #1 updates the state of the SSB #1, the list of SSB state information in the network device #1 is a case shown Table 1 above. In this case, before the network device #1 indicates to the network device #2 that the SSB #1 in the 10 SSBs is updated from the active state to the dormant state, state information that is of the at least one SSB in the network device #1 and that is maintained in the network device #2 is shown in Table 1.

Further, the SSB information sent by the network device #1 to the network device #2 may be the states of the SSB #2 to the SSB #9 other than the SSB #1 in the network device #1, as shown in the following Table 4.

TABLE 4

Table of the states of the SSB #2 to the SSB #9

| SSB | State |
|---|---|
| SSB #2 | active |
| SSB #3 | active |
| SSB #4 | active |
| SSB #5 | active |
| SSB #6 | active |
| SSB #7 | active |
| SSB #8 | active |
| SSB #9 | active |
| SSB #10 | active |

The network device #2 may determine, based on the received Table 4 and the maintained Table 1, that the SSB #1 in the network device #1 is updated from the active state to the dormant state.

It can be learned from the foregoing descriptions of the possible forms of each piece of SSB information that (1) to (6) are mainly used to identify the SSB in terms of definition. Therefore, the six types of SSB information shown in (1) to (6) may be collectively referred to as SSB identification information. It should be understood that there is other identification information that can identify the SSB. The foregoing six types of SSB identification information in (1) to (6) are merely examples, and cannot limit the protection scope of this application. Other identification information that can identify the SSB also falls within the protection scope of this application. (7) to (9) are mainly used to indicate the channel bandwidth of the cell corresponding to an SSB in terms of definition. Therefore, the three types of SSB information shown in (7) to (9) may be collectively referred to as channel bandwidth information of the cell corresponding to the SSB. It should be understood that there is other information that can indicate the channel bandwidth of the cell corresponding to the SSB. The foregoing three types of information for indicating the channel bandwidth of the cell corresponding to the SSB in (7) to (9) are merely examples, and cannot limit the protection scope of this application. Other information that can indicate the channel bandwidth of the cell corresponding to the SSB also falls within the protection scope of this application. (10) to (12) are mainly used to indicate the state of the SSB in terms of definition. Therefore, the three types of SSB information shown in (10) to (12) may be collectively referred to as an SSB state list. It should be understood that there is other information that can be used to indicate the state of the SSB. The foregoing three types of information that are used to indicate the state of the SSB in (10) to (12) are merely examples, and cannot limit the protection scope of this application. Other information that can be used to indicate the state of the SSB also falls within the protection scope of this application.

It should be further understood that, in the possible form of each piece of SSB information in the foregoing example, a provided specific example cannot limit the protection scope of this application. For example, a quantity of SSBs in the network device #1 in the foregoing example may not be 10, and a quantity of SSBs whose states change in the network device #1 may not be 1. Alternatively, the SSB #1 may not be activated or deactivated, or the SSB may be used to indicate an SSB that needs to be activated in the network device #2. When the network device #1 indicates, to the network device #2, the SSB that needs to be activated in the SSB in the network device #2, specific SSB information is described in (1) to (12) above, and details are not described herein again.

It should be further understood that the SSB information may be any one of the information described in (1) to (12) above, or the SSB information may be a combination of any two or more pieces of information in the information described in (1) to (12) above. The SSB has many possible forms, which are not listed one by one herein.

3. Deactivation of an SSB

Specifically, deactivation of an SSB (deactivate SSB, or switch off SSB) in this application means that an SSB changes from an active state to a dormant state. That the SSB is in the active state only indicates that a cell corresponding to the SSB can be used to receive and/or send data. That the SSB corresponding to the cell that can be used to receive and/or send data is referred to as an SSB in the active state is merely an example, and may also be referred to as an SSB in a working state, a non-dormant state, or the like. Similarly, that the SSB is in the dormant state only indicates that the cell corresponding to the SSB cannot be used to receive and/or send data at a current moment, and that the SSB corresponding to the cell that cannot be used to receive and/or send data at the current moment is referred to as an SSB in the dormant state is merely an example, and may also be referred to as an SSB in an inactive state, or the like. In other words, a focus of this application is not on how to refer to different SSB states, and the name may be any name in the conventional technology, or may be a possible name in a future technology. This is not limited in this application.

4. Activation of an SSB

Specifically, activation of an SSB (activate SSB, or switch on SSB) in this application means that an SSB changes from a dormant state to an active state.

5. SSB Load Information

The SSB load information in this application may be radio resource usage information of a cell corresponding to an SSB, for example, uplink/downlink guaranteed bit rate physical resource block (UU/DL GBR PRB) usage, uplink/downlink non-guaranteed bit rate physical resource block (UL/DL non-GBR PRB) usage, and total UL/DL PRB usage. The SSB load information may alternatively be a hardware load indicator of the cell corresponding to the SSB, for example, a UL/DL hardware load indicator (low, medium, high, or overloaded). The SSB load information may alternatively be a software load indicator of the cell corresponding to the SSB, for example, a UL/DL software load indicator (low, medium, high, or overloaded). The SSB load information may alternatively be a capacity value of the cell corresponding to the SSB, for example, a percentage of an available UL/DL capacity to a total capacity. The SSB load information may alternatively be overload state indication information of the cell corresponding to the SSB, and the overload state indication information of the cell corresponding to the SSB is used to indicate that the cell corresponding to the SSB is in an overloaded state or a non-overloaded state. For ease of understanding, the following briefly describes load of the cell corresponding to the SSB and a load status of the cell corresponding to the SSB in this application by using an example in which the SSB load information is the radio resource usage information of the cell corresponding to the SSB.

A ratio of radio resources used for data transmission in the cell corresponding to the SSB to all radio resources owned by the cell corresponding to the SSB is referred to as the load of the cell corresponding to the SSB, and the ratio is compared with a preset ratio threshold (the preset ratio threshold may be a low load threshold or a high load threshold). When the load is greater than or equal to the preset high load threshold, it is referred to as that the load of the cell corresponding to the SSB is high, and when the load is less than or equal to the preset low load threshold, it is referred to as that the load of the cell corresponding to the SSB is low. When radio resources occupied by data that needs to be transmitted exceed all the radio resources of the cell corresponding to the SSB, it is referred to as that the load of the cell corresponding to the SSB is in the overloaded state.

For example, a quantity of PRBs of a cell corresponding to one SSB is 100, and the preset low load threshold is 20%. A resource of the cell corresponding to the SSB needs to be used to transmit first data, and two PRBs need to be occupied to transmit the first data. In this case, a ratio of radio resources used by the data transmitted on the resource of the cell corresponding to the SSB to all radio resources of the cell corresponding to the SSB is 2%. In this case, load of the cell corresponding to the SSB is low, and the SSB may be deactivated. Alternatively, for another example, a quantity of PRBs of a cell corresponding to one SSB is 100, and the preset high load threshold is 70%. First data needs to be transmitted on a resource of the cell corresponding to the SSB, and 80 PRBs need to be occupied to transmit the first data. In this case, a ratio of radio resources used by the data transmitted on the resource of the cell corresponding to the SSB to all radio resources of the cell corresponding to the SSB is 80%. In this case, load of the cell corresponding to the SSB is very high, and if other data needs to be transmitted, to ensure transmission performance, a cell corresponding to an SSB may need to be activated to transmit the to-be-transmitted data. Alternatively, first data needs to be transmitted on a resource of a cell corresponding to an SSB, and 101 PRBs need to be occupied to transmit the first data. In this case, the cell corresponding to the SSB cannot be used to perform a function of transmitting the first data. In this case, load of the cell corresponding to the SSB is in the overloaded state.

The cell corresponding to the SSB may be understood as that an SSB needs to be sent in each cell, and the SSB is used by the terminal device to perform synchronization. The resource of the cell is notified to the terminal device by using the SSB, and the resource occupied by the SSB is a part of the resource of the corresponding cell.

The foregoing describes the application scenarios of the embodiments of this application and some concepts in the embodiments of this application. It can be learned from the foregoing descriptions that, in an existing 5G communications system, the SSB is mainly applied to a cell search process of the terminal device. For example, as described above, the terminal device completes a downlink synchronization process by using a PSS and an SSS, and the terminal device decodes a PBCH to obtain a MIB. In other words, an existing communication protocol provides only a definition and a purpose of the SSB, but does not describe how to coordinate a system resource occupied by the cell corresponding to the SSB. It should be understood that, in a communications system, each piece of information occupies a specific system resource, and there is no exception for an SSB. In the communications system, cells corresponding to different SSBs occupy different resources. The resource occupied by the cell corresponding to the SSB may be a time domain resource occupied by the cell corresponding to the SSB, a PCI of the cell corresponding to the SSB, or the like. In this case, cells corresponding to SSBs in different network devices in the communications system occupy different system resources. If a resource occupied by a cell corresponding to an SSB in a network device can be released, and another network device in the communications system can learn that the resource occupied by the cell corresponding to the SSB is released, the network device may use the released resource. Therefore, coordination of resources occupied by the cells corresponding to the SSBs can be performed between the different network devices in the communications system. This application provides a communication method and a communications apparatus. After determining to deactivate or activate an SSB in the network device or another network device in a communications system, the network device in the communications system sends a request message to the another network device in the communications system, to request the another network device in the communications system to update a state of the SSB or activate the SSB, that is, different network devices in the communications system can learn of a status of a resource occupied by a cell corresponding to the SSB, so that the different network devices can determine that the resource can be used when learning that the resource occupied by the cell corresponding to the SSB is released, or the different network devices can avoid use of the resource when learning that a part of a resource is occupied by the cell corresponding to the SSB.

For ease of description, load of the cell corresponding to the SSB may be referred to as load of the SSB for short, a load state of the cell corresponding to the SSB may be referred to as a load state of the SSB for short, the resource occupied by the cell corresponding to the SSB may be referred to as a resource occupied by the SSB for short, and a PCI of the cell corresponding to the SSB may be referred to as a PCI corresponding to the SSB for short below.

The following describes in detail the communication method provided in the embodiments of this application.

Specifically, the communication method provided in the embodiments of this application may be applied to resource coordination between a plurality of different network devices. The following uses resource coordination between two network devices as an example to describe the communication method provided in the embodiments of this application. The two network devices are neighboring network devices of each other, that is, a second network device maintains information about at least one SSB in the first network device, and the first network device maintains information about at least one SSB in the second network device.

For example, that the first network device maintains information about at least one SSB in the second network device includes:

the first network device maintains identification information of the at least one SSB in the second network device;

the first network device maintains state information of the at least one SSB in the second network device; and the first network device maintains channel bandwidth information of at least one cell corresponding to the at least one SSB in the second network device.

For example, that the second network device maintains information about at least one SSB in the first network device includes:

the second network device maintains identification information of the at least one SSB in the first network device;

the second network device maintains state information of the at least one SSB in the first network device; and the second network device maintains channel bandwidth information of at least one cell corresponding to the at least one SSB in the first network device.

Figure 2:
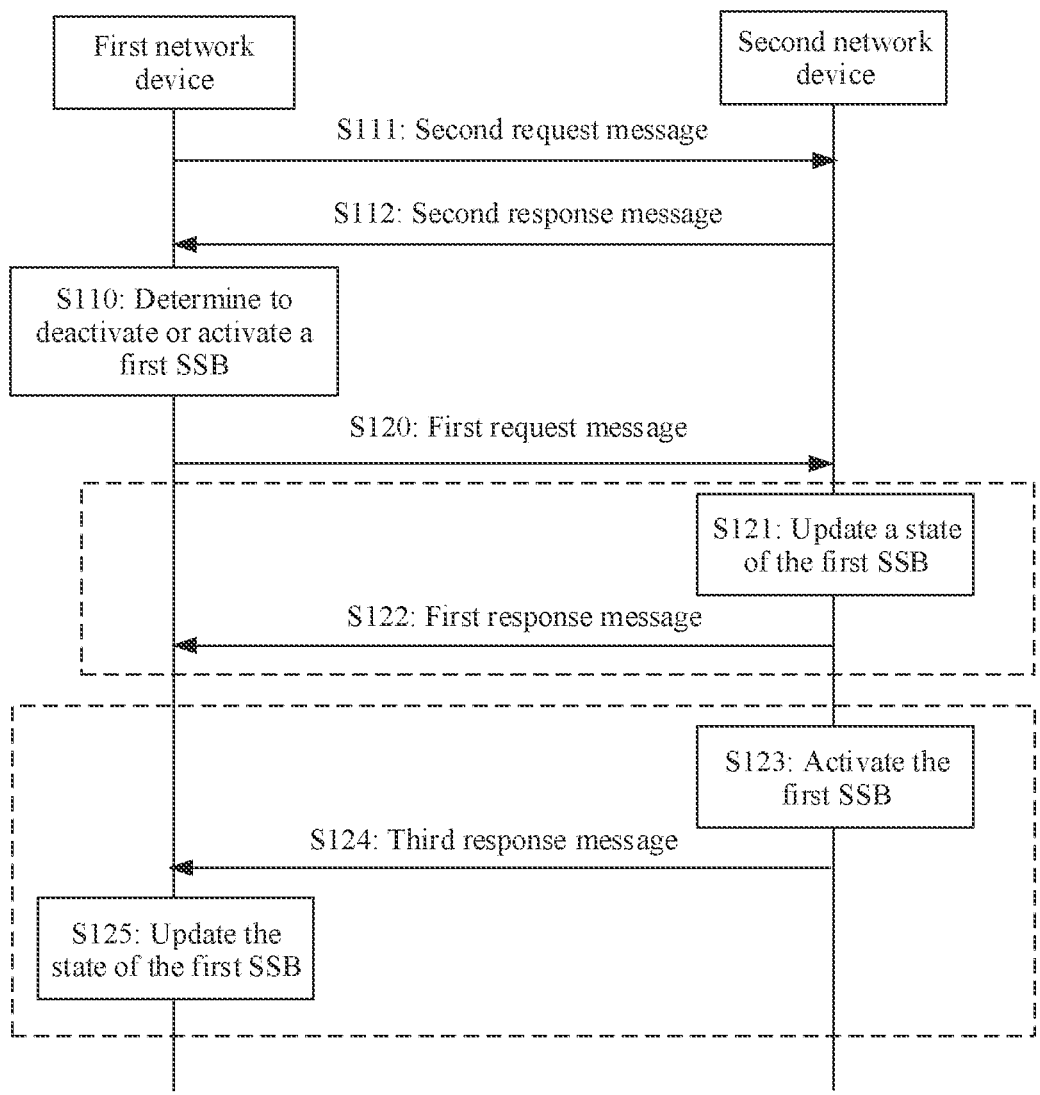
FIG. 2 is a schematic flowchart of a communication method according to an embodiment of this application.

FIG. 2 is a schematic flowchart of a communication method according to an embodiment of this application. The communication method includes operations S110 and S120 involving a first network device and a second network device. Operations S110 and S120 are described in detail below with reference to FIG. 2.

S110: The first network device determines to deactivate or activate a first SSB.

Case 1:

The first network device determines to deactivate (deactivate or switch off) or activate (activate or switch on) the first SSB in the first network device. For example, the first network device has a total of 10 SSBs (an SSB #1 to an SSB #10). If the SSB #1 is in an active state, that the first network device determines to deactivate the SSB #1 in the 10 SSBs means that the SSB #1 changes from the active state to a dormant state. If the SSB #1 is in the dormant state, that the first network device determines to activate the SSB #1 in the 10 SSBs means that the SSB #1 changes from the dormant state to the active state.

Further, when the first network device determines to deactivate the first SSB in the first network device, after the first network device deactivates the first SSB, power consumption for sending the SSB can be reduced, thereby reducing energy consumption of the first network device. For example, in a building deployment scenario, different SSBs point to different areas: a higher floor, a middle floor, and a lower floor. To deactivate the first SSB, a radio frequency channel corresponding to the first SSB may be disabled, thereby reducing energy consumption of the first network device. For a terminal device, a radio frequency bandwidth and search complexity for detecting the SSB can be reduced, thereby reducing energy consumption of the terminal device. In other words, according to the communication method provided in this embodiment of this application, w % ben the first network device deactivates the local SSB, energy consumption of the first network device can be reduced, and the radio frequency bandwidth and search complexity for detecting the SSB by the terminal device can be reduced.

It should be understood that, in this embodiment of this application, only an example in which the first network device determines to deactivate or activate one SSB in the first network device is used for description. In an actual application process of the communication method provided in this embodiment of this application, the first network device may determine to deactivate or activate one or more SSBs in the first network device. However, a method procedure of determining to deactivate or activate a plurality of SSBs in the first network device is similar to a method procedure of determining to deactivate or activate one SSB in the first network device. For ease of description, an example in which it is determined to deactivate or activate one SSB in the first network device is used for description in this specification. Details about a case in which it is determined to deactivate or activate the plurality of SSBs in the first network device are not described in this application.

For example, when the first SSB is an SSB in the first network device, that the first network device determines to deactivate or activate the first SSB includes:

The first network device determines, based on load information in the first network device, to deactivate or activate the first SSB.

For example, when the load information in the first network device indicates that DL GBR PRB usage of a cell corresponding to the first SSB is lower than a threshold, the first SSB may be deactivated, and a resource occupied by the cell corresponding to the first SSB is released, to be used by a cell corresponding to an SSB that is in another network device and that occupies the same resource as the cell corresponding to the first SSB. For another example, when the load information in the first network device indicates that there is data that needs to be sent and/or received by using the first SSB, the first network device determines that the first SSB needs to be activated, so that data can be sent and/or received by using the first SSB.

For example, when the first SSB is an SSB in the first network device, that the first network device determines to deactivate or activate the first SSB includes:

The first network device receives SSB deactivation or activation indication information, where the SSB deactivation or activation indication information is used to indicate the first network device to deactivate or activate the first SSB.

For example, the first network device receives the first SSB deactivation indication information, deactivates the first SSB based on the received indication information, and releases a resource occupied by the cell corresponding to the first SSB, to be used by a cell corresponding to an SSB that is in another network device and that occupies the same resource as the cell corresponding to the first SSB. For another example, the first network device receives the first SSB activation indication information, and activates the first SSB based on the received indication information, so that data can be sent and/or received by using the first SSB. The first network device may receive the SSB deactivation or activation indication information from an operation, administration and maintenance (OAM) device; or the first network device may receive the SSB deactivation or activation indication information from a core network device; or the first network device may receive the SSB deactivation or activation indication information from another network device.

It should be understood that the foregoing determining, by the first network device based on the load information in the first network device or the received SSB deactivation or activation indication information, to deactivate or activate the first SSB is merely an example to describe a case in which the first network device may determine to deactivate or activate the first SSB, and does not constitute any limitation on this application. Another case in which the first network device can determine to deactivate or activate the SSB also falls within the protection scope of this application.

Case 2:

The first network device determines to activate the first SSB in an SSB in the second network device. For example, the second network device has a total of 10 SSBs (an SSB #1 to an SSB #10). If the SSB #1 in the second network device is in a dormant state, that the first network device determines to activate the SSB #1 in the 10 SSBs in the second network device means that the first network device requests the second network device to change the SSB #1 from the dormant state to an active state.

It should be understood that, in this embodiment of this application, only an example in which the first network device determines to activate one SSB in the second network device is used for description. In an actual application process of the communication method provided in this embodiment of this application, the first network device may determine to activate one or more SSBs in the second network device. However, a method procedure of determining to activate a plurality of SSBs in the second network device is similar to a method procedure of determining to activate one SSB in the second network device. For ease of description, an example in which it is already determined to activate one SSB in the second network device is used for description in this specification. Details about a case in which the first network device determines to activate the plurality of SSBs in the second network device are not described in this application.

For example, when the first SSB is an SSB in the SSB in the second network device, that the first network device determines to activate the first SSB includes:

The first network device determines, based on load information in the first network device, that the first SSB in the second network device needs to be activated.

For example, the load information in the first network device indicates that the SSB is in an overloaded state, and the first network device learns, based on SSB information that is in the second network device and that is maintained by the first network device, that the first SSB in the second network device can help a local SSB to share load. Further, the first network device requests the second network device to activate the first SSB for load balancing.

For example, when the first SSB is an SSB in the SSB in the second network device, that the first network device determines to activate the first SSB includes:

The first network device determines, based on coverage information of the first network device, that the first SSB in the second network device needs to be activated. The first network device may learn of a coverage status of the first network device based on measurement information reported by the terminal device. The coverage status of the first network device may be information indicating whether a hole exists in coverage of the first network device, or may be coverage quality of the first network device. In addition, the first network device can learn, based on historical measurement information, of coverage that can be provided by the SSB in the second network device.

For example, the coverage information of the first network device indicates that coverage quality provided by an SSB in the first network device is relatively poor, and the first network device maintains information about the SSB in the second network device, and can learn, based on the historical measurement information, of coverage that can be provided by the SSB in the second network device. If the first network device determines that a coverage area provided by an SSB in the first network device is similar to a coverage area that can be provided by the first SSB in the second network device, the first network device requests the second network device to activate the first SSB, to improve coverage quality. The historical measurement information may include the coverage area of the SSB in the second network device.

For example, when the first SSB is an SSB in the second network device, that the first network device determines to activate the first SSB includes:

The first network device receives SSB activation indication information, where the SSB activation indication information is used to indicate to activate the first SSB in the second network device.

For example, the first network device receives indication information for activating the first SSB in the second network device, and activates the first SSB in the second network device based on the received indication information. The first network device may receive the SSB activation indication information from an OAM device; or the first network device may receive SSB deactivation or activation indication information from a core network device; or the first network device may receive SSB deactivation or activation indication information from another network device.

It should be understood that the foregoing determining, by the first network device based on the load information in the first network device or the received SSB activation indication information, the coverage information of the first network device, to activate the first SSB in the second network device is merely an example to describe a case in which the first network device may determine to activate the first SSB in the second network device, and does not constitute any limitation on this application. Another case in which the first network device can determine to activate the first SSB in the second network device also falls within the protection scope of this application.

Specifically, after determining to deactivate or activate the first SSB, the first network device performs S120: The first network device sends a first request message to the second network device.

For example, the method shown in FIG. 2 is applied between two base stations, and the base station may be the radio access network device shown in FIG. 1. If the first network device and the second network device are respectively the network device #1 and the network device #2 in FIG. 1, the first network device may send the first request message to the second network device in the following two manners:

Manner 1: The first request message may be directly forwarded through an interface between the first network device and the second network device, for example, the Xn interface between the network device #1 and the network device #2 shown in FIG. 1.

Manner 2: The first request message may be forwarded by a core network device, that is, the first network device first sends the first request message to the core network device, and then the core network device sends the first request message to the second network device. For example, the network device #1 shown in FIG. 1 first sends the first request message to the core network device through the NG interface between the network device #1 and the core network device. The core network device then sends the first request message to the network device #2.

It should be understood that the foregoing descriptions of how the first network device sends the first request message to the second network device are merely an example, and do not constitute any limitation on this application. Another manner in which the first request message can be sent to the second network device also falls within the protection scope of this application.

Specifically, the first request message carries first indication information for indicating the first SSB, and the first indication information may be referred to as SSB information. The second network device may perform different operations after receiving the first request message. There are the following two cases:

Case 1:

In correspondence to Case 1 in S110, when the first SSB is an SSB in the first network device, the first request message is used to request the second network device to update a state of the first SSB.

It should be understood that, it can be learned from Case 1 in S110 that the first network device may determine to deactivate or activate the one or more SSBs in the first network device. When the first network device determines to deactivate or activate the plurality of SSBs in the first network device, the first request message sent by the first network device to the second network device may carry a plurality of pieces of indication information that respectively indicate the plurality of SSBs, or the first network device sends a plurality of first request messages to the second network device, where the plurality of first request messages respectively carry a plurality of pieces of indication information for indicating the plurality of SSBs. In this embodiment of this application, how the first network device requests the second network device to learn of the case when the first network device determines to deactivate or activate the plurality of SSBs in the first network device is not limited. In this application, only that the request message sent by the first network device to the second network device carries indication information for indicating one or more activated or deactivated SSBs is limited. For ease of description, an example in which the first request message carries the first indication information for indicating the first SSB is used for description in this specification. For a case in which the first network device determines to deactivate or activate the plurality of SSBs in the first network device, how the first network device requests the second network device to learn of the case is not described in detail in this application.

For example, in this embodiment of this application, the first request message may reuse existing interaction signaling between the first network device and the second network device, but a new information element (IE) is added to the existing signaling. Specifically, the newly added IE is used to indicate the first indication information of the first SSB, and the first indication information may be referred to as SSB information. The following describes in detail a possible form of the first indication information, and details are not described herein.

For example, in this case, the first request message may be an existing configuration update message sent by the first network device to the second network device, and new SSB information is added to the configuration update message. Specifically, the newly added SSB information may be an information element that occupies a plurality of bytes, and the plurality of bytes may be a transmission resource newly added for transmitting the SSB information, or some or all of the plurality of bytes are reserved bytes in the configuration update message. The existing configuration update message is used to update application layer configuration data.

For example, in this embodiment of this application, the first request message may be newly added interaction signaling between the first network device and the second network device. Specifically, the first request message includes the first indication information used to indicate the first SSB. For example, a new SSB update request message between the first network device and the second network device is added.

It should be understood that a specific form of the first request message is not limited in this application, and may reuse existing signaling, or may be newly added signaling. In this application, only that the first request message carries the first indication information for indicating the first SSB is limited.

Specifically, if the first network device deactivates the first SSB in the first network device, the first request message is used to request the second network device to update the state of the first SSB in the information that is about the at least one SSB in the first network device and that is maintained by the second network device from the active state to the dormant state. For another example, if the first network device activates the first SSB in the first network device, the first request message is used to request the second network device to update the state of the first SSB in the information that is about the at least one SSB in the first network device and that is maintained by the second network device from the dormant state to the active state.

Further, after the first network device determines to deactivate the first SSB in the first network device, for the second network device, the second network device may locally enable an SSB that occupies a same resource as the cell corresponding to the first SSB. For example, an enabled SSB in the second network device may be configured with a same frequency and a PCI as the first SSB. Therefore, a risk of an SSB configuration conflict between neighboring network devices can be reduced. For another example, the second network device learns of a quantity of PRBs occupied by a channel of the cell corresponding to the first SSB in the first network device, a transmission bandwidth and a subcarrier spacing that are in a unit of a resource block, a percentage of a channel bandwidth of the cell corresponding to the first SSB to a total channel bandwidth, and the like, so that the second network device performs coordinated use of an available resource (for example, a PRB) based on the information, to implement resource coordination, thereby reducing interference between the second network device and the first network device, and further improving a signal-to-noise ratio and a throughput.

For example, the method procedure shown in FIG. 2 further includes S121: The second network device updates the state of the first SSB.

Specifically, the second network device maintains the information about the at least one SSB in the first network device, and after receiving the first request message, the second network device accurately learns, based on the first indication information carried in the first request message, that the state of the first SSB changes, and updates the state of the first SSB in the information that is about the at least one SSB in the first network device and that is maintained in the second network device. In other words, the information that is about the at least one SSB in the first network device and that is maintained by the second network device forms an information list of the SSB. When the state of the first SSB is updated, it is equivalent to update of the information list that is of the SSB in the first network device and that is maintained by the second network device. For example, the first request message is used to request the second network device to update the state of the first SSB in the information that is about the SSB in the first network device and that is maintained by the second network device from the active state to the dormant state. After receiving the first request message, the second network device updates the state of the first SSB in the at least one SSB in the first network device that is maintained by the second network device to the dormant state.

For another example, if the first network device determines to activate the first SSB in the first network device, the first request message is used to request the second network device to update the state of the first SSB in the information that is about the at least one SSB in the first network devices and that is maintained by the second network device from the dormant state to the active state. After receiving the first request message, the second network device updates the state of the first SSB in the at least one SSB in the first network device that is maintained by the second network device to the active state.

For example, the method procedure shown in FIG. 2 further includes S122: The second network device sends a first response message to the first network device.

The first response message is used to indicate whether the second network device successfully updates the state of the first SSB. Specifically, when the first request message reuses the existing configuration update message sent by the first network device to the second network device, the first response message may also reuse an existing configuration update acknowledgment or failure message sent by the second network device to the first network device. The existing configuration update acknowledgment or failure message is used to indicate that update of the application layer configuration data succeeds or fails. Alternatively, the first response message is a newly added SSB update acknowledgment or failure message between the first network device and the second network device.

For example, after the second network device successfully updates the state of the first SSB, the second network device sends the first response message to the first network device, to notify the first network device that the requested state update of the first SSB has been successfully performed. For another example, when the second network device fails to update the state of the first SSB, the second network device sends the first response message to the first network device, to notify the first network device that the requested state update of the first SSB fails to be performed. That the second network device fails to update the state of the first SSB may be that the second network device fails to determine the first SSB, or the state of the first SSB may be set to unchangeable.

For example, when the first response message is used to indicate that the second network device fails to update the state of the first SSB, the first response message may carry first duration, used to indicate that the first network device can resend the first request message to the second network device after the first duration. For example, when the second network device fails to update the state of the first SSB, the first response message includes waiting duration of 10 ms, to indicate that the first network device can resend the first request message to the second network device after 10 ms.

Case 2:

In correspondence to Case 2 in S110, when the first SSB is an SSB in the second network device, the first request message is used to request the second network device to activate the first SSB.

It should be understood that, it can be learned from Case 2 in S110 that the first network device may determine to activate the one or more SSBs in the second network device. When the first network device determines to activate the plurality of SSBs in the second network device, the first request message sent by the first network device to the second network device may carry a plurality of pieces of indication information that respectively indicate the plurality of SSBs, or the first network device sends a plurality of first request messages to the second network device, where the plurality of first request messages respectively carry a plurality of pieces of indication information for indicating the plurality of SSBs. In this embodiment of this application, how the first network device requests the second network device to learn of the case when the first network device determines to activate the plurality of SSBs in the second network device is not limited. In this application, only that the request message sent by the first network device to the second network device carries indication information for indicating one or more activated or deactivated SSBs is limited. For ease of description, an example in which the first request message carries the first indication information for indicating the first SSB is used for description in this specification. For a case in which the first network device determines to activate the plurality of SSBs in the second network device, how the first network device requests the second network device to learn of the case is not described in detail in this application.

For example, in this embodiment of this application, the first request message may reuse existing interaction signaling between the first network device and the second network device, and a new IE is added to the existing signaling. Specifically, the newly added IE is used to indicate the first indication information of the first SSB, and the first indication information may be referred to as SSB information.

For example, in this case, the first request message may be an existing cell activation request message sent by the first network device to the second network device, and new SSB information is added to the cell activation request message. The existing cell activation request message is used by the second network device to activate a disabled cell.

For example, in this embodiment of this application, the first request message may be newly added interaction signaling between the first network device and the second network device. Specifically, the first request message includes the first indication information used to indicate the first SSB.

Specifically, if the first network device determines to activate the first SSB in the second network device, the first request message is used to request the second network device to activate the first SSB in the second network device, and the state of the first SSB in the second network device is updated from the dormant state to the active state.

For example, the method procedure shown in FIG. 2 further includes S123: The second network device activates the first SSB.

For example, the method procedure shown in FIG. 2 further includes S124: The second network device sends a third response message to the first network device, where the third response message is used to indicate whether the second network device successfully activates the first SSB in the second network device.

Specifically, when the first request message reuses the existing cell activation request message sent by the first network device to the second network device, the third response message may reuse an existing cell activation response or failure message sent by the second network device to the first network device. The existing cell activation response message is used to indicate that one or more previously disabled cells have been successfully activated, and the existing cell activation failure message is used to indicate that the cell fails to be activated.

For example, when the third response message is used to indicate that the second network device successfully activates the first SSB in the second network device, the method procedure shown in FIG. 2 further includes S125: The first network device updates the state of the first SSB.

Specifically, the first network device maintains the information about the at least one SSB in the second network device, and after receiving the third response message, the first network device updates the state of the first SSB in the information list that is of the at least one SSB in the second network device and that is maintained by the first network device from the dormant state to the active state.

In conclusion, after receiving the first request message, the second network device can update the state of the first SSB or activate the first SSB. This is because the first request message carries the first indication information for indicating the first SSB, and the second network device can accurately learn, based on the first indication information, of an SSB whose state is to be updated or an SSB to be activated.

For example, the first indication information includes at least one of the following information:

identification information of the first SSB, channel bandwidth information of a cell corresponding to the first SSB, or an SSB state list, where the SSB state list is a list of state information of an SSB in a network device to which the first SSB belongs, and the first SSB in the SSB state list is in a dormant state or an active state; or the SSB state list is a state list of the first SSB; or the SSB state list is a state list of a remaining SSB other than the first SSB in SSBs in a network device to which the first SSB belongs.

For example, the identification information of the first SSB includes:

a physical cell identifier of the first SSB; or a physical cell identifier of the first SSB and a radio frequency reference frequency of the first SSB; or a physical cell identifier of the first SSB and a new radio absolute radio frequency channel number of the first SSB; or a physical cell identifier of the first SSB, a new radio absolute radio frequency channel number of the first SSB, and an operating frequency band of a carrier on which the first SSB is located; or a new radio cell global identifier NCGI of the first SSB; or an identifier ID of the first SSB.

For example, the channel bandwidth information of the cell corresponding to the first SSB includes at least one of the following information:

information about a quantity of physical resource blocks PRBs occupied by a channel of the cell corresponding to the first SSB, a transmission bandwidth and a subcarrier spacing that are in a unit of a resource block, or a percentage of a channel bandwidth of the cell corresponding to the first SSB to a total channel bandwidth.

The first indication information may be referred to as SSB information. The foregoing has described in detail a possible form of the SSB information and how to indicate the SSB in different forms. Details are not described herein again.

For example, before the first network device deactivates the first SSB, optionally, the method procedure shown in FIG. 2 further includes S111: The first network device sends a second request message to the second network device.

Specifically, the second request message is used to request to hand over a terminal device from the first network device to the second network device, the second request message carries second indication information, and the second indication information is used to indicate that a cause for handing over the terminal device from the first network device to the second network device is that the first SSB is to be deactivated. The terminal device to which the first network device requests to hand over is a terminal device served by the first SSB in the first network device. When the first SSB is to be deactivated, the first SSB stops serving the terminal device. In this application, that an SSB serves one or some terminal devices means that the one or some terminal devices transmit data by using a resource occupied by a cell corresponding to the SSB.

For example, when performing access control, the second network device may set an access priority of the terminal device handed over from the deactivated first SSB in the first network device. For example, to ensure that the terminal device served by the first SSB is successfully handed over to a preset SSB in the second network device to be served by the preset SSB, when performing access control on the terminal device served by the first SSB, the second network device sets the terminal device served by the first SSB to preferentially access the second network device with a higher priority. Specifically, for example, newly added terminal devices served by the preset SSB in the second network device need to include newly added UE #1 and a terminal device UE #2 that is served by the first SSB. In this case, when performing access control, the second network device sets the UE #2 to have a higher priority.

Further, the method procedure shown in FIG. 2 further includes S112: The first network device receives the second response message sent by the second network device.

Specifically, the second response message is used to indicate a status of resource preparation for the terminal device in the second network device.

For example, the second response message is used to indicate that a resource in the second network device has been prepared for the terminal device, and the terminal device can be served by the preset SSB in the second network device. For another example, the second response message is used to indicate that a resource in the second network device is not prepared for the terminal device.

Subsequently, after the second network device determines that the preset SSB in the second network device can serve the terminal device served by the first SSB, the first network device deactivates the first SSB. The terminal device served by the first SSB is handed over to the preset SSB in the second network device to be served by the preset SSB. Therefore, the terminal device performs radio resource control (RRC) reconfiguration with the second network device based on the preset SSB in the second network device.

It should be understood that, in this embodiment, that the first network device needs to perform subsequent S110 and S120 after performing S11 and S112 is not limited. In other words, that the second request message carries the second indication information used to indicate that the cause for handing over the terminal device from the first network device to the second network device is that the first SSB is to be deactivated is mainly limited in this embodiment.

For example, the method shown in FIG. 2 may be applied between two base stations, and the base station may be the radio access network device shown in FIG. 1.

Specifically, another communication method provided in the embodiments of this application may be applied to resource coordination between a plurality of different network devices. The following describes the communication method provided in the embodiments of this application by using an example in which resource coordination is performed between two network devices (a third network device and a fifth network device), but signaling exchange needs to be performed between the two network devices through another network device. The two network devices are neighboring network devices of each other, that is, the third network device maintains information about at least one SSB in the fifth network device, the fifth network device maintains information about at least one SSB in the third network device, the another network device is referred to as a fourth network device in the embodiments of this application, and the fourth network device maintains the information about the at least one SSB in the third network device and the information about the at least one SSB in the fifth network device. It should be understood that the fourth network device does not include an SSB, but merely maintains information about an SSB in another network device. In the embodiments, the fourth network device is mainly configured to establish communication between the third network device and the fifth network device.

It should be understood that, that a network device in this application maintains information about an SSB in another network device has been described in detail in the communication method shown in FIG. 2, and details are not described below again.

Figure 3:
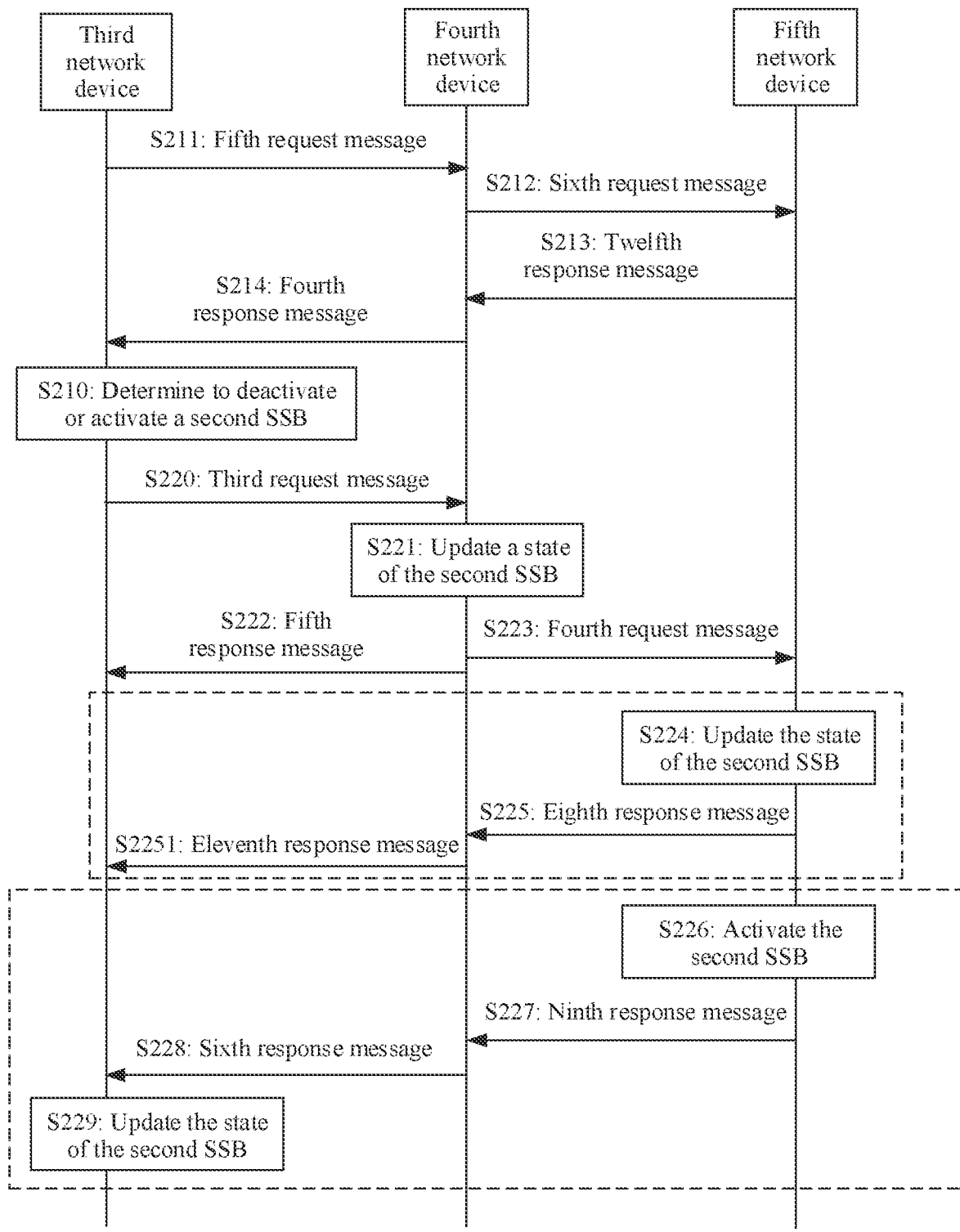
FIG. 3 is a schematic flowchart of another communication method according to an embodiment of this application.

FIG. 3 is a schematic flowchart of another communication method according to an embodiment of this application. The communication method includes operations S210, S220, and S223 involving a third network device, a fourth network device, and a fifth network device. The third network device may be the distributed unit #1 in the scenario diagram shown in FIG. 1, the fourth network device may be the central unit in the scenario diagram shown in FIG. 1, and the fifth network device may be the distributed unit #2 in the scenario diagram shown in FIG. 1. The following describes in detail operations S210, S220, and S223 with reference to FIG. 3.

S210: The third network device determines to deactivate or activate a second SSB.

Case 1:

The third network device determines to deactivate or activate the second SSB in the third network device. Specifically, in this embodiment, that the third network device determines to deactivate or activate the second SSB in the third network device is similar to that the first network device determines to deactivate or activate the first SSB in the first network device in the procedure of the communication method shown in FIG. 2, but an execution body is the third network device, and an object to be deactivated or activated is the second SSB in the third network device. Details are not described again in this embodiment.

Similarly, for the third network device, a benefit brought to the third network device by deactivating the second SSB is similar to a benefit brought to the first network device after the first network device determines to deactivate the first SSB in the first network device shown in FIG. 2, and a benefit brought to the fifth network device is similar to a benefit brought to the second network device after the first network device determines to deactivate the first SSB in the first network device shown in FIG. 2. Details are not described again in this embodiment.

For example, when the second SSB is an SSB in the third network device, a manner in which the third network device determines to deactivate or activate the second SSB is similar to a manner shown in FIG. 2 in which when the first SSB is an SSB in the first network device, the first network device determines to deactivate or activate the first SSB. For example, the third network device may determine, based on load information in the third network device, to deactivate or activate the second SSB; or the third network device receives SSB deactivation or activation indication information, where the SSB deactivation or activation indication information is used to indicate the third network device to deactivate or activate the second SSB. Details are not described again in this embodiment.

It should be understood that the foregoing determining, by the third network device based on the load information in the third network device or the received SSB deactivation or activation indication information, to deactivate or activate the second SSB is merely an example to describe a case in which the third network device may deactivate or activate the second SSB, and does not constitute any limitation on this application. Another case in which the third network device can determine to deactivate or activate the SSB also falls within the protection scope of this application.

Case 2:

The third network device determines to activate the second SSB in an SSB in the fifth network device.

Specifically, in this embodiment, that the third network device determines to activate the second SSB in the SSB in the fifth network device is similar to that the first network device determines to activate the first SSB in the second network device in the procedure of the communication method shown in FIG. 2, but an execution body is the third network device, and an object to be activated is the second SSB in the fifth network device. Details are not described again in this embodiment.

For example, when the second SSB is an SSB in the fifth network device, a manner in which the third network device determines to activate the second SSB is similar to a manner shown in FIG. 2 in which when the first SSB is an SSB in the second network device, the first network device determines to activate the first SSB. For example, the third network device may determine, based on load information in the third network device, that the second SSB in the fifth network device needs to be activated; or the third network device determines, based on coverage information of the third network device, that the second SSB in the fifth network device needs to be activated; or the third network device receives SSB activation indication information, where the SSB activation indication information is used to indicate to activate the second SSB in the fifth network device. Details are not described again in this embodiment.

It should be understood that the foregoing determining, by the third network device based on the load information in the third network device, the coverage information of the third network device, or the received SSB activation indication information, to activate the second SSB in the fifth network device is merely an example to describe a case in which the third network device may determine to activate the second SSB in the fifth network device, and does not constitute any limitation on this application. Another case in which the third network device can determine to activate the second SSB in the fifth network device also falls within the protection scope of this application.

Specifically, after determining to deactivate or activate the second SSB, the third network device performs S220: The third network device sends a third request message to the fourth network device. Specifically, the third request message carries third indication information for indicating the second SSB, the third indication information may be referred to as SSB information, and the third request message is used to request the fourth network device to send a fourth request message to the fifth network device. Specifically, the fourth request message also carries the third indication information for indicating the second SSB.

For example, the method procedure shown in FIG. 3 further includes S221: The fourth network device updates a state of the second SSB.

Specifically, the fourth network device maintains information about at least one SSB in the third network device and information about at least one SSB in the fifth network device. The fourth network device updates the state of the second SSB in the following cases:

Case 1:

In correspondence to Case 1 in S210, the second SSB is an SSB in the third network device. Because the fourth network device maintains the information about the at least one SSB in the third network device, after receiving the third request message, the fourth network device can determine, based on the third indication information that is carried in the third request message and that is used to indicate the second SSB, to update the state of the second SSB. Specifically, a possible form of the third indication information is similar to that of the first indication information in the communication method shown in FIG. 2, but the first indication information is used to indicate the first SSB, while the third indication information is used to indicate the second SSB. Details about the third indication information are not described in this embodiment.

For example, if the third network device deactivates the second SSB in the third network device, after receiving the third request message, the fourth network device updates the state of the second SSB in the information that is about the at least one SSB in the third network device and that is maintained by the fourth network device from an active state to a dormant state. For another example, if the third network device activates the second SSB in the third network device, after receiving the third request message, the fourth network device updates the state of the second SSB in the information that is about the at least one SSB in the third network device and that is maintained by the fourth network device from a dormant state to an active state.

It should be understood that a specific form of the third request message is not limited in this application, and may reuse existing signaling, or may be newly added signaling. In this application, only that the third request message carries the third indication information for indicating the second SSB is limited.

Case 2:

In correspondence to Case 2 in S210, the second SSB is an SSB in the fifth network device. Because the fourth network device further maintains the information about the at least one SSB in the fifth network device, after receiving the third request message, the fourth network device can determine, based on the third indication information that is carried in the third request message and that is used to indicate the second SSB, to update the state of the second SSB.

Specifically, after the fourth network device successfully updates or fails to update the state of the second SSB, the method procedure shown in FIG. 3 further includes S222: The fourth network device sends a fifth response message to the third network device.

Specifically, the fifth response message is used to indicate whether the fourth network device successfully updates the state of the second SSB.

For example, when the third request message reuses an existing distributed unit configuration update message sent by the third network device to the fourth network device, the fifth response message may reuse an existing distributed unit configuration update acknowledgment/failure message sent by the fourth network device to the third network device.

For example, after the fourth network device successfully updates the state of the second SSB, the fourth network device sends the fifth response message to the third network device, to notify the third network device that the requested state update of the second SSB has been successfully performed. For another example, w % ben the fourth network device fails to update the state of the second SSB, the fourth network device sends the fifth response message to the third network device, to notify the third network device that the requested state update of the second SSB fails to be performed.

For example, when the fifth response message is used to indicate that the fourth network device fails to update the state of the second SSB, the fifth response message may carry second duration, used to indicate that the third network device can resend the third request message to the fourth network device after the second duration.

For example, when the fourth network device fails to update the state of the second SSB, the fifth response message includes waiting duration of 10 ms, to indicate that the third network device can resend the third request message to the fourth network device after 10 ms.

Specifically, after the fourth network device receives the third request message, the method procedure shown in FIG. 3 further includes S223: The fourth network device sends a fourth request message to the fifth network device. The fifth network device may perform different operations after receiving the fourth request message. There are the following two cases:

Case 1:

In correspondence to Case 1 in S210, when the second SSB is an SSB in the third network device, the fourth request message is used to request the fifth network device to update the state of the second SSB.

It should be understood that a specific form of the fourth request message is not limited in this application, and may reuse existing signaling, or may be newly added signaling. In this application, only that the fourth request message carries the third indication information is limited.

Specifically, if the third network device deactivates the second SSB in the third network device, the fourth request message is used to request the fifth network device to update the state of the second SSB in the information that is about the at least one SSB in the third network device and that is maintained by the fifth network device from the active state to the dormant state. For another example, if the third network device activates the second SSB in the third network device, the fourth request message is used to request the fifth network device to update the state of the second SSB in the information that is about the at least one SSB in the third network device and that is maintained by the fifth network device from the dormant state to the active state.

For example, the method procedure shown in FIG. 3 further includes S224: The fifth network device updates the state of the second SSB.

Specifically, the fifth network device maintains the information about the at least one SSB in the third network device, and after receiving the fourth request message, the fifth network device accurately learns, based on the third indication information carried in the fourth request message, that the state of the second SSB changes, and updates the state of the second SSB in the information that is about the at least one SSB in the third network device and that is maintained by the fifth network device. In other words, the information that is about the at least one SSB in the third network device and that is maintained by the fifth network device forms an information list of the SSB. When the state of the second SSB is updated, it is equivalent to update of the information list that is of the SSB in the third network device and that is maintained by the fifth network device. For example, the fourth request message is used to request the fifth network device to update the state of the second SSB in the information that is about the at least one SSB in the third network device and that is maintained by the fifth network device from the active state to the dormant state; in this case, after receiving the fourth request message, the fifth network device updates the state of the second SSB in the at least one SSB in the third network device that is maintained by the fifth network device to the dormant state. For another example, if the third network device determines to activate the second SSB in the third network device, the fourth request message is used to request the fifth network device to update the state of the second SSB in the information that is about the at least one SSB in the third network device and that is maintained by the fifth network device from the dormant state to the active state; in this case, after receiving fourth request message, the fifth network device updates the state of the second SSB in the at least one SSB in the third network device that is maintained by the fifth network device to the active state.

For example, the method procedure shown in FIG. 3 further includes S225: The fifth network device sends an eighth response message to the fourth network device, where the eighth response message is used to indicate whether the fifth network device successfully updates the state of the second SSB.

For example, the method procedure shown in FIG. 3 further includes S2251: The fourth network device sends an eleventh response message to the third network device, where the eleventh response message is used to indicate whether the fifth network device successfully updates the state of the second SSB.

Specifically, when the fourth request message reuses an existing central unit configuration update message sent by the fourth network device to the fifth network device, the eighth response message may reuse an existing central unit configuration update acknowledgment or failure message sent by the fifth network device to the fourth network device.

For example, after the fifth network device successfully updates the state of the second SSB, the fifth network device sends the eighth response message to the fourth network device, to indicate that the state update of the second SSB has been successfully performed. For another example, when the fifth network device fails to update the state of the second SSB, the fifth network device sends the eighth response message to the fourth network device, to indicate that the state update of the second SSB fails to be performed. That the fifth network device fails to update the state of the second SSB may be that the fifth network device fails to determine the second SSB based on the third indication information, or the state of the second SSB may be set to unchangeable.

For example, when the eighth response message is used to indicate that the fifth network device fails to update the state of the second SSB, the eighth response message may carry third duration, used to indicate that the fourth network device can resend the fourth request message to the fifth network device after the third duration.

It should be understood that, similar to the eighth response message, after the fifth network device successfully updates the state of the second SSB, the fourth network device sends the eleventh response message to the third network device, to indicate that the state update of the second SSB has been successfully performed. For another example, when the fifth network device fails to update the state of the second SSB, the fourth network device sends the eleventh response message to the third network device, to indicate that the state update of the second SSB fails to be performed.

For example, when the eleventh response message is used to indicate that the fifth network device fails to update the state of the second SSB, the eleventh response message may carry sixth duration, used to indicate that the third network device can resend the third request message to the fourth network device after the sixth duration.

Case 2:

In correspondence to Case 2 in S210, when the second SSB is an SSB in the fifth network device, the fourth request message is used to request the fifth network device to activate the second SSB.

For example, if the first network device determines to activate the second SSB in the fifth network device, the fourth request message is used to request the fifth network device to activate the second SSB in the fifth network device, and the state of the second SSB in the fifth network device is updated from the dormant state to the active state.

For example, the method procedure shown in FIG. 3 further includes S226: The fifth network device activates the second SSB.

For example, the method procedure shown in FIG. 3 further includes S227: The fifth network device sends a ninth response message to the fourth network device, where the ninth response message is used to indicate whether the fifth network device successfully activates the second SSB in the fifth network device.

For example, when the ninth response message is used to indicate that the fifth network device successfully activates the second SSB in the fifth network device, the method procedure shown in FIG. 3 further includes S228: The fourth network device sends a sixth response message to the third network device.

Specifically, the sixth response message is used to indicate whether the fifth network device successfully activates the second SSB.

For example, when the sixth response message received by the third network device is used to indicate that the fifth network device successfully activates the second SSB in the fifth network device, the method procedure shown in FIG. 3 further includes S229: The third network device updates the state of the second SSB.

Specifically, the third network device maintains the information about the at least one SSB in the fifth network device; and after receiving the sixth response message, the third network device updates the state of the second SSB in the information list that is of the at least one SSB in the fifth network device and that is maintained by the third network device from the dormant state to the active state.

In conclusion, the fourth network device can update the state of the second SSB after receiving the third request message because the third request message carries the third indication information for indicating the second SSB, and the fourth network device can accurately learn, based on the third indication information, of an SSB whose state is to be updated. Similarly, the fifth network device can update the state of the second SSB or activate the second SSB after receiving the fourth request message because the fourth request message carries the third indication information for indicating the second SSB, and the fifth network device can accurately learn, based on the third indication information, of an SSB whose state is to be updated or an SSB to be activated.

For example, before the third network device deactivates the second SSB, optionally, the method procedure shown in FIG. 3 further includes S211: The third network device sends a fifth request message to the fourth network device.

The fifth request message is used to request the fourth network device to send a sixth request message to the fifth network device, the fifth request message carries fourth indication information, and the fourth indication information is used to indicate that a cause for handing over the terminal device from the third network device to the fifth network device is that the second SSB is to be deactivated.

The method procedure shown in FIG. 3 further includes S212: The fourth network device sends the sixth request message to the fifth network device.

The sixth request message is used to request to hand over the terminal device from the third network device to the fifth network device, and the sixth request message carries the fourth indication information.

Further, the method procedure shown in FIG. 3 further includes S213: The fifth network device sends a twelfth response message to the fourth network device. The twelfth response message is used to indicate a status of resource preparation for the terminal device in the fifth network device.

Further, the method procedure shown in FIG. 3 further includes S214: The third network device receives a fourth response message sent by the fourth network device.

Specifically, the fourth response message is used to indicate a status of resource preparation for the terminal device in the fifth network device.

For example, the fourth response message is used to indicate that a resource in the fifth network device has been prepared for the terminal device, and the terminal device is allowed to access the fifth network device and served by the fifth network device. For another example, the fourth response message is used to indicate that a resource in the fifth network device is not prepared for the terminal device.

It should be understood that, in this embodiment, that the third network device needs to perform subsequent S210 and S220 after performing S211 to S214 is not limited. In other words, that the fifth request message and the sixth request message carry the fourth indication information used to indicate that the cause for handing over the terminal device from the third network device to the fifth network device is that the second SSB is to be deactivated is mainly limited in this application.

Specifically, another communication method provided in the embodiments of this application may be applied to load balancing between network devices. The following uses an example in which a fourth network device balances load between two network devices (a third network device and a fifth network device) to describe the communication method provided in the embodiments of this application. The third network device and the fifth network device are neighboring network devices of each other, that is, the third network device maintains information about at least one SSB in the fifth network device, and the fifth network device maintains information about at least one SSB in the third network device. In the embodiments of this application, a third-party device is referred to as a fourth network device, and the fourth network device maintains the information about the at least one SSB in the third network device and the information about the at least one SSB in the fifth network device.

Figure 4:
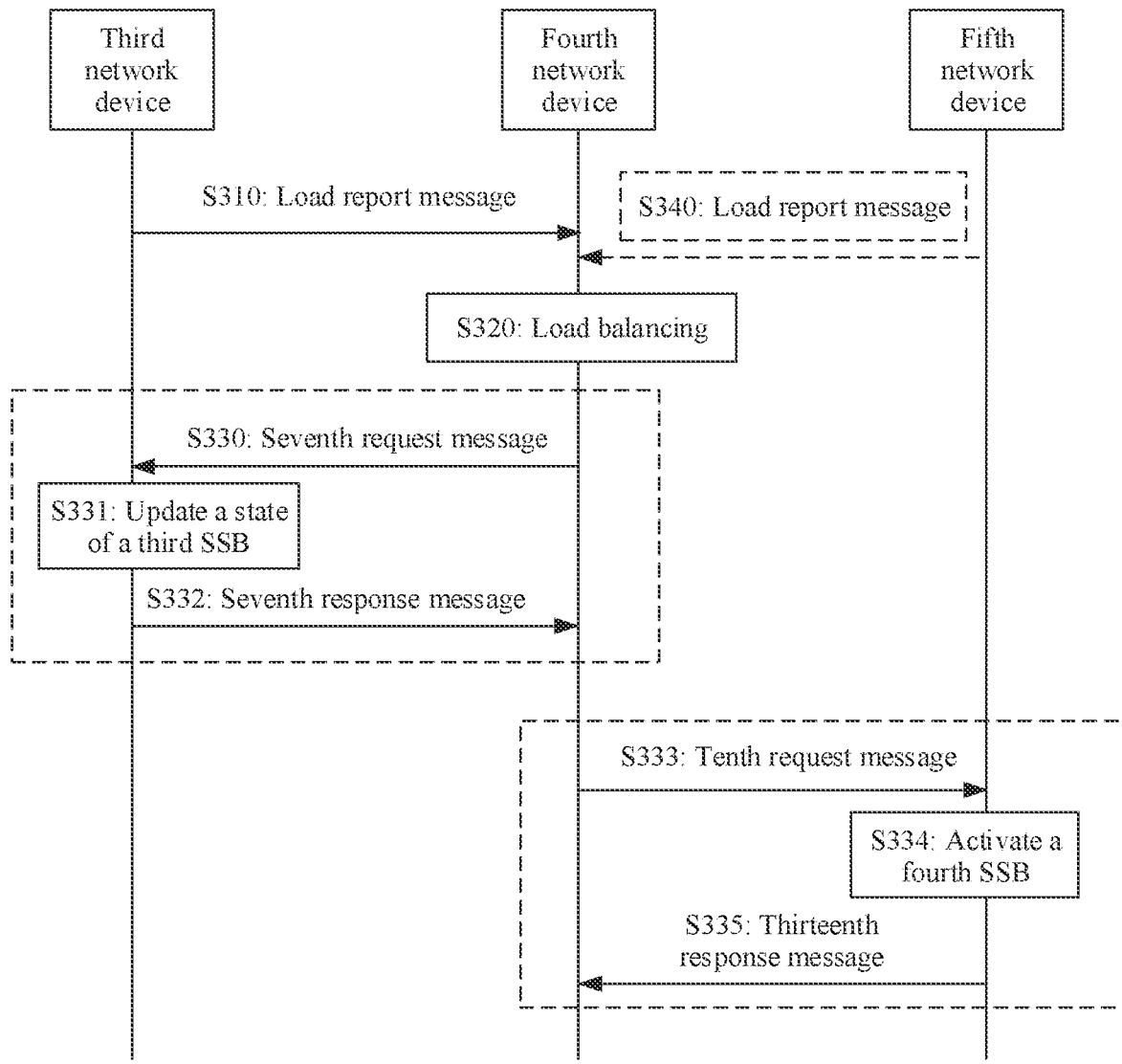
FIG. 4 is a schematic flowchart of still another communication method according to an embodiment of this application.

FIG. 4 is a schematic flowchart of still another communication method according to an embodiment of this application. The communication method includes operations S310 and S320 involving a third network device, a fourth network device, and a fifth network device. The third network device may be the distributed unit #1 in the scenario diagram shown in FIG. 1, the fourth network device may be the central unit in the scenario diagram shown in FIG. 1, and the fifth network device may be the distributed unit #2 in the scenario diagram shown in FIG. 1. The following describes operations S310 and S320 in detail with reference to FIG. 4.

S310: The third network device sends a load report message to the fourth network device.

Specifically, the load report message is used to indicate a load status of a cell corresponding to an SSB in the third network device. It should be understood that the load report message may be referred to as an SSB load message.

For example, the load report message includes SSB information corresponding to one or more SSBs in the third network device and load information of a cell corresponding to the one or more SSBs, and the SSB information corresponding to the one or more SSBs are respectively used to indicate the one or more SSBs.

For example, the SSB information includes at least one of identification information of the SSB or channel bandwidth information of the cell corresponding to the SSB. Specifically, the identification information of the SSB and the channel bandwidth information of the cell corresponding to the SSB have been described in detail above, and details are not described herein again.

For example, the load information includes at least one of the following information:

radio resource usage information of the cell corresponding to the SSB, a hardware load indicator of the cell corresponding to the SSB, a software load indicator of the cell corresponding to the SSB, a capacity value of the cell corresponding to the SSB, or overload state indication information of the cell corresponding to the SSB, where the overload state indication information of the cell corresponding to the SSB is used to indicate that the cell corresponding to the SSB is in an overloaded state or a non-overloaded state.

S320: The fourth network device performs load balancing.

The fourth network device determines, based on the received load report message sent by the third network device, to activate or deactivate a third SSB in the third network device, or the fourth network device determines, based on the received load report message sent by the third network device, to activate a fourth SSB in the fifth network device.

For example, if load of a cell corresponding to the third SSB in the third network device is less than predetermined load (for example, the foregoing low load threshold), the fourth network device determines to deactivate the third SSB in the third network device. For another example, if load of a cell corresponding to the third SSB in the third network device is greater than or equal to predetermined load (for example, the foregoing high load threshold), and the fourth network device learns, based on historical measurement information, that the fourth SSB in the fifth network device can provide coverage required by the third SSB in the third network device, the fourth network device determines to activate the fourth SSB in the fifth network device.

For example, if the fourth network device determines, based on the received load report message sent by the third network device, to activate or deactivate the third SSB in the third network device, the method shown in FIG. 4 further includes the following operations.

S330: The fourth network device sends a seventh request message to the third network device.

The seventh request message is used to indicate the third network device to deactivate or activate the third SSB.

For example, the seventh request message carries fifth indication information for indicating the third SSB. Specifically, a possible form of the fifth indication information is similar to that of the first indication information in the communication method shown in FIG. 2, but the first indication information is used to indicate the first SSB, while the fifth indication information is used to indicate the third SSB. Details about the fifth indication information are not described 8*s* in this embodiment.

S331: The third network device updates a state of the SSB.

After receiving the seventh request message, the third network device updates a state of the third SSB.

Specifically, the third network device updates the state of the SSB in the following two cases:

Case 1: The seventh request message requests the third network device to deactivate the third SSB. In this case, after receiving the seventh request message, the third network device learns, based on the fifth indication information carried in the seventh request message, that the third SSB can be deactivated, and then updates the state of the third SSB from an active state to a dormant state.

Case 2: The seventh request message requests the third network device to activate the third SSB. In this case, after receiving the seventh request message, the third network device learns, based on the fifth indication information carried in the seventh request message, that the third SSB needs to be activated, and then updates the state of the third SSB from a dormant state to an active state.

S332: The third network device sends a seventh response message to the fourth network device.

The seventh response message is used to indicate whether the third SSB is successfully deactivated or activated.

Specifically, if the seventh response message is used to indicate that the third SSB fails to be deactivated or activated, the seventh response message may carry fourth duration, used to indicate that the fourth network device can resend the seventh request message to the third network device after the fourth duration.

For example, if the fourth network device determines, based on the received load report message sent by the third network device, to activate the fourth SSB in the fifth network device, the method shown in FIG. 4 further includes the following operations.

S333: The fourth network device sends a tenth request message to the fifth network device.

The tenth request message is used to indicate the fifth network device to activate the fourth SSB.

For example, the tenth request message carries sixth indication information for indicating the fourth SSB. Specifically, a possible form of the sixth indication information is similar to that of the first indication information in the communication method shown in FIG. 2, but the first indication information is used to indicate the first SSB, while the fifth indication information is used to indicate the fourth SSB. Details about the sixth indication information are not described in this embodiment.

S334: The fifth network device activates the state of the fourth SSB.

After receiving the tenth request message, the fifth network device activates the fourth SSB.

S335: The fifth network device sends a thirteenth response message to the fourth network device.

The thirteenth response message is used to indicate whether the fourth SSB is successfully activated. Specifically, if the thirteenth response message is used to indicate that the fourth SSB fails to be activated, the thirteenth response message may carry fifth duration, used to indicate that the fourth network device can resend the tenth request message to the fifth network device after the fifth duration.

Optionally, the fifth network device may also send a load report message to the fourth network device. The method shown in FIG. 4 further includes S340: The fifth network device sends the load report message to the fourth network device.

Specifically, the load report message is used to indicate a load status of a cell corresponding to an SSB in the fifth network device.

For example, the load report message includes SSB information corresponding to one or more SSBs in the fifth network device and load information of a cell corresponding to the one or more SSBs.

Specifically, content of the load report message sent by the fifth network device is similar to content of the load report message sent by the third network device to the fourth network device. Details are not described.

It should be understood that, in the communication method shown in FIG. 4, the fourth network device may determine, based only on the load report message sent by the third network device, to deactivate or activate the third SSB in the third network device, or determine to activate the fourth SSB in the fourth network device; and the fourth network device may determine, based only on the load report message sent by the fifth network device, to deactivate or activate the fourth SSB in the fourth network device; or determine to activate the third SSB in the third network device.

It should be understood that sequence numbers of the foregoing processes do not mean execution sequences in the foregoing method embodiments. The execution sequences of the processes should be determined based on functions and internal logic of the processes, and should not be construed as any limitation on the implementation processes of the embodiments of this application.

The foregoing describes in detail the communication method provided in this application and application procedures in different scenarios with reference to FIG. 2 to FIG. 4. Communications apparatuses in this application are described in detail below with reference to FIG. 5 to FIG. 14.

Figure 5:
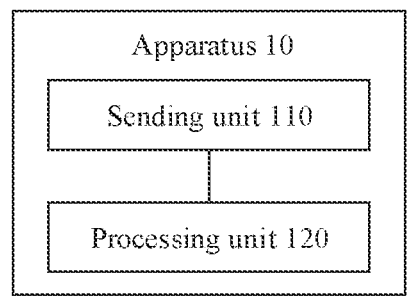
FIG. 5 is a schematic diagram of a communications apparatus 10 according to this application.

FIG. 5 is a schematic diagram of a communications apparatus 10 according to this application. As shown in FIG. 5, the apparatus 10 includes a sending unit 110 and a processing unit 120.

The processing unit 120 is configured to determine to deactivate or activate a first synchronization signal and physical broadcast channel block SSB.

The sending unit 110 is configured to send a first request message to a second network device, where the first request message carries first indication information for indicating the first SSB.

When the first SSB is an SSB in the communications apparatus, the first request message is used to request the second network device to update a state of the first SSB, and the second network device maintains information about at least one SSB in the communications apparatus; or when the processing unit determines to activate the first SSB and the first SSB is an SSB in the second network device, the first request message is used to request the second network device to activate the first SSB, and the first network device maintains information about at least one SSB in the second network device.

The apparatus 10 completely corresponds to the first network device in the method embodiment, and a corresponding unit of the apparatus 10 is configured to perform a corresponding operation performed by the first network device in the method embodiment shown in FIG. 2.

The sending unit 110 in the apparatus 10 performs the sending operation of the first network device in the method embodiment, for example, perform operation 120 of sending the first request message to the second network device in FIG. 2, or perform operation 111 of sending the second request message to the second network device in FIG. 2. The processing unit 120 performs the operation implemented or processed internally by the first network device in the method embodiment, for example, performs operation 110 of determining to deactivate or activate the first synchronization signal and physical broadcast channel block SSB in FIG. 2, or operation 125 of updating the state of the first SSB in FIG. 2.

Optionally, the apparatus 10 may further include a receiving unit 130, configured to receive information sent by another device, for example, perform operation 122 of receiving the first response message sent by the second network device in FIG. 2, or perform operation 112 of receiving the second response message sent by the second network device, or perform operation 124 of receiving the third response message sent by the second network device in FIG. 2.

The receiving unit 130 and the sending unit 110 may form a transceiver unit that has both receiving and sending functions. The processing unit 120 may be a processor. The sending unit 110 may be a transmitter. The receiving unit 130 may be a receiver. The receiver and the transmitter may be integrated to form a transceiver.

Figure 6:
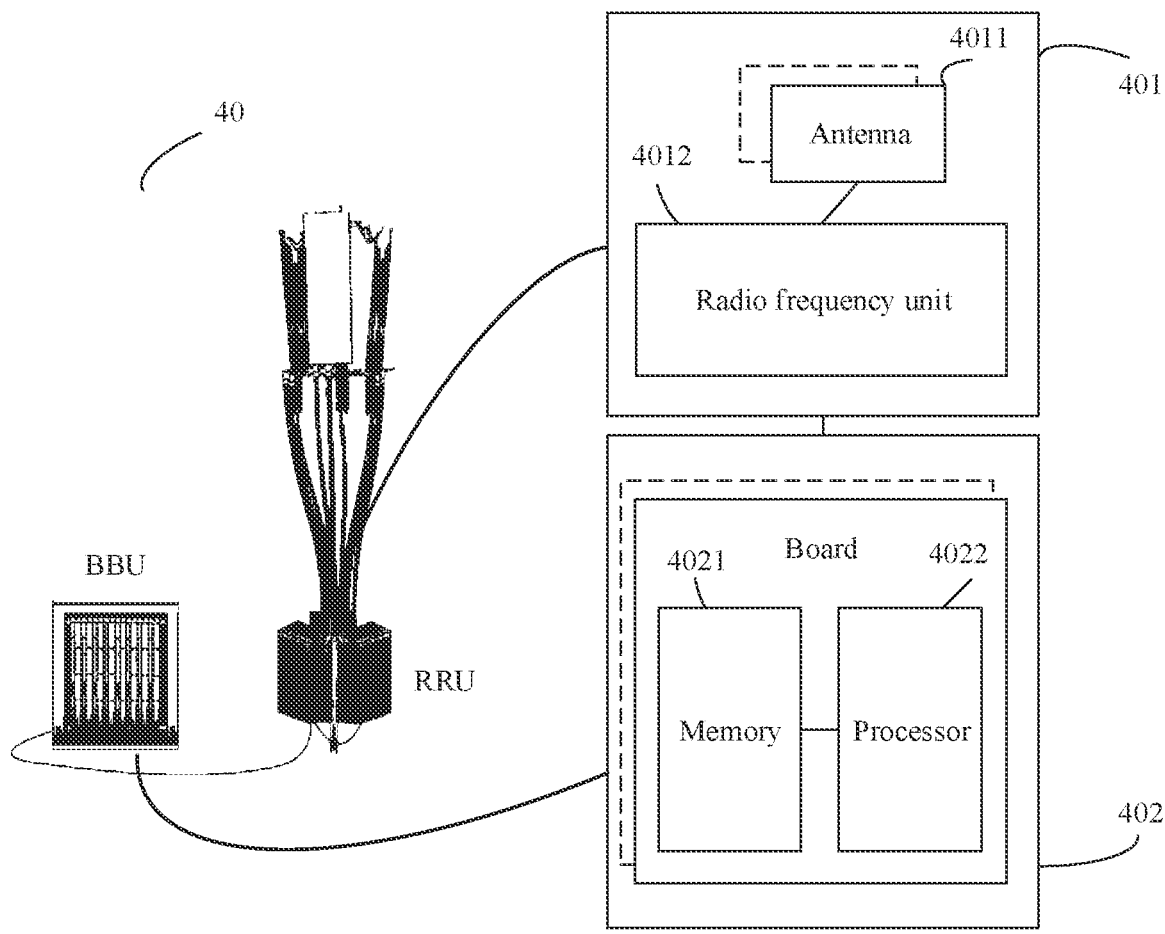
FIG. 6 is a schematic structural diagram of a first network device 40 to which an embodiment of this application is applicable.

FIG. 6 is a schematic structural diagram of a first network device 40 to which an embodiment of this application is applicable. The first network device 40 may be configured to implement a function of the first network device in the foregoing communication method. For example, FIG. 6 may be a schematic structural diagram of a base station. As shown in FIG. 6, the first network device 40 may include one or more radio frequency units, for example, a remote radio unit (RRU) 401 and one or more baseband units (BBU) 402. The baseband unit may also be referred to as a digital unit (DU) 1140211. The RRU 401 may be referred to as a transceiver unit, and corresponds to the sending unit 110 in FIG. 5. Optionally, the transceiver unit 401 may also be referred to as a transceiver, a transceiver circuit, a transceiver, or the like, and may include at least one antenna 4011 and a radio frequency unit 4012. Optionally, the transceiver unit 401 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 401 is mainly configured to: send and receive a radio frequency signal, and perform conversion between a radio frequency signal and a baseband signal, for example, configured to send the control information in the foregoing embodiments to a terminal device. The BBU 402 is mainly configured to: perform baseband processing, control a base station, and so on. The RRU 401 and the BBU 402 may be physically disposed together, or may be physically separate, to be specific, in a distributed base station.

The BBU 402 is a control center of the network device, may also be referred to as a processing unit, may correspond to the processing unit 120 in FIG. 5, and is mainly configured to complete a baseband processing function, such as channel coding, multiplexing, modulation, and spreading. For example, the BBU (processing unit) 402 may be configured to control the network device 40 to perform an operation procedure related to the network device in the foregoing method embodiments, for example, determine a length of a symbol that carries control information of the terminal device.

In an example, the BBU 402 may include one or more boards, and a plurality of boards may jointly support a radio access network (such as an LTE system or a 5G system) of a single access standard, or may separately support radio access networks of different access standards. The BBU 402 further includes a memory 4021 and a processor 4022. The memory 4021 is configured to store necessary instructions and necessary data. For example, the memory 4021 stores the codebook in the foregoing embodiments. The processor 4022 is configured to control the base station to perform a necessary action, for example, control the base station to perform the operation procedure related to the network device in the foregoing method embodiments. The memory 4021 and the processor 4022 may serve the one or more boards. In other words, a memory and a processor may be separately disposed on each board. Alternatively, a plurality of boards may share a same memory and a same processor. In addition, a necessary circuit may be further disposed on each board.

It should be understood that the network device 40 shown in FIG. 6 can implement a function of the first network device in the method embodiment in FIG. 2. Operations and/or functions of units in the first network device 40 are respectively used to implement corresponding procedures performed by the first network device in the method embodiment of this application. To avoid repetition, detailed descriptions are appropriately omitted herein. A structure of the first network device shown in FIG. 6 is merely a possible form, but should not constitute any limitation on this embodiment of this application. This application does not exclude a possibility that there may be a network device structure in another form in the future.

Figure 7:
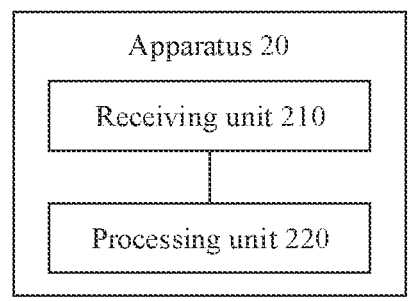
FIG. 7 is a schematic diagram of a communications apparatus 20 according to this application.

FIG. 7 is a schematic diagram of a communications apparatus 20 according to this application. As shown in FIG. 7, the apparatus 20 includes a receiving unit 210 and a processing unit 220.

The receiving unit 210 is configured to receive a first request message sent by a first network device, where the first request message carries first indication information for indicating a first SSB, and the first request message is used to request the processing unit 220 in the communications apparatus to update a state of the first synchronization signal and physical broadcast channel block SSB or activate the first SSB.

When the first SSB is an SSB that is in the first network device and that the first network device determines to deactivate or activate, the processing unit 220 is configured to update the state of the first SSB, where the communications apparatus maintains information about an SSB in the first network device.

When the first SSB is an SSB that is in the communications apparatus and that the first network device determines to activate, the processing unit 220 is configured to activate the first SSB, where the first network device maintains information about an SSB in the communications apparatus.

The apparatus 20 completely corresponds to the second network device in the method embodiment, and a corresponding unit of the apparatus 20 is configured to perform a corresponding operation performed by the second network device in the method embodiment shown in FIG. 2.

The receiving unit 210 in the apparatus 20 performs the receiving operation of the second network device in the method embodiment, for example, perform operation 120 of receiving the first request message sent by the first network device in FIG. 2, or perform operation 111 of receiving the second request message sent by the first network device in FIG. 2. The processing unit 220 performs the operation implemented or processed internally by the second network device in the method embodiment, for example, performs operation 121 of updating the state of the first SSB in FIG. 2, or performs operation 123 of activating the first SSB in FIG. 2.

Optionally, the apparatus 20 may further include a sending unit 230, configured to send information to another device, for example, perform operation 122 of sending the first response message to the first network device in FIG. 2, or perform operation 112 of sending the second response message to the first network device in FIG. 2, or perform operation 124 of sending the third response message to the first network device in FIG. 2.

The receiving unit 210 and the sending unit 230 may form a transceiver unit that has both receiving and sending functions. The processing unit 220 may be a processor. The sending unit 230 may be a transmitter. The receiving unit 210 may be a receiver. The receiver and the transmitter may be integrated to form a transceiver.

Figure 8:
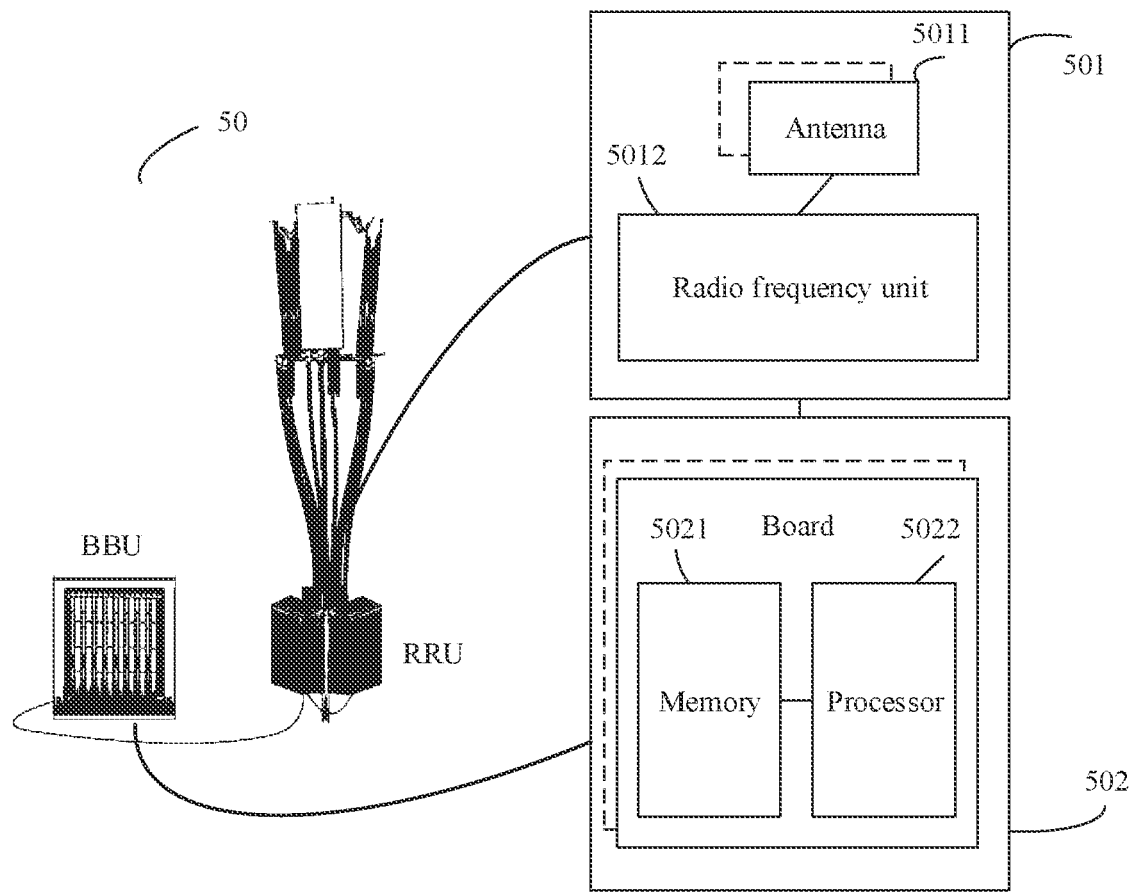
FIG. 8 is a schematic structural diagram of a second network device 50 to which an embodiment of this application is applicable.

FIG. 8 is a schematic structural diagram of a second network device 50 to which an embodiment of this application is applicable. The second network device 50 may be configured to implement a function of the second network device in the foregoing communication method. For example, FIG. 8 may be a schematic structural diagram of a base station. As shown in FIG. 8, the second network device 50 may include one or more radio frequency units, for example, a remote radio unit (RRU) 501 and one or more baseband units (BBU) 502. The baseband unit may also be referred to as a digital unit (DU). The RRU 501 may be referred to as a transceiver unit, and corresponds to the receiving unit 210 in FIG. 7. Optionally, the transceiver unit 501 may also be referred to as a transceiver, a transceiver circuit, a transceiver, or the like, and may include at least one antenna 501 and a radio frequency unit 5012. Optionally, the transceiver unit 501 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 501 is mainly configured to: send and receive a radio frequency signal, and perform conversion between a radio frequency signal and a baseband signal, for example, configured to send the control information in the foregoing embodiments to a terminal device. The BBU 502 is mainly configured to: perform baseband processing, control a base station, and so on. The RRU 501 and the BBU 502 may be physically disposed together, or may be physically separate, to be specific, in a distributed base station.

The BBU 502 is a control center of the network device, may also be referred to as a processing unit, may correspond to the processing unit 220 in FIG. 7, and is mainly configured to complete a baseband processing function, such as channel coding, multiplexing, modulation, and spreading. For example, the BBU (processing unit) 502 may be configured to control the network device 50 to perform an operation procedure related to the network device in the foregoing method embodiments, for example, determine a length of a symbol that carries control information of the terminal device.

In an example, the BBU 502 may include one or more boards, and a plurality of boards may jointly support a radio access network (such as an LTE system or a 5G system) of a single access standard, or may separately support radio access networks of different access standards. The BBU 502 further includes a memory 5021 and a processor 5022. The memory 5021 is configured to store necessary instructions and necessary data. For example, the memory 5021 stores the codebook in the foregoing embodiments. The processor 5022 is configured to control the base station to perform a necessary action, for example, control the base station to perform the operation procedure related to the network device in the foregoing method embodiments. The memory 5021 and the processor 5022 may serve the one or more boards. In other words, a memory and a processor may be separately disposed on each board. Alternatively, a plurality of boards may share a same memory and a same processor. In addition, a necessary circuit may be further disposed on each board.

It should be understood that the network device 50 shown in FIG. 8 can implement a function of the second network device in the method embodiment in FIG. 2. Operations and/or functions of units in the second network device 50 are respectively used to implement corresponding procedures performed by the second network device in the method embodiment of this application. To avoid repetition, detailed descriptions are appropriately omitted herein. The structure of the second network device shown in FIG. 8 is merely a possible form, but should not constitute any limitation on this embodiment of this application. This application does not exclude a possibility that there may be a network device structure in another form in the future.

Figure 9:
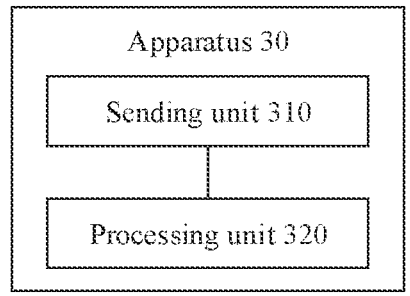
FIG. 9 is a schematic diagram of a communications apparatus 30 according to this application.

FIG. 9 is a schematic diagram of a communications apparatus 30 according to this application. As shown in FIG. 9, the apparatus 30 includes a sending unit 310 and a processing unit 320.

The processing unit 320 is configured to determine to deactivate or activate a second synchronization signal and physical broadcast channel block SSB.

The sending unit 310 is configured to send a third request message to a fourth network device, where the third request message carries third indication information for indicating the second SSB, the third request message is used to request the fourth network device to send a fourth request message to a fifth network device, the fourth request message carries third indication information, and the fourth network device maintains information about at least one SSB in the third network device and information about at least one SSB in the fifth network device, where when the second SSB is an SSB in the third network device, the fourth request message is used to request the fifth network device to update a state of the second SSB, and the fifth network device maintains the information about the at least one SSB in the third network device; or when the third network device determines to activate the second SSB and the second SSB is an SSB in the fifth network device, the fourth request message is used to request the fifth network device to activate the second SSB, and the third network device maintains the information about the at least one SSB in the fifth network device.

The apparatus 30 completely corresponds to the third network device in the method embodiment, and a corresponding unit of the apparatus 30 is configured to perform a corresponding operation performed by the third network device in the method embodiments shown in FIG. 3 and FIG. 4.

The sending unit 310 in the apparatus 30 performs the sending operation of the third network device in the method embodiment, for example, performs operation 220 of sending the third request message to the fourth network device in FIG. 3, or performs operation 211 of sending the fifth request message to the fourth network device in FIG. 3, or performs operation 310 of sending the load report message to the fourth network device in FIG. 4, or performs operation 332 of sending the seventh response message to the fourth network device in FIG. 4. The processing unit 320 performs the operation implemented or processed internally by the third network device in the method embodiment, for example, performs operation 210 of determining to deactivate or activate the second SSB in FIG. 3, or performs operation 229 of updating the state of the second SSB in FIG. 3, or performs operation 331 of updating the state of the third SSB in FIG. 4.

Optionally, the apparatus 30 may further include a receiving unit 330, configured to receive information sent by another device, for example, perform operation 214 of receiving the fourth response message sent by the fourth network device in FIG. 3, or perform operation 222 of receiving the fifth response message sent by the fourth network device in FIG. 3, or perform operation 2251 of receiving the eleventh response message sent by the fourth network device in FIG. 3, or perform operation 228 of receiving the sixth response message sent by the fourth network device in FIG. 3, or perform operation 330 of receiving the seventh response message sent by the fourth network device in FIG. 3.

The receiving unit 330 and the sending unit 310 may form a transceiver unit that has both receiving and sending functions. The processing unit 320 may be a processor. The sending unit 310 may be a transmitter. The receiving unit 330 may be a receiver. The receiver and the transmitter may be integrated to form a transceiver.

Figure 10:
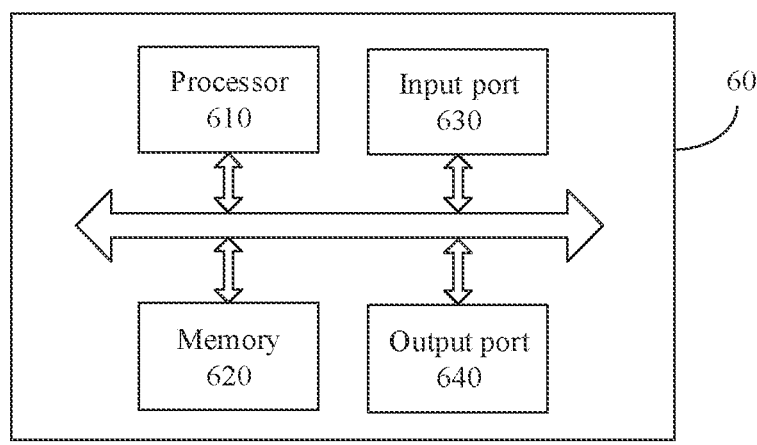
FIG. 10 is a schematic structural diagram of a third network device 60 to which an embodiment of this application is applicable.

FIG. 10 is a schematic structural diagram of a third network device 60 to which an embodiment of this application is applicable. The third network device 60 may be configured to implement a function of the third network device in the foregoing communication method. The apparatus 60 may include a processing unit 610 (that is, an example of the processing unit 320 in FIG. 9) and a storage unit 620. The storage unit 620 is configured to store instructions.

The processing unit 610 is configured to execute the instructions stored in the storage unit 620, to enable the apparatus 60 to implement the operation performed by the third network device in the foregoing method.

Further, the apparatus 60 may further include an input port 630 and an output port 640 (that is, an example of the sending unit 310 in FIG. 9). Further, the processing unit 610, the storage unit 620, the input port 630, and the output port 640 may communicate with each other through an internal connection path, to transmit control and/or data information.

The storage unit 620 is configured to store a computer program. The processing unit 610 may be configured to invoke the computer program from the storage unit 620 and run the computer program, to control the input port 630 to receive information, and control the output port 640 to send information, to complete the operation performed by the third network device in the foregoing method. The storage unit 620 may be integrated into the processing unit 610, or may be disposed separately from the processing unit 610.

Optionally, the input port 630 is a receiver, and the output port 640 is a transmitter. The receiver and the transmitter may be a same physical entity or different physical entities. When the receiver and the transmitter are a same physical entity, the receiver and the transmitter may be collectively referred to as a transceiver.

Figure 11:
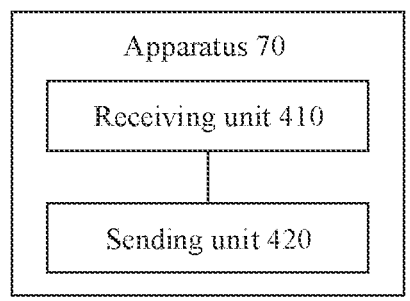
FIG. 11 is a schematic diagram of a communications apparatus 70 according to this application.

FIG. 11 is a schematic diagram of a communications apparatus 70 according to this application. As shown in FIG. 11, the apparatus 70 includes a receiving unit 410 and a sending unit 420.

The receiving unit 410 is configured to receive a third request message sent by a third network device, where the third request message carries third indication information for indicating a second SSB, the third request message is used to request the fourth network device to send a fourth request message to a fifth network device, and the fourth request message carries the third indication information for indicating the second SSB.

The sending unit 420 is configured to send a fourth request message to the fifth network device, where the fourth request message is used to request the fifth network device to update a state of the second synchronization signal and physical broadcast channel block SSB or activate the second SSB, and the fourth network device maintains information about at least one SSB in the third network device and information about at least one SSB in the fifth network device, where when the second SSB is an SSB that is in the third network device and that the third network device determines to deactivate or activate, the fourth request message is used to request the fifth network device to update the state of the second SSB, and the fifth network device maintains the information about the SSB in the third network device; or when the second SSB is an SSB that is in the fifth network device and that the third network device determines to activate, the fourth request message is used to request the fifth network device to activate the second SSB, and the third network device maintains the information about the SSB in the fifth network device.

The apparatus 40 completely corresponds to the fourth network device in the method embodiment, and a corresponding unit of the apparatus 40 is configured to perform a corresponding operation performed by the fourth network device in the method embodiments shown in FIG. 3 and FIG. 4.

The receiving unit 410 in the apparatus 40 performs the receiving operation of the fourth network device in the method embodiment, for example, performs operation 220 of receiving the third request message sent by the third network device in FIG. 3, or performs operation 211 of receiving the fifth request message sent by the third network device in FIG. 3, or performs operation 310 of receiving the load report message sent by the third network device in FIG. 4, or performs operation 332 of receiving the seventh response message sent by the third network device in FIG. 4. The processing unit 220 performs the operation implemented or processed internally by the fourth network device in the method embodiment, for example, performs operation 221 of updating the state of the second SSB in FIG. 3, or performs operation 320 of load balancing in FIG. 4.

Optionally, the apparatus 40 may further include a sending unit 330, configured to send information to another device, for example, perform operation 214 of sending the fourth response message to third network device in FIG. 3, or perform operation 222 of sending the fifth response message to the third network device in FIG. 3, or perform operation 2251 of sending the eleventh response message to the third network device in FIG. 3, or perform operation 228 of sending the sixth response message to the third network device in FIG. 3, or perform operation 332 of sending the seventh response message to the third network device in FIG. 4.

The receiving unit 410 and the sending unit 430 may form a transceiver unit that has both receiving and sending functions. The processing unit 420 may be a processor. The sending unit 430 may be a transmitter. The receiving unit 410 may be a receiver. The receiver and the transmitter may be integrated to form a transceiver.

Figure 12:
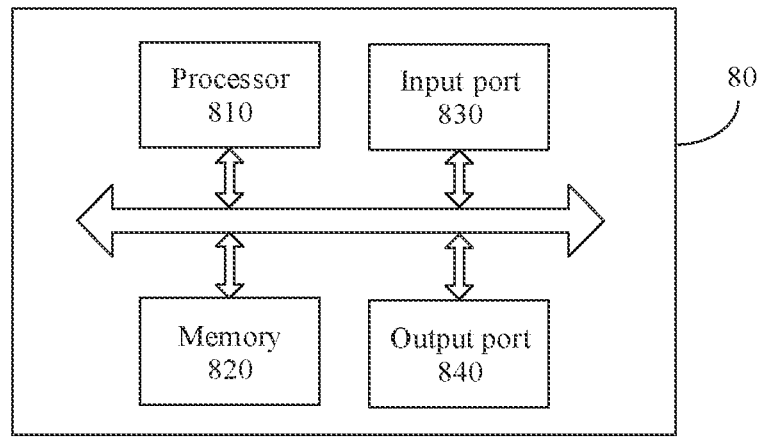
FIG. 12 is a schematic structural diagram of a fourth network device 80 to which an embodiment of this application is applicable.

FIG. 12 is a schematic structural diagram of a fourth network device 80 to which an embodiment of this application is applicable. The fourth network device 80 may be configured to implement a function of the fourth network device in the foregoing communication method. The apparatus 80 may include a processing unit R71011810 and a storage unit R72011820. The storage unit 720 820 is configured to store instructions.

The processing unit R71011810 is configured to execute the instructions stored in the storage unit R72011820, to enable the apparatus 80 to implement the operation performed by the fourth network device in the foregoing method.

Further, the apparatus 80 may further include an input port R73011830 (that is, an example of the receiving unit 410 in FIG. 11) and an output port R74011840 (that is, another example of the sending unit 420 in FIG. 11). Further, the processing unit R71011810, the storage unit R72011820, the input port R73011830, and the output port R74011840 may communicate with each other through an internal connection path, to transmit control and/or data information. The storage unit R72011820 is configured to store a computer program. The processing unit R71011810 may be configured to invoke the computer program from the storage unit R72011820 and run the computer program, to control the input port R73011830 to receive information, and control the output port W74011840 to send information, to complete the operation performed by the fourth network device in the foregoing method. The storage unit R72011820 may be integrated into the processing unit R71011810, or may be disposed separately from the processing unit 810.

Optionally, the input port R73011830 is a receiver, and the output port R74011840 is a transmitter. The receiver and the transmitter may be a same physical entity or different physical entities. When the receiver and the transmitter are a same physical entity, the receiver and the transmitter may be collectively referred to as a transceiver.

Figure 13:
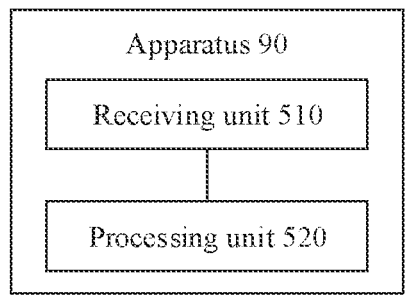
FIG. 13 is a schematic diagram of a communications apparatus 90 according to this application.

FIG. 13 is a schematic diagram of a communications apparatus 90 according to this application. As shown in FIG. 13, the apparatus 90 includes a receiving unit 510 and a processing unit 520.

The receiving unit 510 is configured to receive a fourth request message sent by a fourth network device, where the fourth request message is used to request a fifth network device to update a state of a second synchronization signal and physical broadcast channel block SSB or activate the second SSB, and the fourth network device maintains information about at least one SSB in a third network device and information about at least one SSB in the fifth network device. The third network device is a network device that sends a third request message to the fourth network device, and requests the fourth network device to send the fourth request message to the fifth network device.

When the second SSB is an SSB that is in the third network device and that the third network device determines to deactivate or activate, the processing unit 520 is configured to update the state of the second SSB, where the fifth network device maintains the information about the SSB in the third network device.

When the second SSB is an SSB that is in the fifth network device and that the third network device determines to activate, the processing unit 520 is configured to activate the second SSB, where the third network device maintains the information about the SSB in the fifth network device.

The apparatus 50 completely corresponds to the fifth network device in the method embodiment, and a corresponding unit of the apparatus 50 is configured to perform a corresponding operation performed by the fifth network device in the method embodiments shown in FIG. 3 and FIG. 4.

The receiving unit 510 in the apparatus 50 performs the receiving operation of the fifth network device in the method embodiment, for example, perform operation 223 of receiving the fourth request message sent by the fourth network device in FIG. 3, or perform operation 228 of receiving the sixth request message sent by the fourth network device in FIG. 3, or perform operation 333 of receiving the tenth request message sent by the fourth network device in FIG. 4. The processing unit 520 performs the operation implemented or processed internally by the fifth network device in the method embodiment, for example, performs operation 224 of updating the state of the second SSB in FIG. 3, or performs operation 226 of activating the second SSB in FIG. 3.

Optionally, the apparatus 50 may further include a sending unit 530, configured to send information to another device, for example, perform operation 213 of sending the twelfth response message to fourth network device in FIG. 3, or perform operation 225 of sending the eighth response message to the fourth network device in FIG. 3, or perform operation 227 of sending the ninth response message to the fourth network device in FIG. 3, or perform operation 335 of sending the thirteenth response message to the fourth network device in FIG. 4, or perform operation 340 of sending the load report message to the fourth network device in FIG. 4.

The receiving unit 510 and the sending unit 530 may form a transceiver unit that has both receiving and sending functions. The processing unit 520 may be a processor. The sending unit 530 may be a receiver. The receiving unit 510 may be a transmitter. The receiver and the transmitter may be integrated to form a transceiver.

Figure 14:
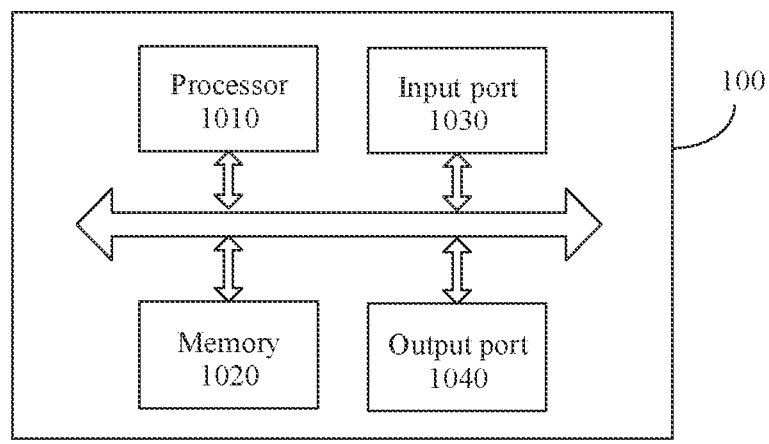
FIG. 14 is a schematic structural diagram of a fifth network device 100 to which an embodiment of this application is applicable.

FIG. 14 is a schematic structural diagram of a fifth network device 100 to which an embodiment of this application is applicable. The fifth network device 100 may be configured to implement a function of the fifth network device in the foregoing communication method. The apparatus 100 may include a processing unit 1010 (that is, an example of the processing unit 520 in FIG. 13) and a storage unit 1020. The storage unit 1020 is configured to store instructions.

The processing unit 1010 is configured to execute the instructions stored in the storage unit 1020, to enable the apparatus 100 to implement the operation performed by the fifth network device in the foregoing method.

Further, the apparatus 100 may further include an input port 1030 (that is, an example of the receiving unit 510 in FIG. 13) and an output port 1040. Further, the processing unit 1010, the storage unit 1020, the input port 1030, and the output port 1040 may communicate with each other through an internal connection path, to transmit control and/or data information. The storage unit 1020 is configured to store a computer program. The processing unit 1010 may be configured to invoke the computer program from the storage unit 1020 and run the computer program, to control the input port 1030 to receive information, and control the output port 1040 to send information, to complete the operation performed by the fifth network device in the foregoing method. The storage unit 1020 may be integrated into the processing unit 1010, or may be disposed separately from the processing unit 1010.

Optionally, the input port 1030 is a receiver, and the output port 1040 is a transmitter. The receiver and the transmitter may be a same physical entity or different physical entities. When the receiver and the transmitter are a same physical entity, the receiver and the transmitter may be collectively referred to as a transceiver.

An embodiment of this application further provides a communications system, including the foregoing one or more network devices.

This application further provides a computer-readable storage medium. The computer-readable storage medium stores instructions. When the instructions are run on a computer, the computer is enabled to perform the operations performed by the network device in the methods shown in FIG. 2 to FIG. 4.

This application further provides a computer program product including instructions. When the computer program product runs on a computer, the computer is enabled to perform the operations performed by the network device in the methods shown in FIG. 2 to FIG. 4.

This application further provides a chip, including a processor. The processor is configured to invoke and run a computer program stored in a memory, to perform a corresponding operation and/or procedure performed by the network device in the communication method provided in this application. Optionally, the chip further includes a memory. The memory and the processor are connected to the memory by using a circuit or a wire. The processor is configured to read and execute a computer program in the memory. Further, optionally, the chip includes a communications interface. The processor is connected to the communications interface. The communications interface is configured to receive data and/or information that need/needs to be processed. The processor obtains the data and/or the information from the communications interface, and processes the data and/or the information. The communications interface may be an input/output interface.

In the foregoing embodiments, the processor may be a central processing unit (CPU), a microprocessor, an application-specific integrated circuit (ASIC), one or more integrated circuits for controlling program execution in the technical solutions in this application, or the like. For example, the processor may be a digital signal processor device, a microprocessor device, an analog-to-digital converter, or a digital-to-analog converter. The processor may allocate control and signal processing functions of the terminal device or the network device between these devices based on respective functions of these devices. In addition, the processor may have a function of operating one or more software programs. The software programs may be stored in the memory. The function of the processor may be implemented by hardware, or may be implemented by hardware by executing corresponding software. The hardware or the software includes one or more modules corresponding to the foregoing function.

The memory may be a read-only memory (ROM), another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, any other medium that can be used to carry or store expected program code in a form of an instruction or a data structure and that can be accessed by a computer, or the like.

Optionally, the memory and the processor in the foregoing embodiments may be physically independent units, or the memory may be integrated into the processor.

In the embodiments of this application, the term "at least one" means one or more, and the term "a plurality of" means two or more. The term "and/or" describes an association relationship for describing associated objects and represents that three relationships may exist. For example, A and/or B may represent the following three cases: Only A exists, both A and B exist, and only B exists. A and B may be singular or plural. The character "/" usually indicates an "or" relationship between the associated objects. The term "at least one of the following items" or a similar expression thereof means any combination of the items, including any combination of singular items or plural items. For example, at least one of a, b, or c may indicate a, b, c, a and b, a and c, b and c, or a, b, and c, where a, b, and c may be singular or plural.

A person of ordinary skill in the art may be aware that units, algorithms, and operations described in the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may not be physically separate, and parts displayed as units may not be physical units, and may be located at one position, or may be distributed on a plurality of network units. Some or all of the units may be selected based on an actual requirement to achieve the objectives of the technical solutions of this application.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the method described in the embodiments of this application. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A communication method, comprising:
    determining, by a first network device, to deactivate or activate a first synchronization signal and physical broadcast channel block (SSB); and
    sending, by the first network device, a first request message to a second network device, wherein the first request message carries first indication information for indicating the first SSB, and wherein the first indication information comprises at least one of the following information: identification information of the first SSB, channel bandwidth information of a cell corresponding to the first SSB, or an SSB state list, wherein
    the SSB state list is at least one of the following:
        a list of state information of an SSB in a network device to which the first SSB belongs, and the first SSB in the SSB state list is in a dormant state or an active state;
        a state list of the first SSB; or
        a state list of a remaining SSB other than the first SSB in SSBs in a network device which the first SSB belongs to;
    the identification information of the first SSB comprises:
        a physical cell identifier of the first SSB; or
        a physical cell identifier of the first SSB and a radio frequency reference frequency of the first SSB; or
        a physical cell identifier of the first SSB and a new radio absolute radio frequency channel number of the first SSB; or a physical cell identifier of the first SSB, a new radio absolute radio frequency channel number of the first SSB, and an operating frequency band of a carrier on which the first SSB is located; or
a new radio cell global identifier (NCGI) of the first SSB; or
an identifier (ID) of the first SSB;
the channel bandwidth information of the cell corresponding to the first SSB comprises at least one of the following information:
information about a quantity of physical resource blocks (PRBs) occupied by a channel of the cell corresponding to the first SSB;
a transmission bandwidth and a subcarrier spacing that are in a unit of a resource block; or
a percentage of a channel bandwidth of the cell corresponding to the first SSB to a total channel bandwidth;
wherein:
when the first SSB is an SSB in the first network device, the first request message requests the second network device to update a state of the first SSB, and the second network device maintains information about at least one SSB in the first network device; or
when an active first SSB is an SSB in the second network device, the first request message requests the second network device to activate the first SSB, and the first network device maintains information about at least one SSB in the second network device.

2. The communication method according to claim 1, wherein when the first SSB is the SSB in the first network device, determining to deactivate or activate the first SSB comprises:
determining, by the first network device based on load information in the first network device, to deactivate or activate the first SSB; or
receiving, by the first network device, SSB deactivation or activation indication information, wherein the SSB deactivation or activation indication information indicates the first network device to deactivate or activate the first SSB.

3. The communication method according to claim 2, wherein the method comprises:
sending, by the first network device, a second request message to the second network device, wherein the second request message requests to hand over a terminal device from the first network device to the second network device, wherein the second request message carries second indication information, and the second indication information indicates that a cause for handing over the terminal device is that the first SSB is to be deactivated;
receiving, by the first network device, a second response message sent by the second network device, wherein the second response message indicates a status of resource preparation for the terminal device in the second network device; and
deactivating, by the first network device, the first SSB.

4. The communication method according to claim 2, wherein the method comprises:
receiving, by the first network device, a first response message sent by the second network device, wherein the first response message indicates whether the second network device successfully updates the state of the first SSB.

5. The communication method according to claim 4, wherein when the first response message indicates that the second network device fails to update the state of the first SSB, the first response message carries a first duration indicating that the first network device is able to resend the first request message after the first duration.

6. A communication method, comprising:
receiving, by a second network device, a first request message sent by a first network device, wherein the first request message requests the second network device to update a state of a first synchronization signal and physical broadcast channel block (SSB) or activate the first SSB, and wherein the first request message carries first indication information for indicating the first SSB, and wherein the first indication information comprises at least one of the following information: identification information of the first SSB, channel bandwidth information of a cell corresponding to the first SSB, or an SSB state list, wherein
the SSB state list is at least one of the following:
a list of state information of an SSB in a network device to which the first SSB belongs, and the first SSB in the SSB state list is in a dormant state or an active state;
a state list of the first SSB; or
a state list of a remaining SSB other than the first SSB in SSBs in a network device which the first SSB belongs to;
the identification information of the first SSB comprises:
a physical cell identifier of the first SSB; or
a physical cell identifier of the first SSB and a radio frequency reference frequency of the first SSB; or
a physical cell identifier of the first SSB and a new radio absolute radio frequency channel number of the first SSB; or
a physical cell identifier of the first SSB, a new radio absolute radio frequency channel number of the first SSB, and an operating frequency band of a carrier on which the first SSB is located; or
a new radio cell global identifier (NCGI) of the first SSB; or
an identifier (ID) of the first SSB;
the channel bandwidth information of the cell corresponding to the first SSB comprises at least one of the following information:
information about a quantity of physical resource blocks (PRBs) occupied by a channel of the cell corresponding to the first SSB;
a transmission bandwidth and a subcarrier spacing that are in a unit of a resource block; or
a percentage of a channel bandwidth of the cell corresponding to the first SSB to a total channel bandwidth; and
when the first SSB is an SSB in the first network device and the first network device determines to deactivate or activate the first SSB, updating, by the second network device, the state of the first SSB, wherein the second network device maintains information about at least one SSB in the first network device; or
when the first SSB is an SSB in the second network device and the first network device determines to activate the first SSB, activating, by the second network device, the first SSB, wherein the first network device maintains information about at least one SSB in the second network device.

7. The communication method according to claim 6, wherein when the first SSB is the SSB in the first network device and the first network device determines to deactivate the first SSB, before receiving the first request message sent by the first network device, the method comprises:

receiving, by the second network device, a second request message sent by the first network device, wherein the second request message requests to hand over a terminal device from the first network device to the second network device, wherein the second request message carries second indication information, and the second indication information indicates that a cause for handing over the terminal device is that the first SSB is to be deactivated; and sending, by the second network device, a second response message to the first network device, wherein the second response message indicates a status of resource preparation for the terminal device in the second network device.

8. The communication method according to claim 6, wherein when the first SSB is the SSB in the first network device and the first network device determines to deactivate or activate, the method comprises:

sending, by the second network device, a first response message to the first network device, wherein the first response message indicates whether the second network device successfully updates the state of the first SSB.

9. The communication method according to claim 8, wherein when the first response message indicates that the second network device fails to update the state of the first SSB, the first response message carries a first duration indicating that the first network device is able to resend the first request message after the first duration.

10. A communications apparatus, comprising:
a transceiver;
at least one processor; and
one or more memories coupled to the at least one processor and storing programming instructions for execution by the at least one processor to cause the communications apparatus to:
determine to deactivate or activate a first synchronization signal and physical broadcast channel block (SSB); and
send a first request message to a second network device, wherein the first request message carries first indication information for indicating the first SSB, and wherein the first indication information comprises at least one of the following information: identification information of the first SSB, channel bandwidth information of a cell corresponding to the first SSB, or an SSB state list, wherein
the SSB state list is at least one of the following:
a list of state information of an SSB in a network device to which the first SSB belongs, and the first SSB in the SSB state list is in a dormant state or an active state;
a state list of the first SSB; or
a state list of a remaining SSB other than the first SSB in SSBs in a network device which the first SSB belongs to;
the identification information of the first SSB comprises:
a physical cell identifier of the first SSB; or
a physical cell identifier of the first SSB and a radio frequency reference frequency of the first SSB; or
a physical cell identifier of the first SSB and a new radio absolute radio frequency channel number of the first SSB; or a physical cell identifier of the first SSB, a new radio absolute radio frequency channel number of the first SSB, and an operating frequency band of a carrier on which the first SSB is located; or
a new radio cell global identifier (NCGI) of the first SSB; or
an identifier (ID) of the first SSB;
the channel bandwidth information of the cell corresponding to the first SSB comprises at least one of the following information:
information about a quantity of physical resource blocks (PRBs) occupied by a channel of the cell corresponding to the first SSB;
a transmission bandwidth and a subcarrier spacing that are in a unit of a resource block; or
a percentage of a channel bandwidth of the cell corresponding to the first SSB to a total channel bandwidth; wherein:
when the first SSB is an SSB in the communications apparatus, the first request message requests the second network device to update a state of the first SSB, and the second network device maintains information about at least one SSB in the communications apparatus; or
when the first SSB activated by the communications apparatus is an SSB in the second network device, the first request message requests the second network device to activate the first SSB, communications apparatus maintains information about at least one SSB in the second network device.

11. The communications apparatus according to claim 10, wherein when the first SSB is the SSB in the communications apparatus, the programming instructions cause the communications apparatus to determine to deactivate or activate the first SSB, comprising:

determining, based on load information in the communications apparatus, to deactivate or activate the first SSB; or receiving SSB deactivation or activation indication information, wherein the SSB deactivation or activation indication information indicates the communication apparatus to deactivate or activate the first SSB.

12. The communications apparatus according to claim 11, wherein the programming instructions cause the communications apparatus to:

send a second request message to the second network device, wherein the second request message requests to hand over a terminal device from the communications apparatus to the second network device, wherein the second request message carries second indication information, and the second indication information indicates that a cause for handing over the terminal device is that the first SSB is to be deactivated; and
receive a second response message sent by the second network device, wherein the second response message indicates a status of resource preparation for the terminal device in the second network device; and
deactivate the first SSB.

13. The communications apparatus according to claim 11, wherein the programming instructions cause the communications apparatus to receive a first response message sent by the second network device, wherein the first response message indicates whether the second network device successfully updates the state of the first SSB.

14. The communications apparatus according to claim 13, wherein when the first response message indicates that the second network device fails to update the state of the first SSB, the first response message carries a first duration indicating that the communications apparatus is able to resend the first request message after the first duration.

15. A communications apparatus, comprising:
   a transceiver;
   at least one processor; and
   one or more memories coupled to the at least one processor and storing programming instructions for execution by the at least one processor to cause the communications apparatus to:
   receive a first request message sent by a first network device, wherein the first request message requests the communications apparatus to update a state of a first synchronization signal and physical broadcast channel block (SSB) or activate the first SSB, and wherein the first request message carries first indication information for indicating the first SSB, and wherein the first indication information comprises at least one of the following information: identification information of the first SSB, channel bandwidth information of a cell corresponding to the first SSB, or an SSB state list, wherein
   the SSB state list is at least one of the following:
      a list of state information of an SSB in a network device to which the first SSB belongs, and the first SSB in the SSB state list is in a dormant state or an active state;
      a state list of the first SSB; or
      a state list of a remaining SSB other than the first SSB in SSBs in a network device which the first SSB belongs to;
   the identification information of the first SSB comprises:
      a physical cell identifier of the first SSB; or
      a physical cell identifier of the first SSB and a radio frequency reference frequency of the first SSB; or
      a physical cell identifier of the first SSB and a new radio absolute radio frequency channel number of the first SSB; or
      a physical cell identifier of the first SSB, a new radio absolute radio frequency channel number of the first SSB, and an operating frequency band of a carrier on which the first SSB is located; or
      a new radio cell global identifier (NCGI) of the first SSB; or
      an identifier (ID) of the first SSB;
   the channel bandwidth information of the cell corresponding to the first SSB comprises at least one of the following information:
      information about a quantity of physical resource blocks (PRBs) occupied by a channel of the cell corresponding to the first SSB;
      a transmission bandwidth and a subcarrier spacing that are in a unit of a resource block; or
      a percentage of a channel bandwidth of the cell corresponding to the first SSB to a total channel bandwidth; wherein:
   when the first SSB is an SSB in the first network device and the first network device determines to deactivate or activate the first SSB, update the state of the first SSB, wherein the communications apparatus maintains information about at least one SSB in the first network device; or
   when the first SSB is an SSB in the communications apparatus and the first network device determines to activate the first SSB, activate the first SSB, wherein the first network device maintains information about at least one SSB in the communications apparatus.

16. The communications apparatus according to claim 15, wherein when the first SSB is the SSB in the first network device and the first network device determines to deactivate, before receiving the first request message sent by the first network device, the programming instructions cause the communications apparatus to:
   receive a second request message sent by the first network device, wherein the second request message requests to hand over a terminal device from the first network device to the communications apparatus, wherein the second request message carries second indication information, and the second indication information indicates that a cause for handing over the terminal device is that the first SSB is to be deactivated; and
   the programming instructions further cause the communications apparatus to send a second response message to the first network device, wherein the second response message indicates a status of resource preparation for the terminal device in the communications apparatus.

17. The communications apparatus according to claim 15, wherein when the first SSB is the SSB in the first network device and the first network device determines to deactivate or activate the first SSB, the programming instructions cause the communications apparatus to:
   send a first response message to the first network device, wherein the first response message indicates whether the communications apparatus successfully updates the state of the first SSB.

18. The communications apparatus according to claim 17, wherein when the first response message indicates that the communications apparatus fails to update the state of the first SSB, the first response message carries a first duration indicating that the first network device is able to resend the first request message after the first duration.

* * * * *

UNITED STATES PATENT AND TRADEMARK OFFICE
CERTIFICATE OF CORRECTION

PATENT NO. : 12,047,888 B2
APPLICATION NO. : 17/401682
DATED : July 23, 2024
INVENTOR(S) : Shuigen Yang et al.

It is certified that error appears in the above-identified patent and that said Letters Patent is hereby corrected as shown below:

In the Claims

In Column 80, In Line 28, In Claim 10, after "SSB," insert -- and the --.

In Column 82, In Line 14, In Claim 15, delete "activate the first SSB, activate the first SSB," and insert -- activate the first SSB, --.

Signed and Sealed this
Fifth Day of November, 2024

Katherine Kelly Vidal
*Director of the United States Patent and Trademark Office*